United States Patent
Park et al.

(10) Patent No.: US 10,341,392 B2
(45) Date of Patent: Jul. 2, 2019

(54) METHOD AND APPARATUS FOR CONTROLLING SESSION BETWEEN DEVICES ON NETWORK INCLUDING MULTIPLE DEVICES

(71) Applicant: LG ELECTRONICS INC., Seoul (KR)

(72) Inventors: Jangwoong Park, Seoul (KR); Minsoo Lee, Seoul (KR); Younghwan Kwon, Seoul (KR); Seungryul Yang, Seoul (KR); Jaekoo Lee, Seoul (KR); Hyeonjae Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 663 days.

(21) Appl. No.: 14/763,099

(22) PCT Filed: Feb. 7, 2014

(86) PCT No.: PCT/KR2014/001079
§ 371 (c)(1),
(2) Date: Jul. 23, 2015

(87) PCT Pub. No.: WO2014/123394
PCT Pub. Date: Aug. 14, 2014

(65) Prior Publication Data
US 2015/0358363 A1    Dec. 10, 2015

Related U.S. Application Data

(60) Provisional application No. 61/761,706, filed on Feb. 7, 2013, provisional application No. 61/812,261, filed
(Continued)

(51) Int. Cl.
*G06F 15/16*    (2006.01)
*H04L 29/06*    (2006.01)
(Continued)

(52) U.S. Cl.
CPC .......... *H04L 65/1066* (2013.01); *H04L 12/12* (2013.01); *H04L 12/282* (2013.01);
(Continued)

(58) Field of Classification Search
CPC ... H04L 65/1066; H04L 12/12; H04L 12/282; H04L 12/6418; H04L 67/14
(Continued)

(56) References Cited

U.S. PATENT DOCUMENTS 8,621,530 B1 *  12/2013  Guzman ................. H04N 7/20
                                                    370/343
9,705,940 B1 *  7/2017   Bhat ................... H04L 65/1096
(Continued)

FOREIGN PATENT DOCUMENTS

CN          1835506 A       9/2006
CN          102812667 A     12/2012
(Continued)

*Primary Examiner* — Madhu Woolcock
(74) *Attorney, Agent, or Firm* — Birch, Stewart, Kolasch & Birch, LLP

(57) ABSTRACT

Disclosed is a method for controlling a session between devices on a network including a plurality of devices, including: receiving a session control request message from a control device, wherein the session control request message represents a message for operating a session control between a first device and a second device; transmitting a triggering message for a specific control operation to the first device on the basis of the received session control request message; performing the session control between the first device and the second device by using the triggering message; and receiving a triggering response message from the first device, wherein the triggering response message indicates a result of performing the session control.

16 Claims, 49 Drawing Sheets

Related U.S. Application Data on Apr. 16, 2013, provisional application No. 61/816,796, filed on Apr. 28, 2013.

(51) Int. Cl.
| | | |
|---|---|---|
| *H04L 12/12* | (2006.01) | |
| *H04L 12/64* | (2006.01) | |
| *H04L 12/28* | (2006.01) | |
| *H04L 29/08* | (2006.01) | |

(52) U.S. Cl.
CPC .......... *H04L 12/6418* (2013.01); *H04L 67/14* (2013.01); *Y02D 50/40* (2018.01)

(58) Field of Classification Search
USPC .................. 709/217, 222, 227, 228, 232
See application file for complete search history.

(56) References Cited

U.S. PATENT DOCUMENTS

| | | | | |
|---|---|---|---|---|
| 9,986,273 | B2* | 5/2018 | Xiong | H04N 21/254 |
| 2002/0103850 | A1* | 8/2002 | Moyer | H04L 29/06027 |
| | | | | 709/202 |
| 2003/0074088 | A1* | 4/2003 | Gonzales | G05B 19/042 |
| | | | | 700/19 |
| 2005/0044225 | A1* | 2/2005 | Ota | H04L 29/06 |
| | | | | 709/225 |
| 2005/0050169 | A1* | 3/2005 | Basham | G06F 3/0626 |
| | | | | 709/219 |
| 2006/0149811 | A1 | 7/2006 | Bennett et al. | |
| 2006/0155850 | A1* | 7/2006 | Ma | H04L 29/06027 |
| | | | | 709/226 |
| 2006/0178777 | A1* | 8/2006 | Park | B25J 9/0003 |
| | | | | 700/245 |
| 2008/0057921 | A1* | 3/2008 | Baik | H04W 76/02 |
| | | | | 455/414.1 |
| 2008/0168523 | A1* | 7/2008 | Ansari | G06Q 30/04 |
| | | | | 725/131 |
| 2008/0189774 | A1* | 8/2008 | Ansari | G06Q 30/04 |
| | | | | 726/7 |
| 2010/0050215 | A1* | 2/2010 | Wester | H04L 12/2838 |
| | | | | 725/82 |
| 2010/0299712 | A1* | 11/2010 | Austin | H04N 7/163 |
| | | | | 725/81 |
| 2010/0312832 | A1* | 12/2010 | Allen | H04L 65/1016 |
| | | | | 709/204 |
| 2010/0329173 | A1* | 12/2010 | Murphy | H04L 29/12066 |
| | | | | 370/313 |
| 2011/0126116 | A1 | 5/2011 | Lee et al. | |
| 2011/0264914 | A1* | 10/2011 | Bae | H04L 63/06 |
| | | | | 713/170 |
| 2012/0226817 | A1* | 9/2012 | Woxblom | H04L 12/2809 |
| | | | | 709/231 |
| 2012/0233639 | A1* | 9/2012 | Zott | H04N 7/17318 |
| | | | | 725/41 |
| 2012/0254929 | A1* | 10/2012 | Oztaskent | H04N 21/4126 |
| | | | | 725/110 |
| 2012/0286924 | A1* | 11/2012 | Goto | G05B 15/02 |
| | | | | 340/4.31 |
| 2012/0314720 | A1* | 12/2012 | Lee | H04L 12/2838 |
| | | | | 370/474 |
| 2012/0324120 | A1 | 12/2012 | Lee et al. | |
| 2013/0007819 | A1* | 1/2013 | Choi | H04N 7/147 |
| | | | | 725/88 |
| 2013/0086245 | A1* | 4/2013 | Lu | H04L 12/2807 |
| | | | | 709/223 |
| 2013/0094428 | A1 | 4/2013 | Lee | |
| 2013/0111522 | A1* | 5/2013 | Tatem | H04N 21/2143 |
| | | | | 725/39 |
| 2013/0294325 | A1 | 11/2013 | Lee et al. | |
| 2013/0332979 | A1* | 12/2013 | Baskaran | H04N 21/42207 |
| | | | | 725/132 |

FOREIGN PATENT DOCUMENTS

| | | |
|---|---|---|
| JP | 2008-22548 A | 1/2008 |
| KR | 10-2010-0042635 A | 4/2010 |
| KR | 10-2011-0101373 A | 9/2011 |
| KR | 10-2012-0122335 A | 11/2012 |
| KR | 10-2012-0130181 A | 11/2012 |
| WO | WO 2011/105771 A2 | 9/2011 |
| WO | WO 2011/105780 A2 | 9/2011 |
| WO | WO 2012/015228 A2 | 2/2012 |
| WO | WO 2012/134213 A2 | 10/2012 |

* cited by examiner

FIG. 23

(a) session creation request message format(2310)

| | |
|---|---|
| (2311) | POST *path of control URL* HTTP/1.1 |
| (2312) | HOST :*host of control URL: port of host* |
| (2313) | CONTENT-LENGTH : *byte in body* |
| (2314) | CONTENT-TYPE : *type of content in body* ; charset ="utf-8" |
| (2315) | *param1=value1¶m2=value2&* .... |

(b) text/plain type (2330)

| | |
|---|---|
| (2331) | POST /hdbtsession/createsession HTTP/1.1 |
| (2332) | HOST : http://192.168.1.1:12345 |
| (2333) | CONTENT-LENGTH : *byte in body* |
| (2334) | CONTENT-TYPE : text/plain ; charset="utf-8" |
| (2335) | FirstPartnerTAdaptorRef=xxxxxxxxx&SecondPartnerTAdaptorRef = yyyyyyyy |

(c) text/xml type (2350)

| | |
|---|---|
| (2351) | POST /hdbtsession/createsession HTTP/1.1 |
| (2352) | HOST : http://192.168.1.1:12345 |
| (2353) | CONTENT-LENGTH : *byte in body* |
| (2354) | CONTENT-TYPE : text/xml ; charset="utf-8" |
| (2355) | <?xml version="1.0" encoding="UTF-8"><br><sessioncreate xmlns=http://www.hdbt.org/><br>   <FirstPartnerTAdaptorRef>xxxxxxx</FisrtPartnerTAdaptorRef><br>   <SecondPartnerTAdaptorRef>yyyyyyyyy</SecondePartnerTAdaptorRef><br></sessioncreate> |

FIG. 24

(a) session creation response message format(2410)

(2411) HTTP/1.1 200 OK
(2412) CONTENT-TYPE : *type of content in body* ; charset ="utf - 8"

(2413) *param1=value¶m2=value2&....*

(b) text/plain type (2430)

(2431) HTTP/1.1 200 OK
(2432) CONTENT-TYPE : text/plain ; charset="utf-8"

(2433) sessionID=zzzz&status=created (c) text/xml type (2450)

(2451) HTTP/1.1 200 OK
(2452) CONTENT-TYPE : text/xml ; charset ="utf-8"

(2453)
```
<?xml version="1.0" encoding="UTF-8">
<sessioninfo xmlns=http://www.hdbt.org/>
    <session id="zzzz" status="created">
</sessioninfo>
```

FIG. 25

(a) session creation request message format(2510)

| | |
|---|---|
| (2511) | POST *session control triggering URL* HTTP/1.1 |
| (2512) | HOST : *host of control URL: port of host* |
| (2513) | CONTENT-LENGTH : *byte in body* |
| (2514) | CONTENT-TYPE : *type of content in body* ; charset ="utf-8" |
| (2515) | *Body message for Session Creation* |

(b) text/plain type (2530)

| | |
|---|---|
| (2531) | POST /hdbtsession/CreateSession HTTP/1.1 |
| (2532) | HOST : http://192.168.1.1:12345 |
| (2533) | CONTENT-LENGTH : *byte in body* |
| (2534) | CONTENT-TYPE : text/plain ; charset="utf-8" |
| (2535) | FirstPartnerDeviceID =value & FirstPartnerPortID =value & FirstPartnerTGroupID =value & FirstPartnerTAdpatorMask =value & SecondPartnerDeviceID =value & SecondPartnerPortID =value & SecondPartnerTGroupID =value & SecondPartnerTAdpatorMask =value |

(c) text/xml type (2550)

| | |
|---|---|
| (2551) | POST /hdbtsession/CreateSession HTTP/1.1 |
| (2552) | HOST : http://192.168.1.1:12345 |
| (2553) | CONTENT-LENGTH : *byte in body* |
| (2554) | CONTENT-TYPE : text/xml ; charset="utf-8" |
| (2555) | <?xml version="1.0" encoding="UTF -8"><br><sessioncreate xmlns =http://www.hdbt.org/ ><br>  <FirstPartner ><br>    <DeviceID> value </ DeviceID ><br>    <PortID> value </ PortID ><br>    <TGroupID> value </ TGroupID ><br>    <TAdaptorMask> value </ TAdaptorMask ><br>  </ FirstPartner ><br>  < SecondPartner ><br>    <DeviceID > value </ DeviceID ><br>    <PortID> value </ PortID ><br>    <TGroupID > value </ TGroupID ><br>    <TAdaptorMask > value </ TAdaptorMask ><br>  </ SecondPartner ><br></ sessioncreate > |

FIG. 26

(a) session creation response message format when
session creation is successful(2610)

(2611) HTTP/1.1 200 OK
(2612) CONTENT-TYPE : *type of content in body* ; charset="utf-8"

(2613) *Body message including SID and Status*

(2621) HTTP/1.1 200 OK
(2622) CONTENT-TYPE : text/plain ; charset="utf-8"

(2623) SID=*value* & Status=CREATED (b) session creation response
message format when session creation fails (2630)

(2631) HTTP/1.1 503 Service Unavailable
(2632) CONTENT-TYPE : *type of content in body* ; charset="utf-8"

(2633) *Body message including the reason of failure*

(2641) HTTP/1.1 503 Service Unavailable
(2642) CONTENT-TYPE : text/plain ; charset="utf-8"

(2643) *The reason of failure*

FIG. 36

(a) session termination request message format (3610)

(3611) POST *path of control URL* HTTP/1.1
(3612) HOST :*host of control URL: port of host*
(3613) CONTENT-LENGTH :*byte in body*
(3614) CONTENT-TYPE :*type of content in body* ; charset ="utf-8"

(3615) *param1=value1¶m2=value2& ....*

(b) text/plain type (3630)

(3631) POST /hdbtsession/terminatesession HTTP/1.1
(3632) HOST : http://192.168.1.1:12345
(3633) CONTENT-LENGTH : *byte in body*
(3634) CONTENT-TYPE : text/plain ; charset="utf-8"

(3635) SessionID1=zzzz&SessionID2= yyyy (c) text/xml type (3650)

(3651) POST /hdbtsession/terminatesession HTTP/1.1
(3652) HOST : http://192.168.1.1:12345
(3653) CONTENT-LENGTH : *byte in body*
(3654) CONTENT-TYPE : text/xml ; charset="utf-8"

(3655)
```
<?xml version="1.0" encoding="UTF-8">
<sessionids xmlns = http://www.hdbt.org/ >
    <session id="zzzz"/>
    <session id="yyyy"/>
</sessionids>
```

FIG. 37

(a) session termination response message format (3710)

(3711) HTTP/1.1 200 OK
(3712) CONTENT-TYPE :*type of content in body* ; charset ="utf-8"

(3713) *param1=value¶m2=value2&....*

(b) text/plain type (3730)

(3731) HTTP/1.1 200 OK
(3732) CONTENT-TYPE : text/plain ; charset ="utf-8"

(3733) sessionID1=zzzz&status=created&sessionID2=yyyy&status=created (c) text/xml type (3750)

(3751) HTTP/1.1 200 OK
(3752) CONTENT-TYPE : text/xml ; charset="utf-8"

(3753)
```
<?xml version="1.0" encoding="UTF-8">
<sessioninfo xmlns=http://www.hdbt.org/>
    <session id="zzzz" status="created"/>
    <session id="yyyy" status="created"/>
</sessioninfo>
```

FIG. 38

(a) session termination request message format (3810)

| | |
|---|---|
| (3811) | POST *session control triggering URL* HTTP/1.1 |
| (3812) | HOST :*host of control URL: port of host* |
| (3813) | CONTENT-LENGTH :*byte in body* |
| (3814) | CONTENT-TYPE :*type of content in body* ; charset ="utf-8" |
| (3815) | *Body message for Session Termination* |

(b) text/plain type (3830)

| | |
|---|---|
| (3831) | POST /hdbtsession/TerminateSession HTTP/1.1 |
| (3832) | HOST : http://192.168.1.1:12345 |
| (3833) | CONTENT-LENGTH : *byte in body* |
| (3834) | CONTENT-TYPE : text/plain ; charset="utf-8" |
| (3835) | SID=*value* & InitiatingEntityReference=*value* & FirstPartnerReference=*value* & SecondPartnerReference=*value* |

(c) text/xml type (3850)

| | |
|---|---|
| (3851) | POST /hdbtsession/TerminateSession HTTP/1.1 |
| (3852) | HOST : http://192.168.1.1:12345 |
| (3853) | CONTENT-LENGTH : *byte in body* |
| (3854) | CONTENT-TYPE : text/xml ; charset="utf-8" |
| (3855) | <?xml version="1.0" encoding="UTF-8"> <br> <sessionterminate xmlns = http://www.hdbt.org/ > <br>   <SID> value </SID> <br>   < InitiatingEntityReference > value </InitiatingEntityReference> <br>   < FirstPartnerReference > value </FirstPartnerReference > <br>   < SecondPartnerReference > value </SecondPartnerReference> <br> </sessionterminate > |

FIG. 39

(a) session termination response message format when
session termination is successful (3910)

(3911) HTTP/1.1 200 OK
(3912) CONTENT-TYPE : *type of content in body*; charset="utf-8"

(3913) *Body message for session termination result*

(3921) HTTP/1.1 200 OK
(3922) CONTENT-TYPE : text/plain ; charset="utf-8"

(3923) SID=*value* & ResponseCode=*value* &
InitiatingEntityReference=*value* & FirstPartnerReference=*value* &
SecondPartnerReference=*value*

(b) session termination response message format when
session termination fails (3930)

(3931) HTTP/1.1 503 Service Unavailable
(3932) CONTENT-TYPE : *type of content in body*; charset="utf-8"

(3933) *Body message including the reason of failure*

(3941) HTTP/1.1 503 Service Unavailable
(3942) CONTENT-TYPE : text/plain ; charset="utf-8"

(3943) *The reason of failure*

FIG. 47

(a) session status request message format (4710)

| | |
|---|---|
| (4711) | POST *path of control URL* HTTP/1.1 |
| (4712) | HOST :*host of control URL: port of host* |
| (4713) | CONTENT-LENGTH : *byte in body* |
| (4714) | CONTENT-TYPE :*type of content in body* ; charset ="utf-8" |
| (4715) | *param1=value1¶m2=value2& ....* |

(b) text/plain type (4730)

| | |
|---|---|
| (4731) | POST /hdbtsession/sessionstatus HTTP/1.1 |
| (4732) | HOST : http://192.168.1.1:12345 |
| (4733) | CONTENT-LENGTH : *byte in body* |
| (4734) | CONTENT-TYPE : text/plain ; charset ="utf-8" |
| (4735) | SessionID1=zzzz&SessionID2=yyyy |

(c) text/xml type (4750)

| | |
|---|---|
| (4751) | POST /hdbtsession/sessionstatus HTTP/1.1 |
| (4752) | HOST : http://192.168.1.1:12345 |
| (4753) | CONTENT-LENGTH : *byte in body* |
| (4754) | CONTENT-TYPE : text/xml ; charset ="utf-8" |
| (4755) | <?xml version="1.0" encoding="UTF-8"><br><sessionids xmlns=http://www.hdbt.org/ ><br>   <session id="zzzz"/><br>   <session id="yyyy"/><br></sessionids> |

FIG. 48

(a) session status response message format (4810)

(4811) HTTP/1.1 200 OK
(4812) CONTENT-TYPE :*type of content in body* ; charset ="utf-8"

(4813) *param1=value¶m2=value2&....*

(b) text/xml type (4850)

(4831) HTTP/1.1 200 OK
(4832) CONTENT-TYPE : text/xml ; charset="utf-8"

(4833)
```
<?xml version="1.0" encoding="UTF-8">
<sessionstatusinfo xmlns=http://www.hdbt.org/ >
  session descriptor information
</sessionstatusinfo >
```

FIG. 49

(a) session status request message format (4910)

| | |
|---|---|
| (4911) | POST *session control triggering URL* HTTP/1.1 |
| (4912) | HOST :*host of control URL: port of host* |
| (4913) | CONTENT-LENGTH :*byte in body* |
| (4914) | CONTENT-TYPE :*type of content in body* ; charset="utf-8" |
| (4915) | *Body message for getting Session Status* |

(b) text/plain type (4930)

| | |
|---|---|
| (4931) | POST /hdbtsession/GetSessionStatus HTTP/1.1 |
| (4932) | HOST : http://192.168.1.1:12345 |
| (4933) | CONTENT-LENGTH : *byte in body* |
| (4934) | CONTENT-TYPE : text/plain ; charset="utf-8" |
| (4935) | SID=*value* |

(c) text/xml type (4950)

| | |
|---|---|
| (4951) | POST /hdbtsession/GetSessionStatus HTTP/1.1 |
| (4952) | HOST : http://192.168.1.1:12345 |
| (4953) | CONTENT-LENGTH : *byte in body* |
| (4954) | CONTENT-TYPE : text/xml ; charset="utf-8" |
| (4955) | <?xml version="1.0" encoding="UTF-8"><br><sessionstatusinfo xmlns=http://www.hdbt.org/ ><br>  <SID> value </SID><br></sessionstatusinfo > |

FIG. 50

(a) session status response message format when
obtaining of session status information is successful (5010)

(5011) HTTP/1.1 200 OK
(5012) CONTENT-TYPE : *type of content in body* ; charset="utf-8"

(5013) *Body message for getting session status result*

(5021) HTTP/1.1 200 OK
(5022) CONTENT-TYPE : text/plain ; charset="utf-8"

(5023) SessionDescriptor = *value*

(b) session status response message format when
obtaining of session status information fails (5030)

(5031) HTTP/1.1 503 Service Unavailable
(5032) CONTENT-TYPE : *type of content in body* ; charset="utf-8"

(5033) *Body message including the reason of failure*

(5041) HTTP/1.1 503 Service Unavailable
(5042) CONTENT-TYPE : text/plain ; charset="utf-8"

(5043) *The reason of failure*

METHOD AND APPARATUS FOR CONTROLLING SESSION BETWEEN DEVICES ON NETWORK INCLUDING MULTIPLE DEVICES

CROSS REFERENCE TO RELATED APPLICATIONS

This application is the National Phase of PCT/KR2014/001079 filed on Feb. 7, 2014, which claims priority under 35 U.S.C. 119(e) to U.S. Provisional Application Nos. 61/761,706 filed on Feb. 7, 2013; 61/812,261 filed on Apr. 16, 2013; and 61/816,796 filed on Apr. 28, 2013, all of which are hereby expressly incorporated by reference into the present application.

TECHNICAL FIELD

The present invention relates to a method, apparatus, and system for controlling a session between devices on a network, and more particularly, to a technique regarding a method for controlling a session between devices on a particular network using a controller in a plurality of networks supporting different protocols.

BACKGROUND ART

Various cables are required to use televisions (TVs), computers (PCs), and audio sets in spaces such as houses or offices. Some of generally used high definition (HD) transmission cable techniques are limited in a transfer rate and transmission capacity, which are, thus, not appropriate for processing large content at a high speed. Even an HD transmission technique, which does not support uncompressed video, lacks ability to connect video devices when these devices are away from one other by merely a few meters, and thus, a network system for smoothly providing large content services is required in a space connected by a network such as houses or offices.

In a network system supporting a specific protocol, transmission of unnecessary information in controlling a session between devices may cause an increase in network traffic. Thus, it is required to provide a session control function appropriately according to characteristics of each operating system and user convenience is required to be enhanced thereby.

DISCLOSURE

Technical Problem

Therefore, an aspect of the present disclosure is to provide a method for controlling a session between devices of other network by a controller of one network in a plurality of networks supporting different protocols.

Another aspect of the present disclosure is to provide an effective communication method used in a home network system and an apparatus supporting the same.

Another aspect of the present disclosure is to provide a method for transmitting a session creation trigger message by a controller belonging to other network to a device as a session creation subject.

Another aspect of the present disclosure is to provide a method for transmitting a session termination trigger message by a controller belonging to other network to one of devices participating in a session.

Another aspect of the present disclosure is to provide a method for transmitting a trigger message for receiving session status information by a controller belonging to other network to one of devices participating in a session.

Another aspect of the present disclosure is to provide a method for managing a session on a network.

Another aspect of the present disclosure is to provide a method for controlling a playback component discovered in a remote device in a multimedia network environment.

The technical subjects of the present invention are not limited to the aforesaid, and any other technical subjects not described herein will be clearly understood by those skilled in the art from the embodiments to be described hereinafter.

Technical Solution

According to an aspect of the present disclosure, there is provided a method for transmitting a session creation trigger message by a controller belonging to other network to a device as a session creation subject. According to this method, the device, which has received the trigger message, may be able to perform an operation of exchanging a message for session creation with other device according to a native protocol.

Also, according to an aspect of the present disclosure, there is provided a method for transmitting a session termination trigger message to one of devices in a session in which a controller belonging to other network is participating. Through this method, a device, which has received the trigger message, may be able to perform an operation of exchanging a message for session termination with other device according to a native protocol, and provide terminated session information to a controller.

Also, according to an aspect of the present disclosure, there is provided a method for transmitting a trigger message for receiving session status information to one of devices in a session in which a controller belonging to other network is participating. Through this method, a device, which has received the trigger message, may transmit a message including information regarding a session in which the corresponding device is participating, to a controller.

Advantageous Effects

According to embodiments of the present invention, in a case where it is complicated to realize a controller required for controlling devices in a network supporting a particular protocol, a protocol having different properties facilitating realization of the controller is used, providing ease in realization. Also, by removing unnecessary information of a session control command transmitted through a network, network traffic may be reduced.

Also, by providing ease of use in performing controlling a session between devices by a controller from a perspective of a user, user convenience may increase.

DESCRIPTION OF DRAWINGS

FIG. 10 is a view illustrating user interfaces for managing a session between devices according to an embodiment to which the present invention is applied, wherein FIG. 10(a) illustrates a user interface for creating a session between devices;

FIG. 10(b) illustrates a user interface for terminating a session between devices; and FIG. 10(c) illustrates a user interface for obtaining session status information after a session is created between devices.

FIGS. 11 through 13 are views illustrating a method for controlling a session between devices on a plurality of networks supporting different protocols according to embodiments to which the present invention is applied, wherein FIG. 11 illustrates a process of creating a session between devices;

FIG. 12 illustrates a process of terminating a session between devices; and

FIG. 13 illustrates a process of obtaining session status information after a session is created between devices.

FIG. 23 is a view illustrating embodiments to which the present invention is applied, wherein FIG. 23(a) illustrates a format of a session creation request message;

FIG. 23(b) illustrates a text/plain type session creation request message; and

FIG. 23(c) illustrates a text/xml type session creation request message.

FIG. 24 is a view illustrating embodiments to which the present invention is applied, wherein FIG. 24(a) illustrates a format of a session creation response message;

FIG. 24(b) illustrates a text/plain type session creation response message; and

FIG. 24(c) illustrates a text/xml type session creation response message.

FIG. 25 is a view illustrating other embodiments to which the present invention is applied, wherein FIG. 25(a) illustrates a format of a session creation request message;

FIG. 25(b) illustrates a text/plain type session creation request message; and

FIG. 25(c) illustrates a text/xml type session creation request message.

FIG. 26 is a view illustrating other embodiments to which the present invention is applied, wherein FIG. 26(a) illustrates a format of a session creation response message when a session creation is successful; and FIG. 26(b) illustrates a session creation response message when a session creation fails.

FIG. 36 is a view illustrating embodiments to which the present invention is applied, wherein FIG. 36(a) illustrates a format of a session termination request message;

FIG. 36(b) illustrates a text/plain type session termination request message; and FIG. 36(c) illustrates a text/xml type session termination request message.

FIG. 37 is a view illustrating embodiments to which the present invention is applied, wherein FIG. 37(a) illustrates a format of a session termination response message;

FIG. 37(b) illustrates a text/plain type session termination response message; and FIG. 37(c) illustrates a text/xml type session termination response message.

FIG. 38 is a view illustrating other embodiments to which the present invention is applied, wherein FIG. 38(a) illustrates a format of a session termination request message;

FIG. 38(b) illustrates a text/plain type session termination request message; and FIG. 38(c) illustrates a text/xml type session termination request message.

FIG. 39 is a view illustrating other embodiments to which the present invention is applied, wherein FIG. 39(a) illustrates a format of a session termination response message when a session termination is successful; and FIG. 39(b) illustrates a session termination response message when a session termination fails.

FIG. 47 is a view illustrating embodiments to which the present invention is applied, wherein FIG. 47(a) illustrates a format of a session status request message;

FIG. 47(b) illustrates a text/plain type session status request message; and

FIG. 47(c) illustrates a text/xml type session status request message.

FIG. 48 is a view illustrating embodiments to which the present invention is applied, wherein FIG. 48(a) illustrates a format of a session status response message; and FIG. 48(b) illustrates a text/xml type session status response message.

FIG. 49 is a view illustrating other embodiments to which the present invention is applied, wherein FIG. 49(a) illustrates a format of a session status request message;

FIG. 49(*b*) illustrates a text/plain type session status request message; and FIG. 49(*c*) illustrates a text/xml type session status request message.

FIG. 50 is a view illustrating other embodiments to which the present invention is applied, wherein FIG. 50(*a*) illustrates a format of a session status response message when obtaining of session status information is successful; and FIG. 50(*b*) illustrates a session status response message when obtaining of session stage information fails.

BEST MODES

Figure 1:
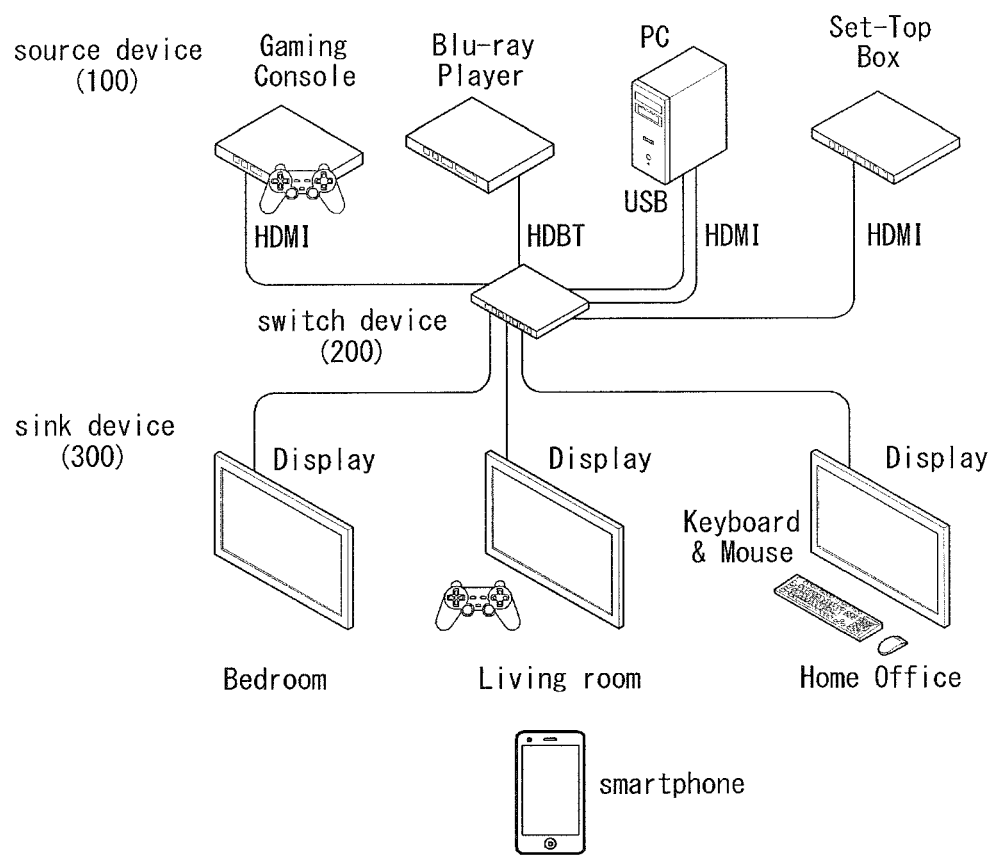
FIG. 1 is a schematic view of a network system in which a plurality of devices are connected according to an embodiment to which the present invention is applied.

In the present invention, there is provided a method for controlling a session between devices on a network including a plurality of devices, including: receiving a session control request message from a control device, wherein the session control request message represents a message for operating a session control between a first device and a second device; transmitting a triggering message for a specific control operation to the first device on the basis of the received session control request message; performing the session control between the first device and the second device by using the triggering message; and receiving a triggering response message from the first device, wherein the triggering response message indicates a result of performing the session control.

Also, in the present invention, the method may further include: transmitting a session control response message to the control device, on the basis of the triggering response message.

Also, in the present invention, at least one of the session control request message and the session control response message may be based on a first protocol, and at least one of the triggering message and the triggering response message is based on a second protocol, wherein the first protocol may be different from the second protocol.

Also, in the present invention, the session control request message may represent a session creation request message, a session termination request message, or a session status request message.

Also, in the present invention, when the session control request message represents the session creation request message, the session creation request message may include identification information of the first device and identification information of the second device.

Also, in the present invention, when the session control request message represents the session creation request message, if a session creation is successfully performed, the session control response message may include at least one of a result code indicating a success, a created session identification information, and status information indicating a session creation, and if a session creation fails, the session control response message may include at least one of a result code indicating a failure and failure reason information.

Also, in the present invention, when the session control request message represents the session termination request message, the session termination request message may include at least one of created session identification information, first device reference information and second device reference information.

Also, in the present invention, when the session control request message represents the session termination request message, the session control response message may include at least one of a result code indicating a success or a failure, first device reference information and second device reference information.

Also, in the present invention, when the session control request message represents the session status request message, the session status request message may include at least one of address information for obtaining a session status and created session identification information.

Also, in the present invention, when the session control request message represents the session status request message, the session status response message may include session status information, wherein the session status information may include at least one of associated device information, session routing information, and session path information.

In the present invention, there is provided an apparatus a session between devices on a network including a plurality of devices, including:

a network interface configured to transmit a message to at least one of the plurality of devices or receive a message from the at least one of the plurality of devices; and a controller configured to receive a session control request message from a control device, transmit a triggering message for a specific control operation to a first device on the basis of the received session control request message, and receive a triggering response message from the first device, wherein the session control request message represents a message for operating a session control between the first device and a second device, wherein the triggering response message indicates a result of performing the session control, and wherein the session control between the first device and the second device is performed by using the triggering message.

Also, in the present invention, the controller may further be configured to transmit a session control response message to the control device, on the basis of the triggering response message.

MODE FOR INVENTION

Hereinafter, elements and actions of embodiments of the present invention will be described below in more detail with reference to the accompanying drawings. However, the elements and actions illustrated in the drawings and described with reference thereto are set forth only as examples and do not limit the spirit of the invention or its key elements and actions.

The terms used in this specification were selected to include current, widely-used, general terms. However, in certain cases, a term may be one that was arbitrarily established by the applicant. In such cases, the meaning of the term will be defined in the relevant portion of the detailed description. As such, the terms used in the specification are not to be defined simply by the name of the terms but are to be defined based on the meanings of the terms as well as the overall description of the present invention.

In order to perform a session control between devices in a network system supporting a specific protocol, a controller may transmit a command message including unnecessary information. Such an overhead message may cause an increase in network traffic, and thus, in the aspect of implementation of a controller, a session control or session management function may need to be implemented according to characteristics of each operating system. However, such implementation of functions may cause an increase in development resource, and performing a session control in a device not using a controller may degrade user convenience. Thus, in order to be easily applied to various operating systems, in order to provide easy usage environment in terms of user, and in order to provide a smooth content service on a network supporting a plurality of different protocols, each device needs to provide a session control function appropriate for a connected network.

Hereinafter, an effective communication method used in a network system and an apparatus supporting the same will be described in detail with reference to the accompanying drawings, and specifically, a method and apparatus for controlling a session between devices of other network through a controller of one network on a plurality of networks supporting different protocols will be described.

In the present disclosure, embodiments of the present invention are described on the basis of data transmission and reception relationships between/among a source device, a sink device, a switch and/or control point.

An HDBaseT technique may be used in a home theater and a digital video recorder (DVR), a Blu-ray displayer (BDP), a game player, a personal computer and/or mobile products, and may be connected to several displays to form a multi-screen.

In embodiments of the present invention, the source device may refer to a device providing content, such as a Blu-ray displayer (BDP), a digital video recorder (DVR), a computer, an X box (XBOX), or a laptop computer, and the sink device may refer to a home theater, a television (TV), a monitor, and various display devices in which content is implemented. The sink device may be called a destination or a destination entity of data and/or content.

A term of downlink stream (DS) refers to logical data or a flow of stream transmitted from a content providing device to a content receiving device and may be used as having the same meaning as that of a term of downlink. Also, a term of uplink stream (US) refers to logical data or a flow of stream in the opposite direction of the downlink stream and may be used as having the same meaning as that of a term of uplink.

Also, in this disclosure, a legacy device may refer to a device not supporting the HDBaseT technique, and may be construed according to the context in each term applied thereto.

FIG. 1 is a schematic view of a network system in which a plurality of devices are connected according to an embodiment to which the present invention is applied.

The network system to which the present invention is applied may include a source device 100, a switch device 200, a sink device 300, and a controller. For the purposes of description, in FIG. 1, the devices are illustrated to be connected via a single network, but a plurality of networks may be configured. The devices may be connected using at least one of an HDTV cable, an audio cable, a video cable, an Internet LAN cable, a power supply line, and a high definition multimedia interface (HDMI) cable.

Here, various transmission techniques may be applied to the network system to which the present invention is applied. For example, the HDBaseT technique may be applied. According to the HDBaseT technique, an uncompressed high definition video signal, audio signal, or control signal may6 be transmitted through a single CAT5/6 (Category 5/6) cable.

Also, the HDBaseT technique may be used in a home theater, a DVR, a BDP, a game player, a PC and/or mobile products, and may be connected to several devices to form a multi-screen. The HDBaseT technique may provide two-way communication, multistream transmission, and even power transmission through a single cable.

On the HDBaseT network, a session should be established between HDBaseT devices, for example, HDBaseT adapters (hereinafter, referred to as T-adapters) to perform communication. A session defines a communication network path and makes provision for an appropriate service included therein. Thus, in the present invention, a method for establishing a path optimized for a session established in the HDBaseT network and effectively controlling the established session is provided.

The source device 100 may represent a device providing data (for example, content) or a device capable of providing data. Here, the data may be data stored in the source device 100 or may be received from the outside. The source device 100 may provide an interface for data transmission and reception, and transmit received data to an external device. For example, referring to FIG. 1, the source device may be a game device, a blue-ray player, a computer, a set-top box (STB), or a mobile device.

The switch device 200 represents a physical device connecting the sink device 300 and the source device 100. The switch device 200 may serve as a router. For example, the switch device 200 may transmit data transmitted from the source device 100 to the sink device 300. Here, the data may represent large content. The source device 100 and the sink device 300 may be connected in a one-to-one manner, a one-to-many manner, or a many-to-one manner. Also, in FIG. 1, only a single switch device 200 is illustrated, but the network system to which the present invention is applied may include a plurality of switch devices 200.

The sink device 300 represents a device receiving data transmitted from the outside. For example, the sink device 300 may receive content from the source device 100 or the switch device 200. The received data may be output through a display. For example, referring to FIG. 1, the sink device 300 may be a display device positioned in a bed room, a display device positioned in a living room, a display device or a mobile device in an office, and the like.

The controller may represent a device transmitting a message such as a command, a request, or an action, to various types of devices (for example, a server, a renderer, etc.) For example, the controller may transmit a message such as a command, a request, or an action to at least one of the source device 100, the switch device 200, and the sink device 300, and receive a response message. Whether to transmit the message may be determined by a user or the controller. Also, a user interface allowing for transmission of a response message received from a counterpart device, after transmission of the message, may be supported. For example, the controller itself may support the display or a user interface may be supported through a third display device.

The controller may be a remote controller related to at least one of the source device 100, the switch device 200, and the sink device 300. For example, a gaming console of the game device, a remote controller of a Blu-ray player, a keyboard, a mouse, a remote controller of a set-top box (STB), or a mobile device may serve as the controller.

The network system to which the present invention is applied may form a plurality of networks, an each network may support at least one of various protocols. For example, the networks may include a universal plug & play (UPnP) network an HDBaseT plug & plan (HPnP) network, an HDBaseT network, and the like. These networks may support a TCP/IP (Transmission Control Protocol/Internet Protocol), an SSDP (Simple Service Discovery Protocol), an SOAP (Simple Object Access Protocol), a GENA (General Event Notification Architecture), an HTTP (hypertext transfer protocol), an HD-CMP (HDBaseT Control and Management Protocol), and the like, and a message transmitted and received between devices may be expressed as a plain type or an XML (eXtensible Markup Language) type.

In the embodiments described with reference to the accompanying drawings, a specific network and a specific protocol are described as examples, but these are merely illustrative and embodiments based on combinations of the entirety or a portion of the embodiments may also be naturally within the scope of the present invention.

Also, in an embodiment to which the present invention is applied, devices and controllers belonging to different networks may provide a common protocol for a session control. A session control between devices may be performed through at least one of the protocols, and a controller may control a session by transmitting a trigger message to a corresponding device and receiving an event message.

Figure 2:
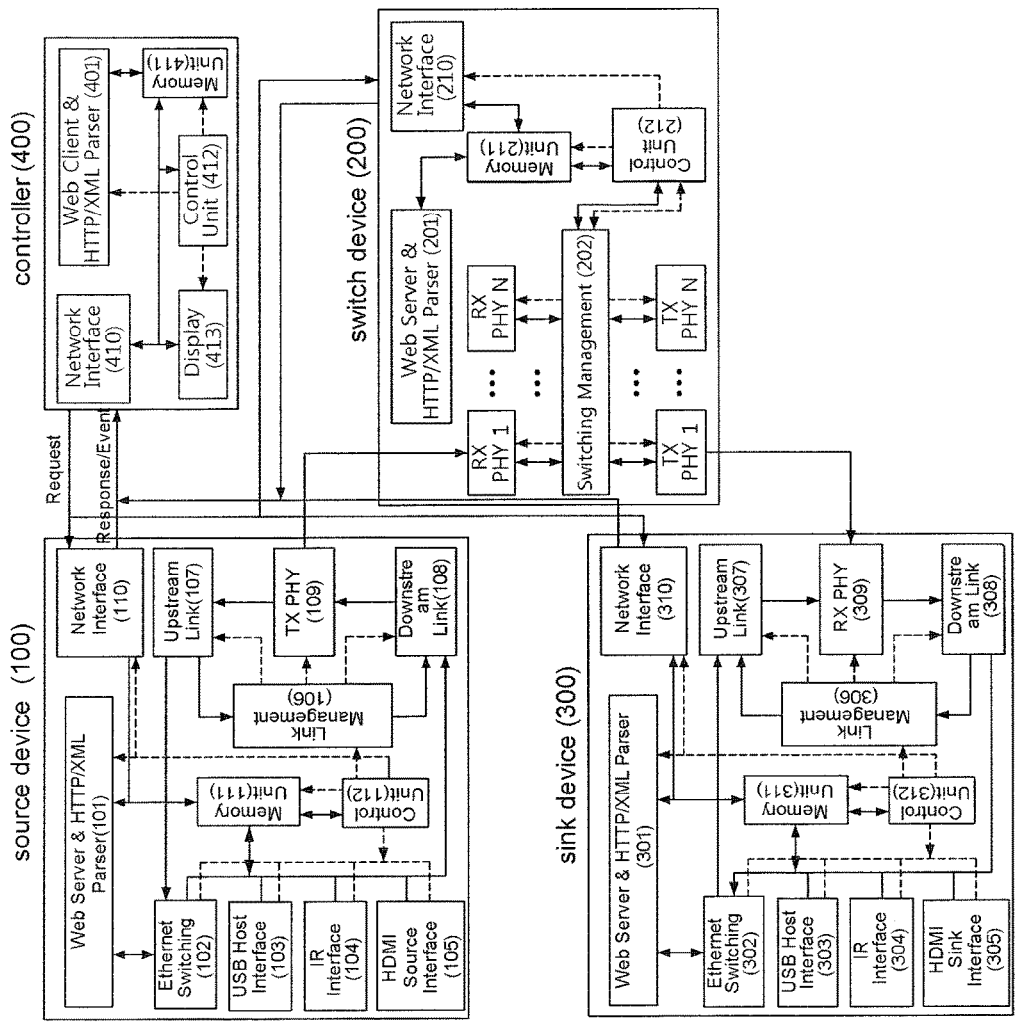
FIG. 2 is a view illustrating internal configurations of a source device, a sink device, a controller, and a switch device, and connection relationships thereof.

FIG. 2 is a view illustrating internal configurations of a source device, a sink device, a controller, and a switch device, and connection relationships thereof.

The source device 100 may include a Web server & HTTP/XML parser 101, an Ethernet switching 102, a USB host interface 103, an infrared (IR) interface 104, an HDMI source interface 105, a link management unit 106, an upstream link 107, a downstream link 108, a TX physical (PHY) layer 109, a network interface 110, a memory 111, and a control unit 112.

In the Web server & HTTP/XML parser 101, the Web server transmits an HTML document or an object (image file, or the like) requested by a controller through an HTTP, and the HTTP/XML parser parses an HTTP/XML document.

The Ethernet switching 102 serves to decapsulate Ethernet data which has been encapsulated in a packet, and transfer the decapsulated Ethernet data to other logical device.

The USB host interface 103 represents an interface allowing a USB device to communicate with a host device, the IR interface 104 represents an interface allowing an IR device to communicate with a host device, and the HDMI source interface 105 represents an interface allowing an HDMI sink device to communicate with a host device.

The link management unit 106 is a logical device handling a function of a link layer, managing an upstream/downstream link.

The upstream link 107 and the downstream link 108 generate upstream and downstream packets, respectively.

The TX physical layer 109 is a logical device handling a function of a TX physical layer, handling an interface with an external device.

The network interface 110 allows for transmission of a message or data such as a command, a request, an action, a response, and the like, between devices.

The memory 111 is a selective device implemented in various types of devices, representing a physical device in which various types of data are temporarily stored.

The control unit 112, a logical component implemented in a server or a client (or a controller), controls every operation of devices to which the control unit 112 belongs.

The switch device 200 may include a Web server & HTTP/XML parser 201, a switching management unit 206, a network interface 210, a memory 211, and a control unit 212.

The units of the switch device 200 perform functions similar to those of the corresponding units of the source device 100 described above, and thus, only units which have not been described will be described hereinafter.

The switching management unit 206 allows a plurality of RX physical layers and TX physical layers to be connected.

The sink device 300 may include a Web server and HTTP/XML parser 301, an Ethernet switching 302, a USE host interface 303, an IR interface 304, an HDMI source interface 305, a link management unit 306, an upstream link 307, a downstream link 308, an RX physical layer 309, a network interface 310, a memory 311, and a control unit 312.

Similarly, the units of the sink device 300 perform functions similar to those of the corresponding units of the source devices 100 described above, and thus, units which have not been described will be described hereinafter.

The RX physical layer 309, a logical device handling a function of an RX physical layer, handles an interface with an external device.

The controller 400 may include a Web server and HTTP/XML parser 401, a network interface 410, a memory 411, a control unit 415, and a display 413.

The units of the controller 400 perform functions similar to those of the corresponding units of the source device 100 described above, and thus, only units which have not been described will be described hereinafter.

The display 413 represents a physical device visualizing various types of data for a user and may be supported in a display component of the controller 400 itself, or a user interface may be supported through a third display device.

The present invention provides a method for effectively performing a session control between devices in the network system including the source device 100, the switch device 200, the sink device 300, and the controller 400, and the method will be described in detail hereinafter.

Figure 3:
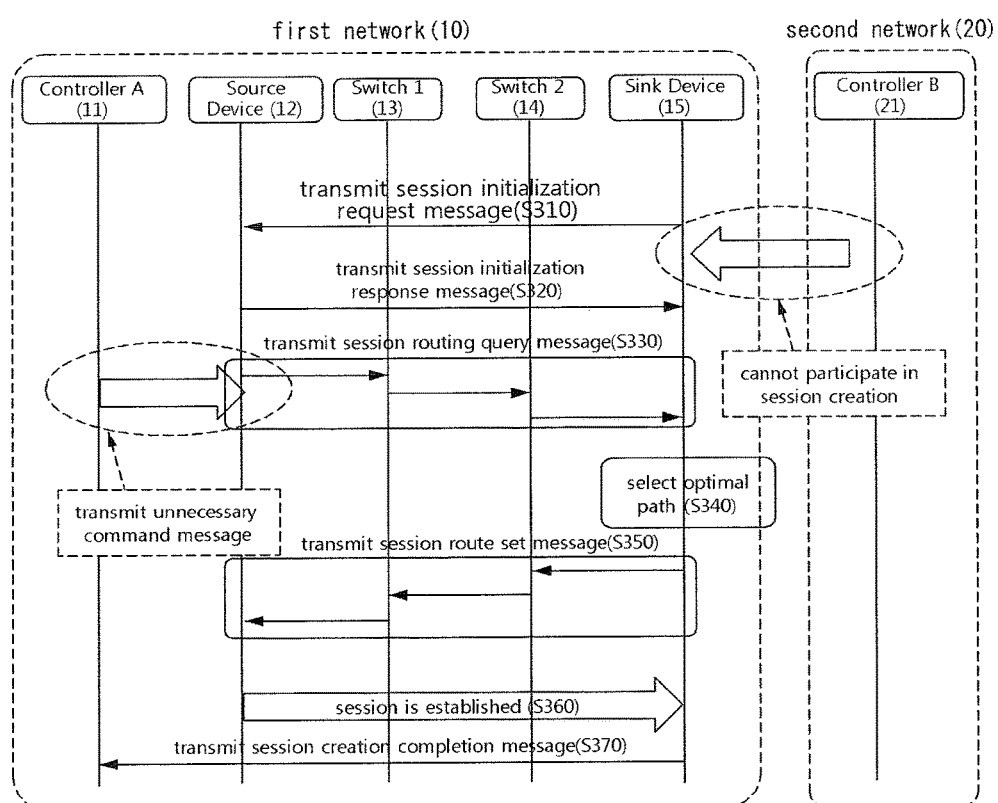
FIGS. 3 and 4 are flow charts illustrating a process of creating a session between devices in a plurality of networks according to embodiments to which the present invention is applied.
Figure 4:
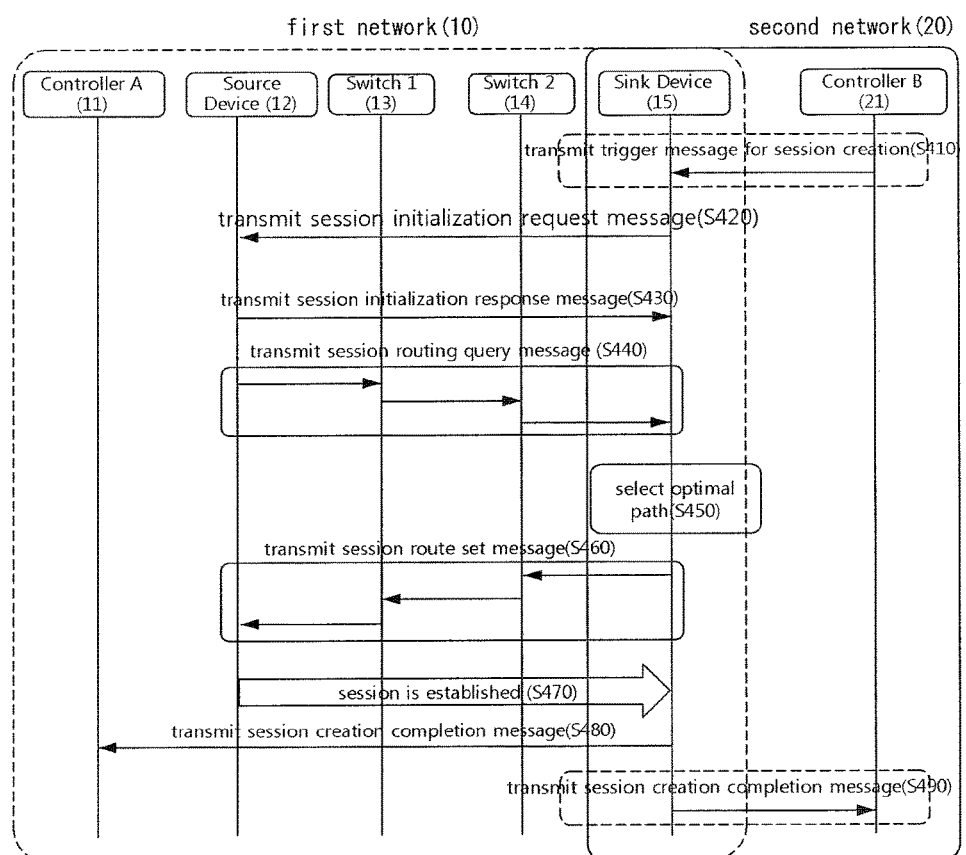

FIGS. 3 and 4 are flow charts illustrating a process of creating a session between devices in a plurality of networks according to embodiments to which the present invention is applied.

In FIG. 3, a case where a controller A 11, a source device 12, a switch 1 13, a switch 2 14, and a sink device 15 are connected in a first network 10, and a controller B 21 is included in a second network 20 is assumed.

First, the sink device 15 may transmit a session initialization request message to the discovered source device 12 (S310). Here, the session initialization request message represents a message for requesting start of a session creation. The source device may transmit a session initialization response message to the sink device 15 (S320). Here, the session initialization response message represents a response message with respect to the session initialization request message. While the session creation process is in progress between the source device 12 and the sink device 15, the controller B 21 present in the second network 20 cannot participate in the session creation process.

Meanwhile, in order to select an optimal path candidate group for reaching the sink device 15, the source device 12 may transmit a session route query message (S330). Here, the session route query message represents a message for requesting selection of a session path. The session route query message may be transmitted to the sink device 15 through the switch 1 13 and the switch 2 14. Here, the controller A 11 included in the first network 10 may transmit an unnecessary message to the source device 12.

Upon receiving the session route query message, the sink device 15 may select an optimal path (S340) and transmit a session route set message to the source device 12 (S350). Here, the session route set message represents a message for setting a session path.

A session is created through this process (S360), and as the session is created, the source device 12 starts to transmit data to the sink device 15. The sink device 15 transmits a session creation completion message to the controller A 11 included in the first network 10 (S370).

In FIG. 4, a case where the controller A 11, the source device 12, the switch 1 13, the switch 2 14, and the sink device 15 are connected in the first network 10, and the controller B 21 and the sink device 15 are connected in the second network 20 is assumed.

The controller B 21 may transmit a trigger message for a session creation to the sink device 15 such that a session is created between the sink device 15 discovered in the second network 20 and the source device 12 present in the first network 10 (S410). Here, the trigger message represents a signal for initiating a specific operation, and the trigger message for a session creation represents a signal for initiating a session creation between devices. Here, the sink device 15 supports protocols of both the first network 10 and the second network 20, and serves as a proxy.

Upon receiving the trigger message, the sink device 15 may transmit a session initialization message to the source device 12 present in the second network 20 (S420). The source device 12 may transmit a session initialization response message to the sink device 15 (S430).

In this manner, since the controller B 21 in the second network 20 transmits the trigger message for a session creation to the sink device 15 to allow the sink device 15 to serve as a proxy, thus participating in a session creation with the device in the first network 10.

Meanwhile, in order to select an optimal path candidate group for reaching the sink device 15, the source device 12 may transmit a session route query message (S440). Here, the session route query message represents a message for requesting selection of a session route. Here, upon receiving the session route query message, the sink device 15 may select an optimal path (S450) and transmit a session route set message to the source device 12 (S460).

A session is created through this process (S470), and as the session is created, the source device 12 starts to transmit data to the sink device 15. The sink device 15 transmits a session creation completion message to the controller A 11 included in the first network 10 (S480). The sink device 15 may also transmit the session creation completion message to the controller B21 included in the second network 12 (S490).

Figure 5:
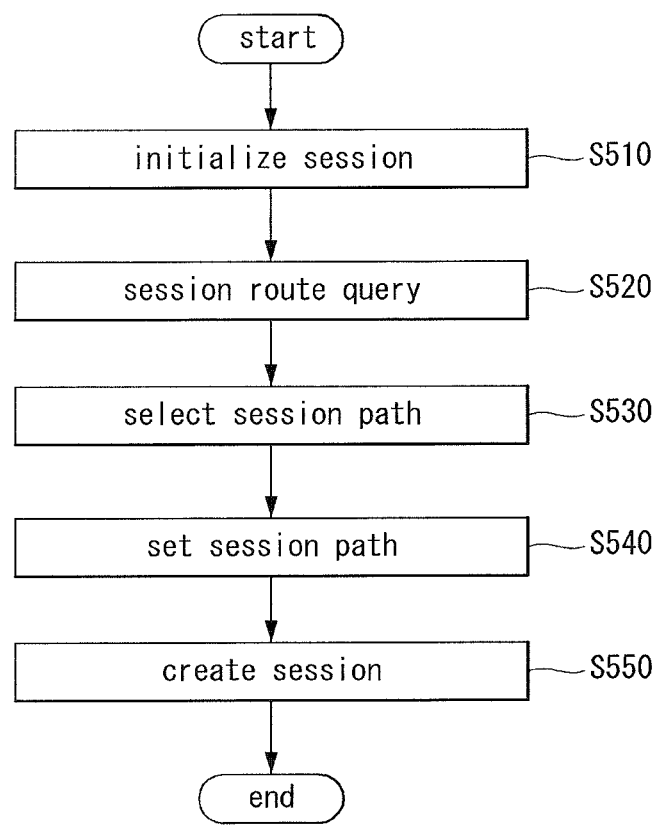
FIG. 5 is a flow chart illustrating a specific process of creating a session between devices according to an embodiment to which the present invention is applied.

FIG. 5 is a flow chart illustrating a specific process of creating a session between devices according to an embodiment to which the present invention is applied.

First, a first device may request a session initialization from a second device (S510). Here, the first device and the second device may belong to different networks or may belong to the same network. Alternatively, only any one of the first device and the second device may belong to all of a plurality of networks. Different protocols may be applied to the plurality of networks.

Upon receiving the session initialization request, the second device may request a session route query from the first device (S520). The first device may select an optimal session path on the basis of the session route query (S530). The first device may request the second device to set the selected optimal session path (S540). During the process of selecting the optimal session path, the first device and the second device may use at least one switch device, and in this case, the at least one switch device may serve as routers.

Through the foregoing process, a session may be created between the first device and the second device (S550).

Meanwhile, in other embodiment to which the present invention is applied, when a case where the first device may belong to both the first network and the second network and the second device belongs only to the second network is assumed, the first device may receive a trigger message for a session creation with the second device from the controller that belongs to the first network before step S510. Here, step S510 may be performed on the basis of the trigger message.

After the session creation is completed, the first device may transmit a message indicating that the session creation has been completed to the controller that belongs to the first network.

Figure 6:
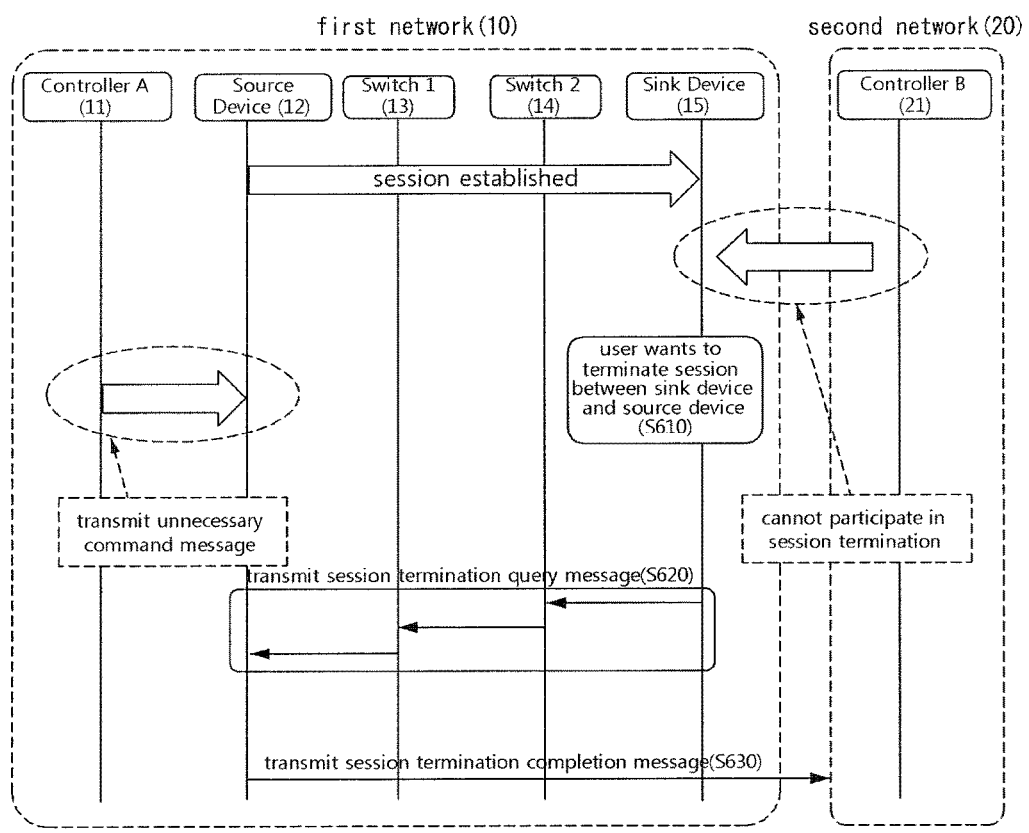
FIGS. 6 and 7 are flow charts illustrating a process of terminating a session between devices in a plurality of networks according to an embodiment to which the present invention is applied.
Figure 7:
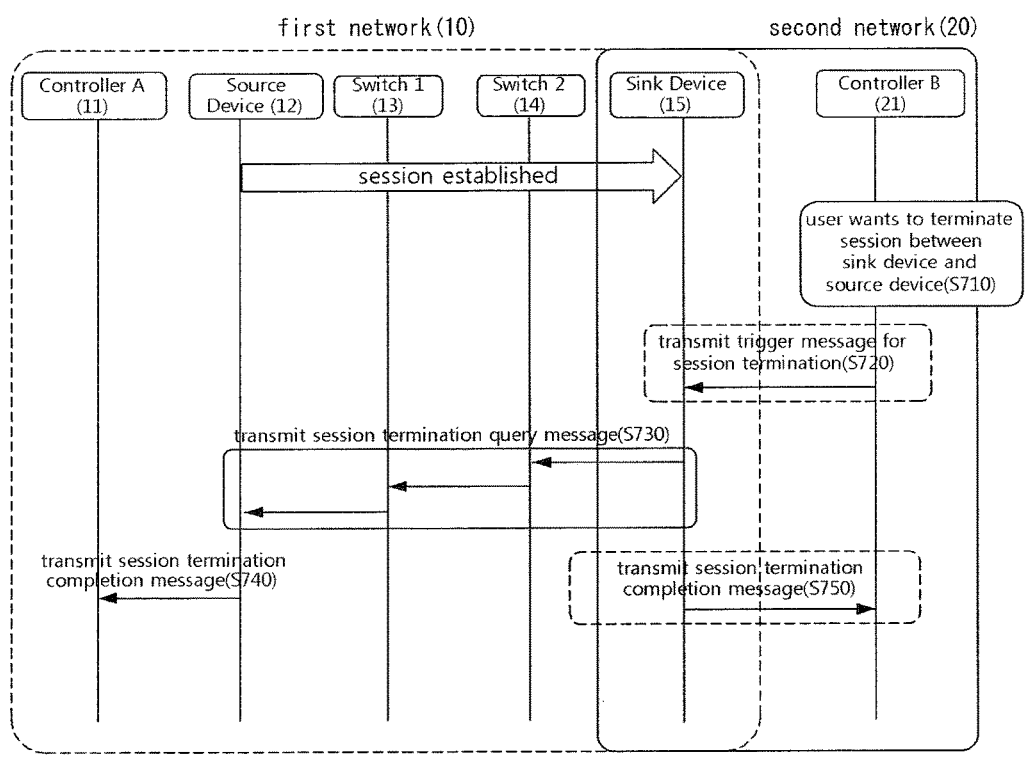

FIGS. 6 and 7 are flow charts illustrating a process of terminating a session between devices in a plurality of networks according to an embodiment to which the present invention is applied.

In FIG. 6, a case where the controller A 11, the source device 12, the switch 1 13, the switch 2 14, and the sink device 15 are connected in the first network 10, and the controller B 21 is included in the second network 20 is assumed.

In this embodiment, it is assumed that a session is created between the source device 12 and the sink device 15. Here, various embodiments applied to the present disclosure may be applied to the session creation process.

When a user wants to terminate the session between the source device 12 and the sink device 15 (S610), the user cannot request a session termination using the controller B 21 present in the network (the second network 20) other than the network (the first network 10) to which the sink device 15 belongs. Also, the controller A 11 present in the first network 10 may transmit an unnecessary message.

The sink device 15 may transmit a session termination query message to the switch devices included in the same network, and here, the session termination query message may be transmitted to the source device 12 through a routing path (S620). In this case, a session resource of a device on the routing path may be released.

Upon receiving the session termination query message, the source device 12 may transmit a session creation completion message to the controller B 21 present in the second network 20.

In FIG. 7, a case where the controller A 11, the source device 12, the switch 1 13, the switch 2 14, and the sink device 15 are connected in the first network 10, and the controller B 21 and the sink device 15 are connected in the network 20 is assumed. Also, in this embodiment, it is assumed that a session is created between the source device 12 and the sink device 15.

When the user wants to terminate the session between the source device 12 and the sink device 15 (S710), the controller B 21 may transmit a trigger message for a session termination to the sink device 15 such that a session may be created between the sink device 15 discovered in the second network 20 and the source device 12 present in the first network 10 (S720). Here, the trigger message represents a signal for initiating a specific operation, and the trigger message for a session termination represents a signal for initiating a session termination between the devices. Here, the sink device 15 supports protocols of both the first network 10 and the second network 20, and serves as a proxy.

Upon receiving the trigger message, the sink device 15 may transmit a session termination query message to the source device 12 present in the second network 20 (S730). Here, the sink device 15 may transmit the session termination query message to the switch devices (switch device 1 13 and the switch device 2 14) included in the same network, and here, the session termination query message may be transmitted to the source device 12 through a routing path.

The source device 12 may transmit a session termination completion message to the controller A 11 included in the first network 10 (S740), and the sink device 15 may transmit the session termination completion message to the controller B 21 included in the second network 20 (S750).

In this manner, since the controller B 21 present in the second network 20 transmits the trigger message for the session termination to the sink device 15 to allow the sink device 15 to serve as a proxy, the sink device 15 may participate in the session termination with the device present in the first network 10.

Figure 8:
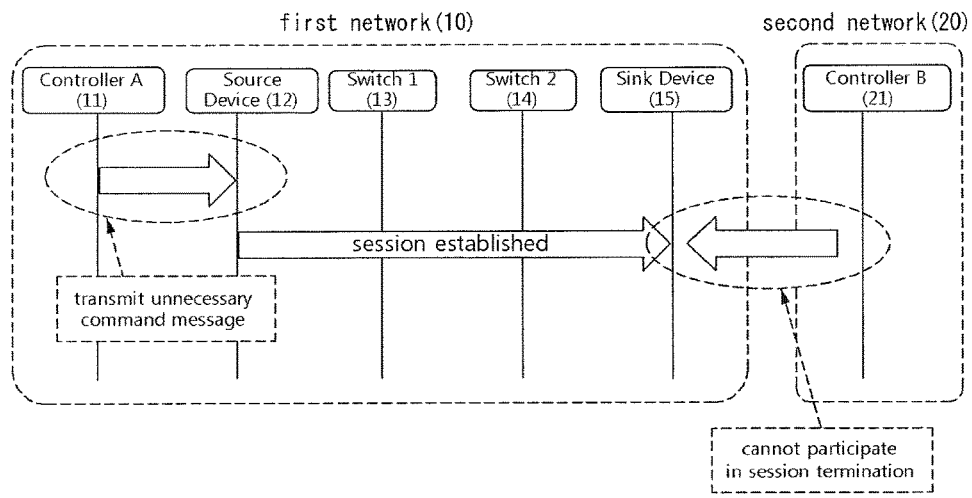
FIGS. 8 and 9 are flow charts illustrating a process of obtaining session status information after a session is created between devices on a plurality of networks according to an embodiment to which the present invention is applied.
Figure 9:
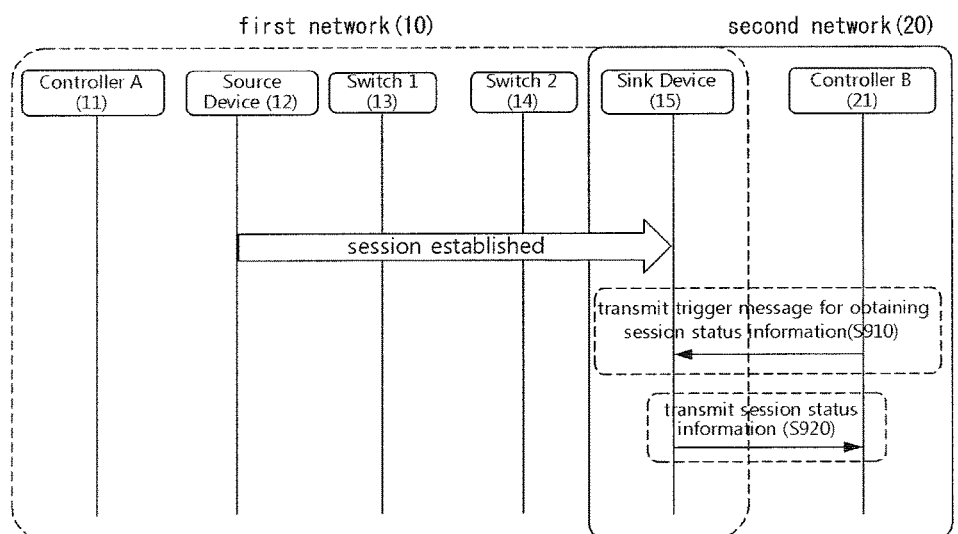

FIGS. 8 and 9 are flow charts illustrating a process of obtaining session status information after a session is created between devices on a plurality of networks according to an embodiment to which the present invention is applied.

In FIG. 8, a case where the controller A 11, the source device 12, the switch 1 13, the switch 2 14, and the sink device 15 are connected in the first network 10, and the controller B 21 is included in the second network 20 is assumed. Also, in this embodiment, it is assumed that a session is created between the source device 12 and the sink device 15.

When the user wants to obtain session status information of the source device 12 or the sink device 15, the user cannot request a session status information obtainment from any device present in the first network by using the controller B 21 present in the second network 20. Also, the controller A 11 present in the first network 10 may transmit an unnecessary message. Thus, by allowing a device present in the first network 10 to serve as a proxy, a session status information obtainment may be requested.

In FIG. 9, a case where the controller A 11, the source device 12, the switch 1 13, the switch 2 14, and the sink device 15 are connected in the first network 10, and the controller B 21 and the sink device 15 are connected in the second network 20 is assumed. Also, in this embodiment, it is assumed that a session is created between the source device 12 and the sink device 15.

In order to obtain status information of a session created between the sink device 15 discovered in the second network 20 and the source device 12 present in the first network 10, the controller B 21 may transmit a trigger message for obtaining session status information to the sink device 15 (S910). Here, the trigger message represents a signal for initiating a specific operation, and the trigger message for obtaining the session status information represents a signal for obtaining status information of the session created between the devices. Here, the sink device 15 supports protocols of both the first network 10 and the second network 20 and serves as a proxy.

Upon receiving the trigger message, the sink device 15 may transmit session status information to the controller B 21 included in the second network 20, in response (S920).

In this manner, since the controller B 21 present in the second network 20 transmits the trigger message for obtaining the session status information to the sink device 15 to allow the sink device 15 to serve as a proxy, status information of the session created between the sink device 15 and the source device 12 may be obtained.

Figure 10:
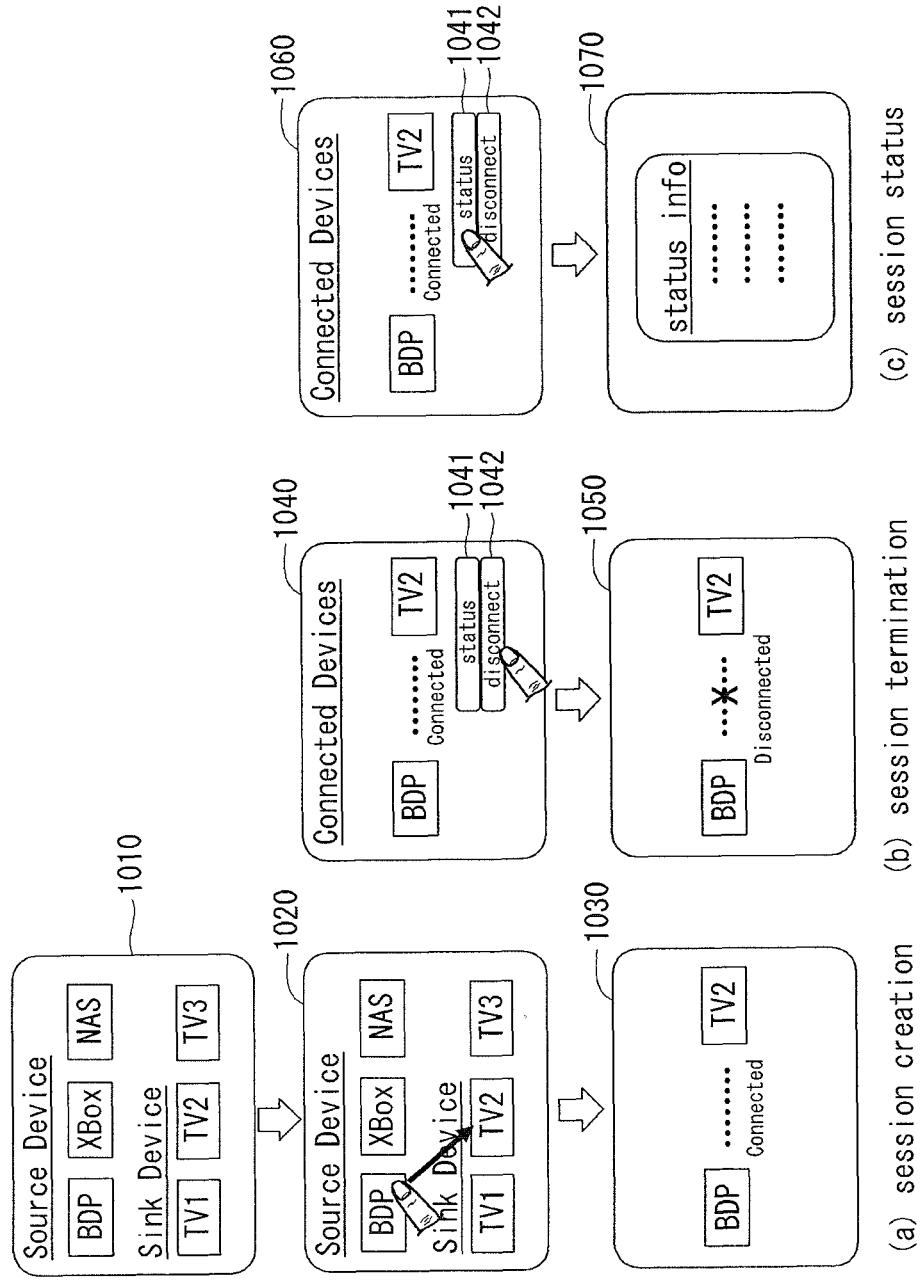

FIG. 10 is a view illustrating user interfaces for managing a session between devices according to an embodiment to which the present invention is applied, wherein FIG. 10(*a*) illustrates a user interface for creating a session between devices, FIG. 10(*b*) illustrates a user interface for terminating a session between devices, and FIG. 10(*c*) illustrates a user interface for obtaining session status information after a session is created between devices.

Referring to FIG. 10(*a*), the user may check a list of devices currently connected to a network through a screen of the sink device, the controller, or a third device. For example, in the case of FIG. 10(*a*), a Blu-ray disc player (BDP), an Xbox game player, and a network attached storage (NAS) may be output as examples of source devices, and TV1, TV2, and TV3 may be output as examples of sink devices (1010).

Here, in a case where the user wants to create a session between the BDP among the source devices and the TV2 among the sink devices, the user may click the BDP by using a controller and drag the BDP to the TV2 (1020) to create a session between the BDP and the TV2. When the session creation between the BDP and the TV2 is completed, the display device may output a message indicating that the session creation between the BDP and the TV2 has been completed (1030).

After the session is created, the user may freely control the created session. For example, the display device may provide a status information icon 1041 allowing the user to view a status of the created session, and provide a session termination icon 1042 for terminating the created session (1040).

Referring to FIG. 10(*b*), in a case where the user wants to terminate the created session, the user may terminate the session by clicking the session termination icon 1042 by using the controller (1040). That is, the display device may receive a session termination signal from the user or from the outside. In a case where the session termination signal is received from the user, the display device may output a message indicating that the session between the BDP and the TV2 has been terminated (1050).

Meanwhile, referring to FIG. 10(*c*), in a case where the user wants to obtain status information of the created session, the user may obtain the session status information by clicking the status information icon 1042 by using the controller (1060). That is, the display device may receive a signal for requesting a session status information obtainment from the user or from the outside. In a case where the signal for requesting the session status information obtainment is received from the user, the display device may output information of the session status between the BDP and the TV2 (1070).

Figure 11:
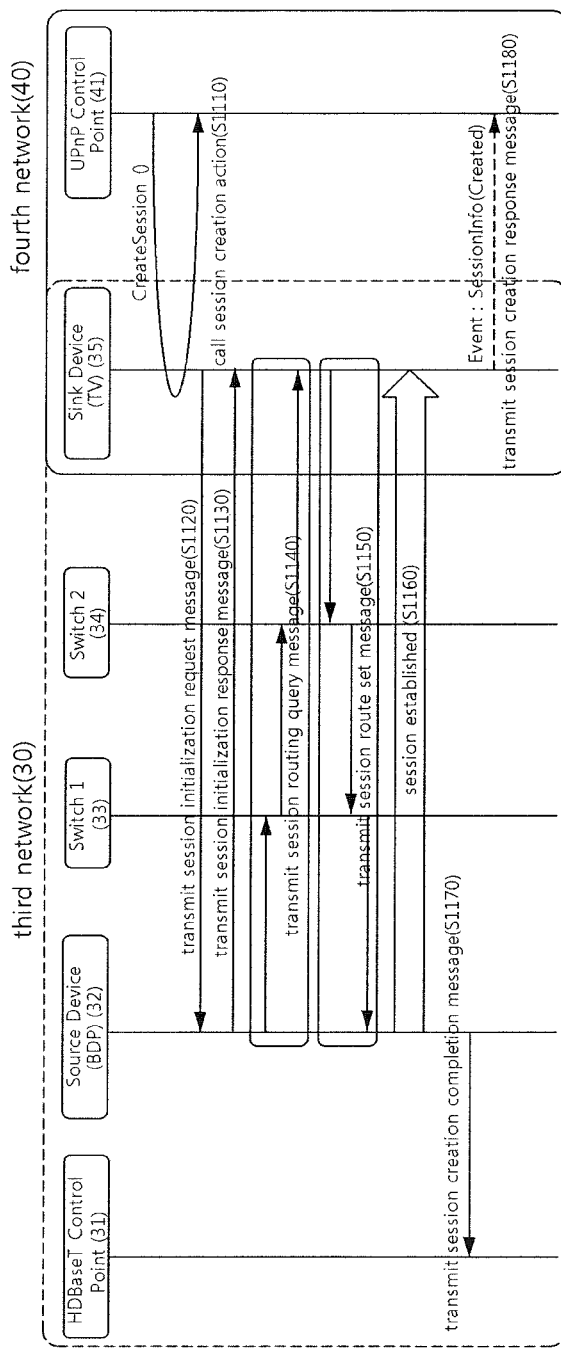
Figure 12:
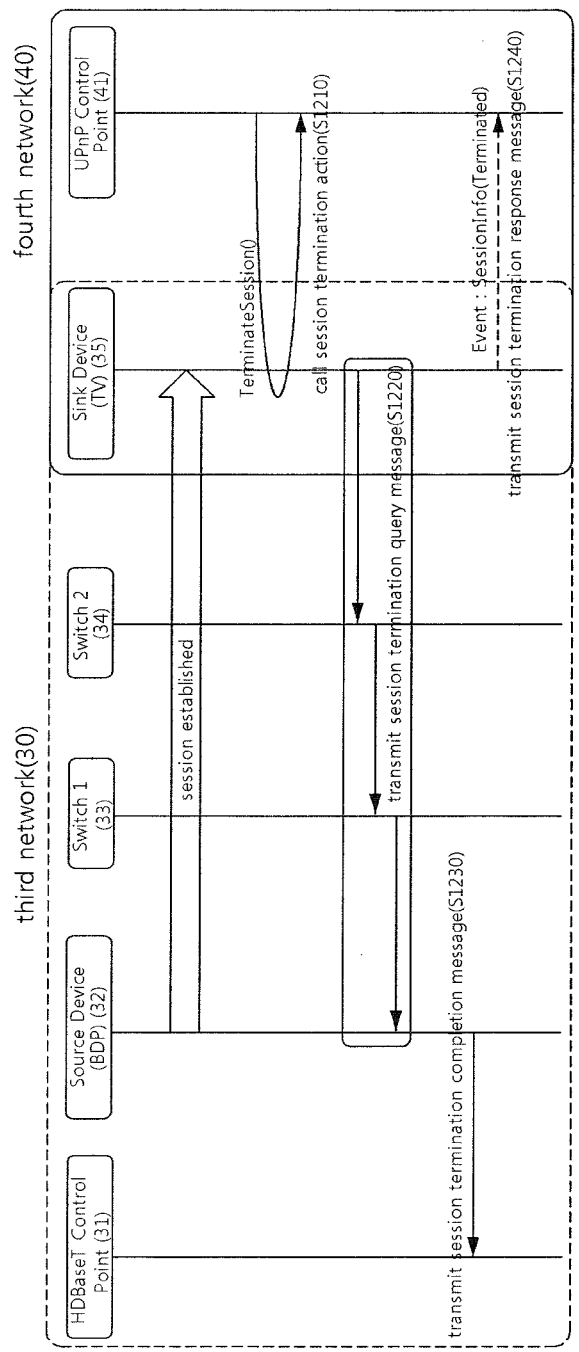
Figure 13:
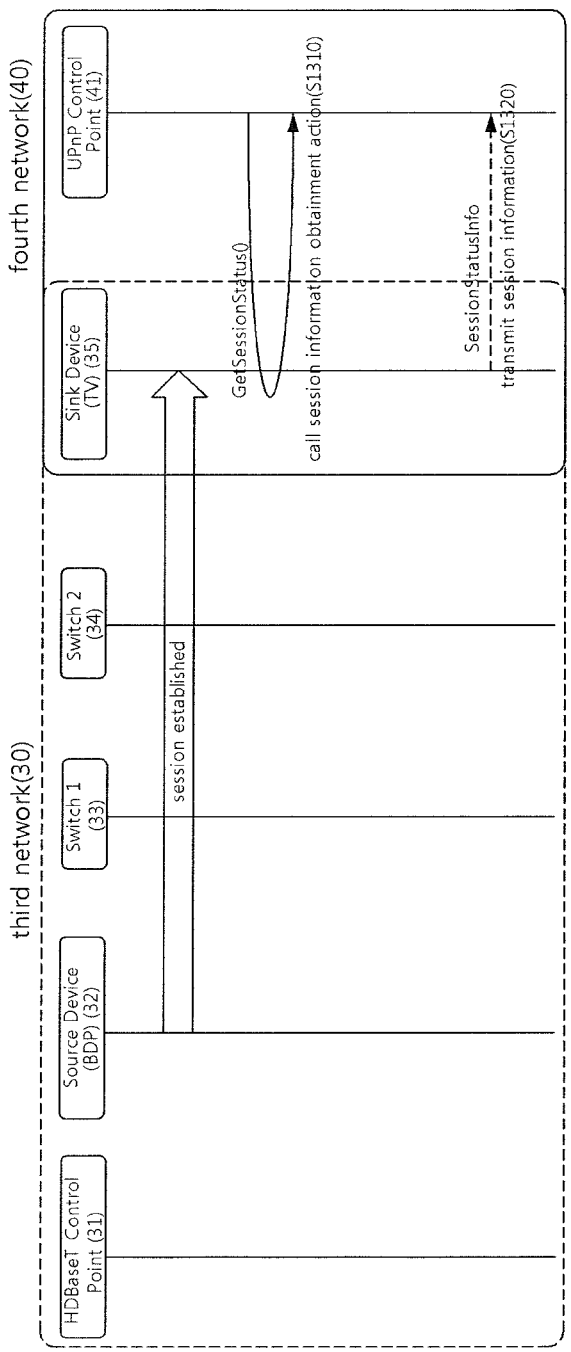

FIGS. 11 through 13 are views illustrating a method for controlling a session between devices on a plurality of networks supporting different protocols according to embodiments to which the present invention is applied, wherein FIG. 11 illustrates a process of creating a session between devices, FIG. 12 illustrates a process of terminating a session between devices, and FIG. 13 illustrates a process of obtaining session status information after a session is created between devices.

In FIGS. 11 through 13, it is assumed that the first network 10 represents an HDBaseT network and uses a SOAP (Simple Object Access Protocol) and a GENA (General Event Notification Architecture), and the second network 20 represents a UPNP (Universal Plug & Play) network and uses an HTTP (hypertext transfer protocol).

However, as described above, the network system to which the present invention is applied may form a plurality of networks supporting different protocols, and each network may support at least one of various protocols. For example, a third network 30 and a fourth network 40 may be any one of a UPNP (Universal Plug & Play) network, a HPnP (HDBaseT Plug & Play) network, and a HDBaseT network. Also, the third network 30 and the fourth network 40 may support at least one of a TCP/IP (Transmission Control Protocol/Internet Protocol), an SSDP (Simple Service Discovery Protocol), an SOAP (Simple Object Access Protocol), a GENA (General Event Notification Architecture), an HTTP (hypertext transfer protocol), and an HDCMP (HDBaseT Control and Management Protocol), and a message transmitted and received between devices may be expressed as a plain type or an XML (eXtensible Markup Language) type.

FIGS. 11 through 13 merely illustrate an embodiment of the present invention, and may also be applied to other network or other protocol.

In FIG. 11, a case where an HDBaseT control point 31, a source device 32, a switch 1 33, a switch 2 34, and a sink device 35 are connected in the third network 30 and a UPnP control point 41 and the sink device 35 are connected in the fourth network 40 is assumed. That is, in the embodiment of FIG. 11, the sink device 35 is a subject for creating a session and serves as a proxy and only the sink device 35 in the third network 30 is a device to which UPnP is applied.

The UPnP control point 41 may call a session creation action (CreateSession( )) from the sink device 35 serving as a proxy (S1110).

On the basis of the session creation action (CreateSession( )), the sink device 15 may transmit a session initialization request message to the discovered source device 32 (S1120). Here, the session initialization request message represents a message for requesting start of a session creation. The source device 32 may transmit a session initialization response message to the sink device (S1130). Here, the session initialization response message represents a response message with respect to the session initialization request message.

In order to select an optimal path candidate group for reaching the sink device 35, the source device 32 may transmit a session route query message (S1140). Here, the session route query message represents a message for requesting selection of a session path. The session route query message may be transmitted to the sink device 35 through the switch 1 33 and the switch 2 34.

Upon receiving the session route query message, the sink device 35 may select an optimal path and transmit a session route set message to the source device 32 (S1150). Here, the session route set message represents a message for setting a session path.

A session is created through this process (S1160), and when the session creation is completed, the source device 32 may transmit data to the sink device 35. The sink device 35 transmits a session creation completion message to the HDBaseT control point 31 included in the third network 30 (S1170), and the sink device 35 may transmit a session creation response message to the UPnP control point 41 (S1180). Here, the session creation response message may represents a response message with respect to the session creation action or may represent a response message with respect to the session creation completion. Also, the session creation response message may include at least one of session identification information and session status information.

During the foregoing process, the sink device 35 may transmit and receive a message using the HDBaseT protocol to and from the source device 32, and transmit and receive a message using the HTTP protocol to and from the control point 41.

In another embodiment to which the present invention is applied, the contents of FIG. 11 may also be similarly applied even to a case where the HDBaseT control point 31, the source device 32, the switch 1 33, the switch 2 34, and the sink device 35 are connected in the third network 30 and the UPnP control point 41, the source device 32, the switch 1 33, the switch 2 34, and the sink device 35 are connected in the fourth network 40, that is, even to a case where the sink device 35 is a subject for creating a session but does not serve as a proxy. For example, it may be a case where every device is a device to which UPnP is applied.

In another embodiment to which the present invention is applied, the contents of FIG. 11 may also be similarly applied to a case where the HDBaseT control point 31, the source device 32, the switch 1 33, the switch 2 34, and the sink device 35 are connected in the third network 30 and the UPnP control point 41, the switch 2 34, and the sink device 35 are connected in the fourth network 40, that is, to a case where the switch 2 34 is a subject for creating a session and serves as a proxy. For example, it may be a case where only the switch 2 34 is a device to which UPnP is applied.

In another embodiment to which the present invention is applied, the contents of FIG. 11 may also be similarly applied even to a case where the HDBaseT control point 31, the source device 32, the switch 1 33, the switch 2 34, and the sink device 35 are connected in the third network 30 and the UPnP control point 41, the source device 32, the switch 1 33, the switch 2 34, and the sink device 35 are connected in the fourth network 40, that is, even to a case where the switch 2 34 is a subject for creating a session but does not serve as a proxy. For example, it may be a case where every device is a device to which UPnP is applied.

In FIG. 12, a case where the HDBaseT control point 31, the source device 32, the switch 1 33, the switch 2 34, and the sink device 35 are connected in the third network 30 and the UPnP control point 41 and the sink device 35 are connected in the fourth network 40 is assumed. That is, in the embodiment of FIG. 12, the UPnP control point 41 requests a session termination from the sink device 35.

In this embodiment, it is assumed that a session is created between the source device 32 and the sink device 35. Here, various embodiments applied to the present disclosure may be applied to the session creation process.

When the user wants to terminate the session between the source device 32 and the sink device 35 (S610), the UPnP control point 41 may request a session termination action (TerminateSession( )) from the sink device 35 (S1210).

Upon receiving the request for the session termination action (TerminateSession( )), the sink device 35 may transmit the session termination query message to the source device 32 by using the HDBaseT protocol (S1220).

Here, the sink device 35 may transmit the session termination query message to the switch devices included in the same network, and the session termination query message may be transmitted to the source device 32 through a routing path.

Upon receiving the session termination query message, the source device 32 may transmit a session termination completion message to the HDBaseT control point 31 included in the third network 30 (S1230). The sink device 35 may transmit a session termination response message to the UPnP control point 41 (S124). Here, the session termination response message may represent a response message with respect to the session termination action or may represent a response message with respect to the session termination completion. The session termination response message may include at least one of information of a device for which a session has been created or terminated, session identification information, and a response code.

In FIG. 13, a case where the HDBaseT control point 31, the source device 32, the switch 1 33, the switch 2 34, and the sink device 35 are connected in the third network 30 and the UPnP control point 41 and the sink device 35 are connected in the fourth network 40 is assumed. That is, in the embodiment of FIG. 13, the UPnP control point 41 requests a session status information obtainment from the sink device 35.

In this embodiment, it is assumed that a session is created between the source device 32 and the sink device 35. Here, various embodiments applied to the present disclosure may be applied to the session creation process.

When the user wants to obtain session status information of the session created between the source device 32 and the sink device 35, the UPnP control point 41 may request a session status information obtaining action (GetSessionStatus( )) from the sink device 35 (S1310).

Upon receiving the request for the session status information obtaining action (GetSessionStatus( )), the sink device 35 may transmit session status information to the UPnP control point 41 (S1320). Here, the session status information represents information indicating a status of the created session, and may include, for example, session descriptor information.

Figure 14:
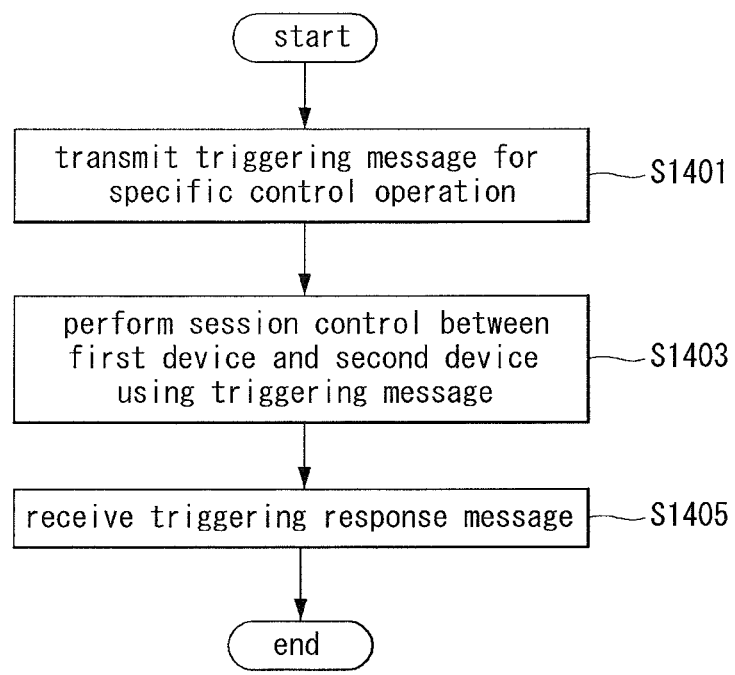
FIG. 14 is a flow chart illustrating a process of controlling a session between devices according to another embodiment to which the present invention is applied.

FIG. 14 is a flow chart illustrating a process of controlling a session between devices according to another embodiment to which the present invention is applied.

The controller may perform a session control on a session partner device. Here, the session partner device represents a device in a session to be created or in a created session. In order for the controller to transmit a trigger message to the session partner device, the session partner device needs to show itself or needs to be discovered in a network. An HPnP enabled device may process a session control request message for performing a session control using a first protocol, and a session control message may be received using a second protocol. Here, the session control may include a session creation, a session termination, and a session status information obtainment.

When the session control is completed, the HPnP enabled device may transmit a session control response message to the controller. Here, the session control response message may represent a message for indicating a session control result, and a header of the session control response message may include a result code and payload thereof may include a return value.

When the session control is successful, the session control response message may include a result code indicating a success of the session control and a corresponding return value, and when the session control fails, the session control response message may include a result code indicating failure of the session control and a return value corresponding to a failure reason.

In an embodiment to which the present invention is applied, a third device serving as a proxy may transmit a triggering message for a specific control operation to the first device (S1401). Here, the triggering message for a specific control operation may be transmitted using the first protocol (for example, HD-CMP), and the third device may be a switch device 1 and the first device may be a source device. However, this is merely an embodiment, and other protocol may be applied or other device in the network may be applied.

On the basis of the received triggering message for a specific control operation, a session control between the first device and the second device may be performed (S1403). Here, the second device may be a switch device or a sink device. For example, when the first device (source device) is connected to a non-HPnP enabled device or the third device (switch device 1) and the second device is an HPnP enabled device, the second device may be a sink device. In this case, a session is created between the first device (source device) and the second device (sink device).

In another example, when the first device (source device) is connected to a non-HPnP enabled device or the third device (switch device 1) and the second device is a legacy device not supporting the HDBaseT, the second device may be a switch device 2. In this case, a session is created between the first device (source device) and the second device (switch device 2).

After the session creation is completed, the third device may receive a triggering response message from the first device (source device) (S1405).

Through the foregoing device, a session may be created through the connection with a device which does not belong to a network, and data may be transmitted through the session creation.

Figure 15:
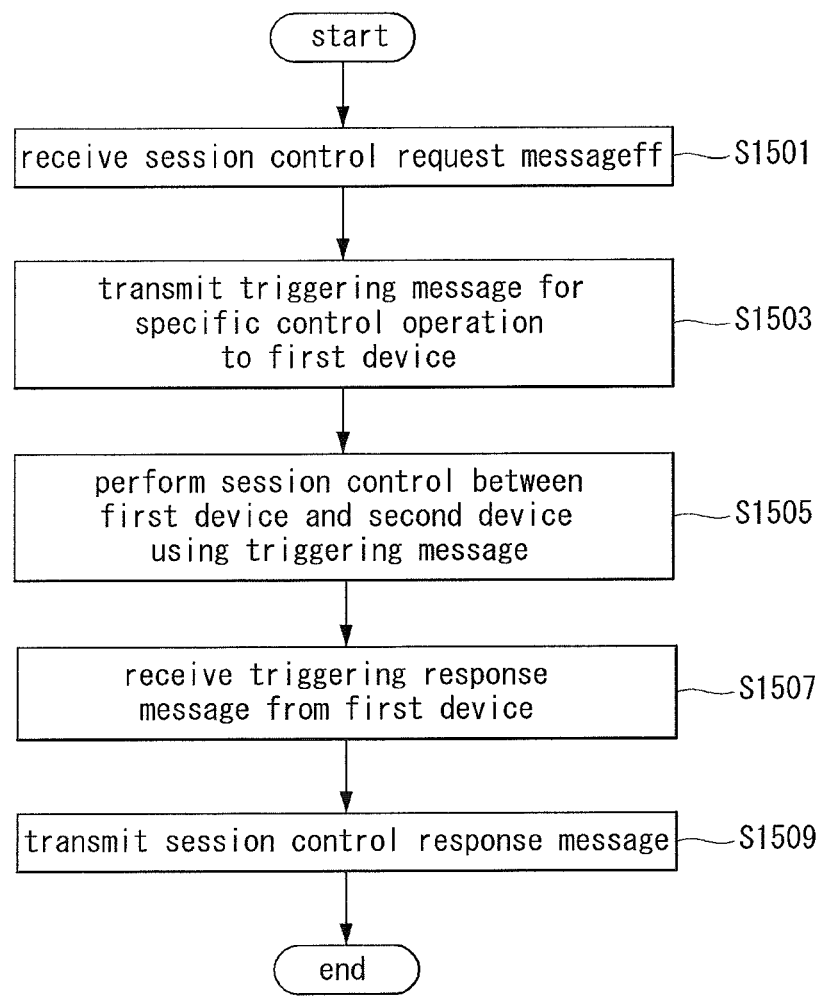
FIG. 15 is a flow chart illustrating a process of controlling a session between devices on a plurality of networks according to an embodiment to which the present invention is applied.

FIG. 15 is a flow chart illustrating a process of controlling a session between devices on a plurality of networks according to an embodiment to which the present invention is applied.

In an embodiment to which the present invention is applied, the third device serving as a proxy may receive a session control request message from the controller (S1501). Here, the session control request message may represent a message for requesting a session control, and the session control may include a session creation, a session termination, and a session obtainment.

Upon receiving the session control request message, the third device may transmit a triggering message for a specific control operation to the first device (S1503). Here, the triggering message represents a signal for initiating a specific operation, and the triggering message for a specific control operation represents a signal for controlling a session between devices.

On the basis of the received triggering message for a specific control operation, a session control between the first device and the second device may be performed (S1505). After the session creation is completed, the third device may receive a triggering response message from the first device (S1507). Here, the triggering response message indicates a result with respect to the triggering message.

The third device may transmit a session control response message to the controller (S1509). Here, the session control response message may represent a response with respect to the session control request message or a response with respect to the triggering message.

Figure 16:
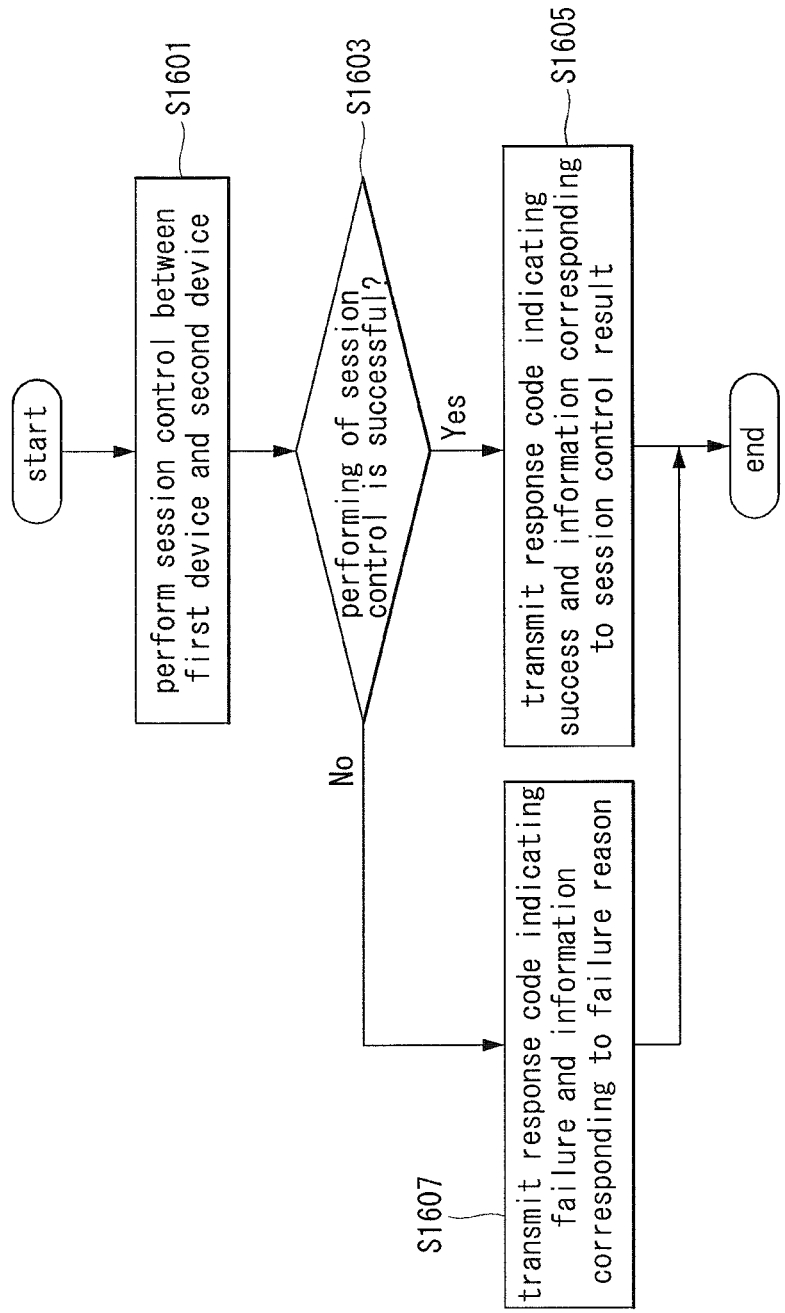
FIG. 16 is a flow chart illustrating a process of controlling a session between devices according to another embodiment to which the present invention is applied.

FIG. 16 is a flow chart illustrating a process of controlling a session between devices according to another embodiment to which the present invention is applied.

The network system to which the present invention is applied may form a plurality of networks supporting different protocols, and each network may support at least one of various protocols.

A session control may be performed between session partner devices, for example, a first device (source device) and a second device (sink device or switch device), in the network system (S1601).

When the session control is completed, the first device (source device) may transmit a session control response message to the second device (sink device or switch device). Also, the second device (sink device or switch device) may transmit a session control response message to the controller. Here, a transmitted session control result message may differ according to results of performing the session control (S1603).

When the session control is successful, the session control response message may include a result code indicating a success of the session control and information corresponding to the session control result (S1605), and when the session control fails, the session control response message may include a result code indicating failure of the session control and information corresponding to a failure reason (S1607).

FIGS. 17 through 22 are flow charts illustrating various methods of creating a session between devices on a plurality of networks according to embodiments to which the present invention is applied.

In FIGS. 17 through 22, it is assumed that a fifth network 50 represents an HDBaseT network and uses an HD-CMP (HDBaseT Control and Management Protocol), and a sixth network 60 represents an HPnP (HDBaseT Plug & Play) network and uses an HTTP (hypertext transfer protocol).

However, as described above, the network system to which the present invention is applied may form a plurality of networks, an each network may support at least one of various protocols. For example, the fifth network 50 and the sixth network 60 may be any one of a universal plug & play (UPnP) network an HDBaseT plug & plan (HPnP) network, and an HDBaseT network. Also, the fifth network 50 and the sixth network 60 may support at least one of a TCP/IP (Transmission Control Protocol/Internet Protocol), an SSDP (Simple Service Discovery Protocol), an SOAP (Simple Object Access Protocol), a GENA (General Event Notification Architecture), an HTTP (hypertext transfer protocol), and an HD-CMP (HDBaseT Control and Management Protocol), and a message transmitted and received between devices may be expressed as a plain type or an XML (eXtensible Markup Language) type.

Figure 17:
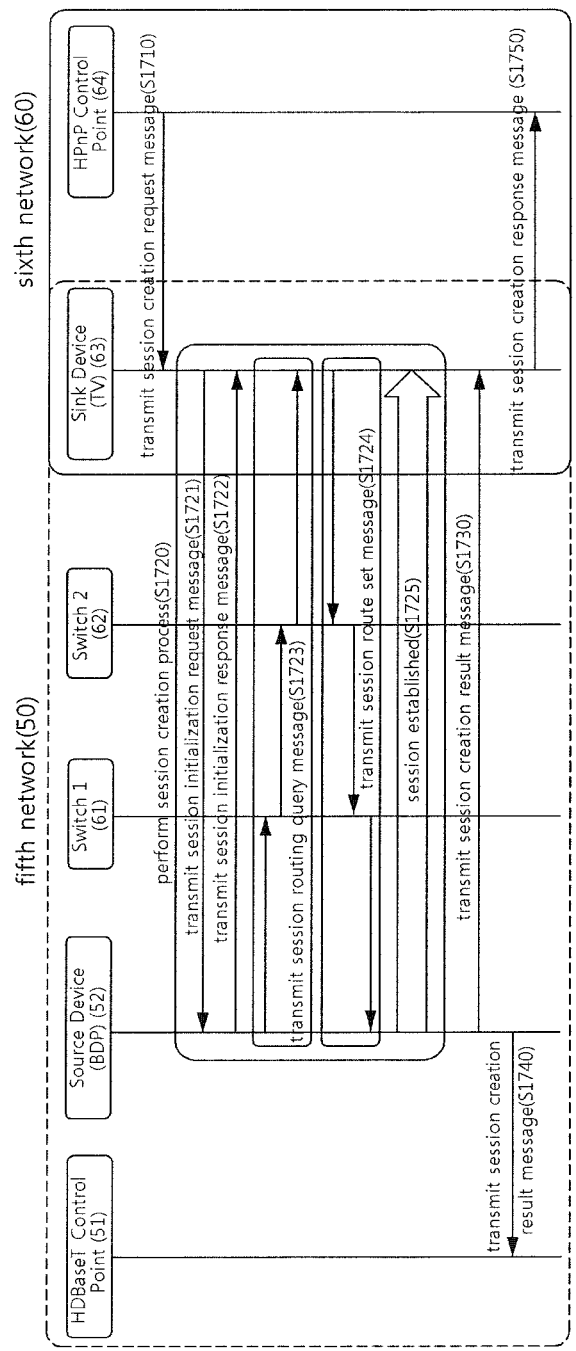
FIGS. 17 through 22 are flow charts illustrating various methods of creating a session between devices on a plurality of networks according to embodiments to which the present invention is applied.

In FIG. 17, a case where an HDBaseT control point 51, a source device 52, a switch 1 61, a switch 2 62, and a sink device 63 are connected in the fifth network 50, and an HPnP control point 64 and the sink device 63 are connected in the sixth network 60 is assumed. That is, in the embodiment of FIG. 17, the sink device 63 is a subject for creating a session and serves as a proxy and only the sink device 35 is a device to which HPnP is applied in the fifth network.

The HPnP control point 64 may transmit a session creation request message to the sink device 63 serving as a proxy (S1710). Here, the session creation request message may represent a message for triggering a session creation between the source device 52 and the sink device 63, and include identification information and control URL information of the source device 52 as a target of a session creation and the sink device 63. The session creation request message may be transmitted in an HTTP POST manner using the control URL information. For example, the sink device 63 may correspond to the control URL information.

On the basis of the session creation request message (for example, identification information of the source device 52 and the sink device 63), a session creation process may be performed between the source device 52 and the sink device 63 (S1720). In detail, the sink device 63 may transmit a session initialization request message to the discovered source device 52 (S1721). Here, the session initialization request message represents a message for requesting start of a session creation. The source device 52 may transmit a session initialization response message to the sink device 63 (S1722). Here, the session initialization response message represents a response message with respect to the session initialization request message.

In order to select an optimal path candidate group for reaching the sink device 63, the source device 52 may transmit a session route query message (S1723). Here, the session route query message represents a message for requesting selection of a session path. The session route query message may be transmitted to the sink device 63 through the switch 1 61 and the switch 2 62.

Upon receiving the session route query message, the sink device 63 may select an optimal path and transmit a session route set message to the source device 52 (S1724). Here, the session route set message represents a message for setting a session path.

A session is created through this process (S1725), and when the session creation is completed, the source device 52 may transmit data to the sink device 63. The source device 52 may transmit a session creation result message to the sink device 63 and the HDBaseT control point 51 included in the fifth network 50 (S1730, S1740). Here, the session creation result message may be transmitted in an HD-CMP manner, and a transmitted session creation result message may differ according to the session creation results. For example, when the session control is successful, the session creation result message may include a result code indicating a success of the session control and information corresponding to the session creation result, and when the session control fails, the session creation result message may include a result code indicating failure of the session creation and information corresponding to a failure reason.

The sink device 63 may transmit a session creation response message to the UPnP control point 64 (S1750). Here, the session creation response message may represent a response message with respect to the session creation action or may represent a response message with respect to the session creation completion. The session creation response message may be transmitted in an HTTP manner and may include at least one of session identification information and session status information.

During the foregoing process, the sink device 63 may transmit and receive a message to and from the source device 52 using the HDBaseT protocol, and transmit and receive a message to and from the HPnP control point 64 using the HTTP protocol.

Figure 18:
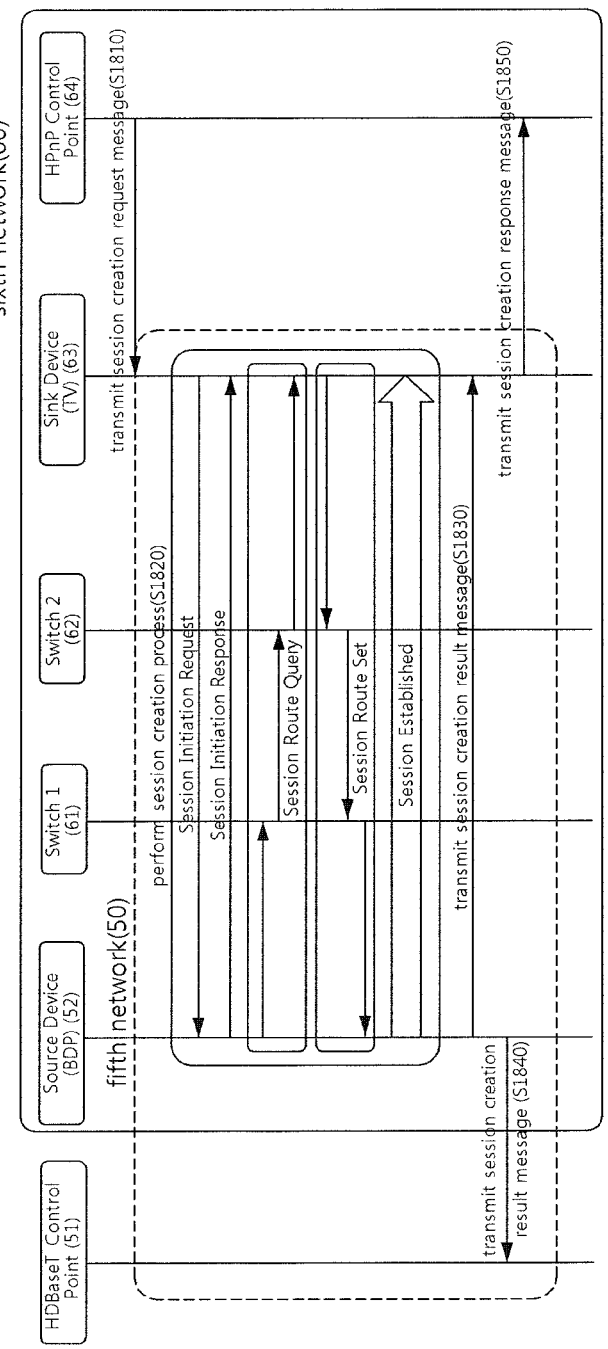

In FIG. 18, a case where the HDBaseT control point 51, the source device 52, the switch 1 61, the switch 2 62, and the sink device 63 are connected in the fifth network 50, and the HPnP control point 64, the source device 52, the switch 1 61, the switch 2 62, and the sink device 63 are connected in the sixth network 60 is assumed. That is, in the embodiment of FIG. 18, the sink device 63 is a subject for creating a session but does not serve as a proxy and HPnP is applied to every device.

The HPnP control point 64 may transmit a session creation request message to the sink device 63 (51810). Here, the session creation request message may represent a message for triggering a session creation between the source device and the sink device 63, and include identification information and control URL information of the source device 52 as a target of a session creation and the sink device 63. The session creation request message may be transmitted in an HTTP POST manner using the control URL information. For example, the sink device 63 may correspond to the control URL information.

On the basis of the session creation request message (for example, identification information of the source device 52 and the sink device 63), a session creation process may be performed between the source device 52 and the sink device 63 (S1820). Here, the session creation process (S1720) described above with reference to FIG. 17 may be applied to the session creation process (S1820).

When the session creation is completed, the source device 52 may transmit data to the sink device 63. The source device 52 may transmit a session creation result message to the sink device 63 (S1830). Here, the session creation result message may be transmitted in an HD-CMP manner, and the transmitted session creation result message may differ according to the session creation results. For example, when the session control is successful, the session creation result message may include a result code indicating a success of the session creation and information corresponding to the session creation result, and when the session control fails, the session creation result message may include a result code indicating failure of the session creation and information corresponding to a failure reason.

Meanwhile, when a legacy HDBaseT control point 51 not supporting HDBaseT exists, the source device 52 may transmit a session creation result message to the legacy HDBaseT control point 51 (S1840).

The sink device 63 may transmit a session creation response message to the HPnP control point 64 (S1850). Here, the session creation response message may represent a response message with respect to the session creation action or may represent a response message with respect to the session creation completion. The session creation response message may be transmitted in an HTTP manner and may include at least one of session identification information and session status information.

During the foregoing process, the sink device 63 may transmit and receive a message to and from the source device 52 using the HDBaseT protocol, and transmit and receive a message to and from the HPnP control point 64 using the HTTP protocol.

Figure 19:
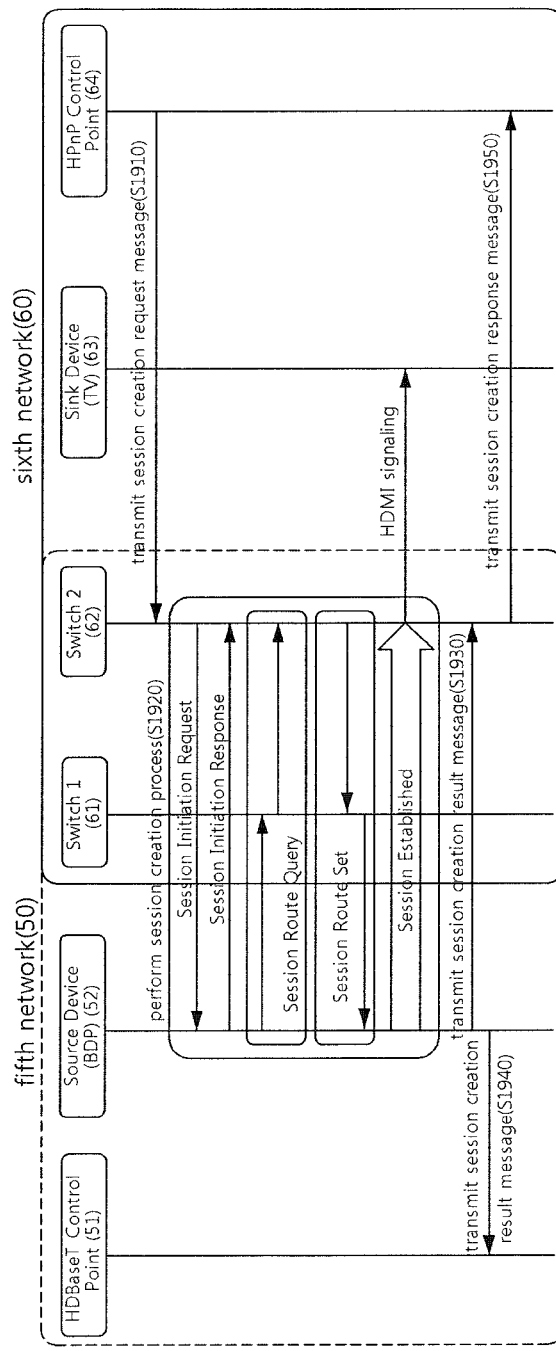

In FIG. 19, a case where the HDBaseT control point 51, the source device 52, the switch 1 61, and the switch 2 62 are connected in the fifth network 50, and the HPnP control point 64, the switch 1 61, the switch 2 62, and the sink device 63 are connected in the sixth network 60 is assumed. That is, in the embodiment of FIG. 19, the switch device is a subject for creating a session and serves as a proxy, and the sink device 63 represents a legacy sink device having HDMI and is connected to the switch 2 62 through the HDMI.

The HPnP control point 64 may transmit a session creation request message to the switch 2 62 (S1910). Here, the session creation request message may represent a message for triggering a session creation between the source device and the switch 2 62, and include identification information and control URL information of the source device 52 as a target of a session creation and the switch 2 62. The session creation request message may be transmitted in an HTTP POST manner using the control URL information. For example, the switch 2 62 may correspond to the control URL information.

On the basis of the session creation request message (for example, identification information of the source device 52 and the switch 2 62), a session creation process may be performed between the source device 52 and the switch 2 62 (S1920). Here, the session creation process described above with reference to FIG. 17 or 18 may be applied to the session creation process (S1920).

When the session creation is completed, the source device 52 may transmit data to the switch 2 62, and the switch 2 62 may transmit the data transmitted from the source device 52 to the sink device 63 through the HDMI.

Meanwhile, the source device 52 may transmit a session creation result message to the switch 2 62 (S1930). Also, in a case where the legacy HDBaseT control point 51 not supporting HDBaseT exists, the source device 52 may transmit the session creation result message to the legacy HDBaseT control point 51 (S1940).

The switch 2 62 may transmit a session creation response message to the HPnP control point 64 (S1950).

Figure 20:
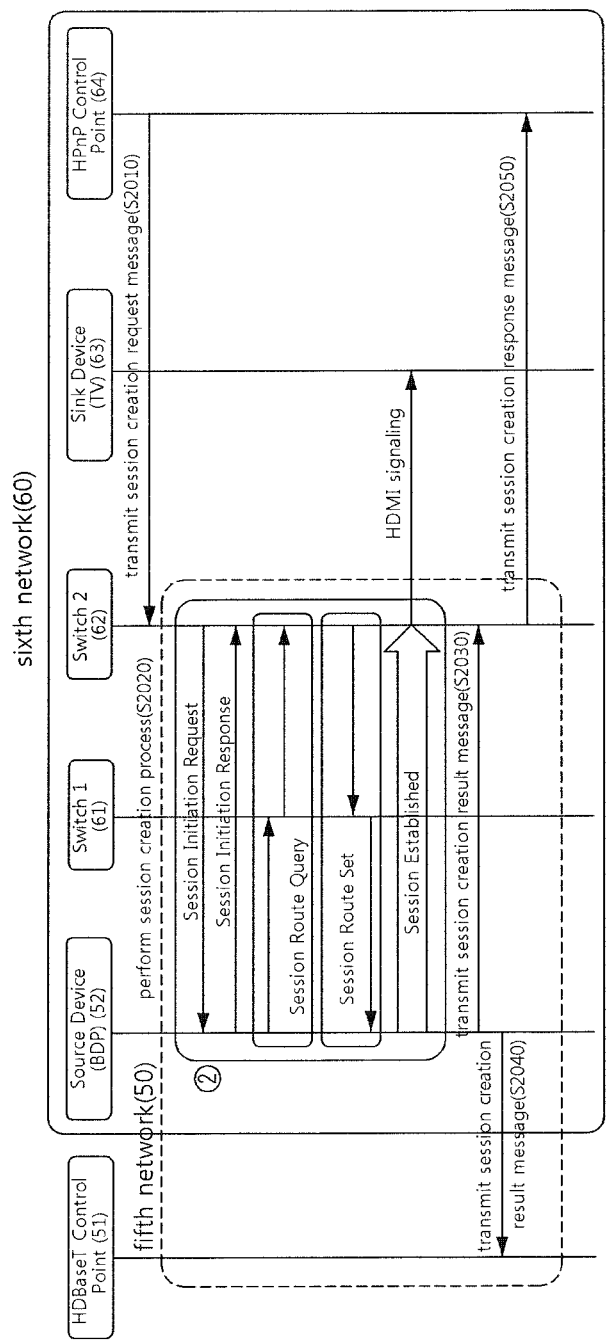

In FIG. 20, a case where the HDBaseT control point 51, the source device 52, the switch 1 61, and the switch 2 62 are connected in the fifth network 50, and the HPnP control point 64, the source device 52, the switch 1 61, the switch 62, and the sink device 63 are connected in the sixth network 60 is assumed. That is, in the embodiment of FIG. 20, the switch device is a subject for creating a session but does not serve as a proxy, and the sink device 63 represents a legacy sink device having HDMI and is connected to the switch 2 62 through the HDMI.

The HPnP control point 64 may transmit a session creation request message to the switch 2 62 (S2010). Here, the session creation request message may represent a message for triggering a session creation between the source device and the switch 2 62, and include identification information and control URL information of the source device 52 as a target of a session creation and the switch 2 62. The session creation request message may be transmitted in an HTTP POST manner using the control URL information. For example, the switch 2 62 may correspond to the control URL information.

On the basis of the session creation request message (for example, identification information of the source device 52 and the switch 2 62), a session creation process may be performed between the source device 52 and the switch 2 62 (S2020). Here, the session creation processes described above with reference to FIG. 17 through 19 may be applied to the session creation process (S2020).

When the session creation is completed, the source device 52 may transmit data to the switch 2 62, and the switch 2 62 may transmit the data transmitted from the source device 52 to the sink device 63 through the HDMI.

Meanwhile, the source device 52 may transmit a session creation result message to the switch 2 62 (S2030). Also, in a case where the legacy HDBaseT control point 51 not supporting HDBaseT exists, the source device 52 may transmit the session creation result message to the legacy HDBaseT control point 51 (S2040).

The switch 2 62 may transmit a session creation response message to the HPnP control point 64 (S2050).

Figure 21:
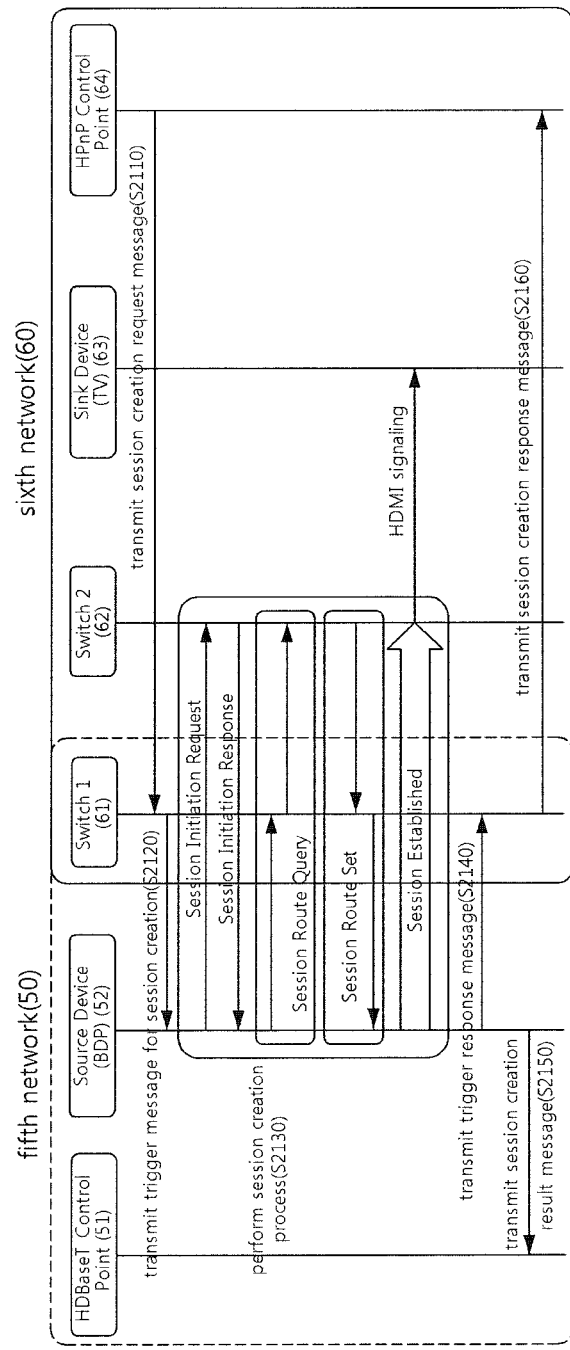

In FIG. 21, a case where the HDBaseT control point 51, the source device 52, and the switch 1 61 are connected in the fifth network 50, and the HPnP control point 64, the switch 1 61, the switch 2 62, and the sink device 63 are connected in the sixth network 60 is assumed. That is, in the embodiment of FIG. 21, the switch device is a subject for creating a session and serves as a proxy, and the source device 52, as an HDBaseT device not supporting HPnP, is connected to the switch 1 61. The switch 1 61 may expose the source device 52 to the sixth network 60 so as to be discovered by the HPnP control point 64.

Also, the sink device 63 represents a legacy sink device having HDMI, and is connected to the switch 2 62 through the HDMI. Thus, the switch 2 62 may transmit data (for example, multistream) transmitted from the source device 52 to the sink device 63 through the HDMI.

The HPnP control point 64 may transmit a session creation request message to the switch 1 61 (S2110). Here, the session creation request message may represent a message for triggering a session creation between the source device and the switch 2 62, and include identification information and control URL information of the source device 52 as a target of a session creation and the switch 2 62. The session creation request message may be transmitted in an HTTP POST manner using the control URL information. For example, the switch 1 61 may correspond to the control URL information.

Upon receiving the session creation request message, the switch 1 61 may transmit a trigger message for a session creation to the source device 52 (S2120). Here, the trigger message may represent a signal for initiating a specific operation, and the trigger message for a session generation represents a signal for creating a session between devices. Also, the trigger message may be transmitted using an HD-CMP.

On the basis of the session creation request message, a session creation process may be performed between the source device 52 and the switch 2 62 (S2130). Here, the session creation process described in the present disclosure may be applied to the session creation process (S2130).

When the session creation is completed, the source device 52 may transmit data to the switch 2 62, and the switch 2 62 may transmit the data transmitted from the source device 52 to the sink device 63 through the HDMI.

Meanwhile, the source device 52 may transmit a trigger response message to the switch 1 61 using the HD-CMP (S2140).

Also, in a case where a legacy HDBaseT control point 51 not supporting HDBaseT exists, the source device 52 may transmit a session creation result message to the legacy HDBaseT control point 51 (S2150).

The switch 2 62 may transmit a session creation response message to the HPnP control point 64 (S2160).

In this embodiment, repeated contents are not described, and details of other embodiment described in this disclosure may all be applied.

Figure 22:
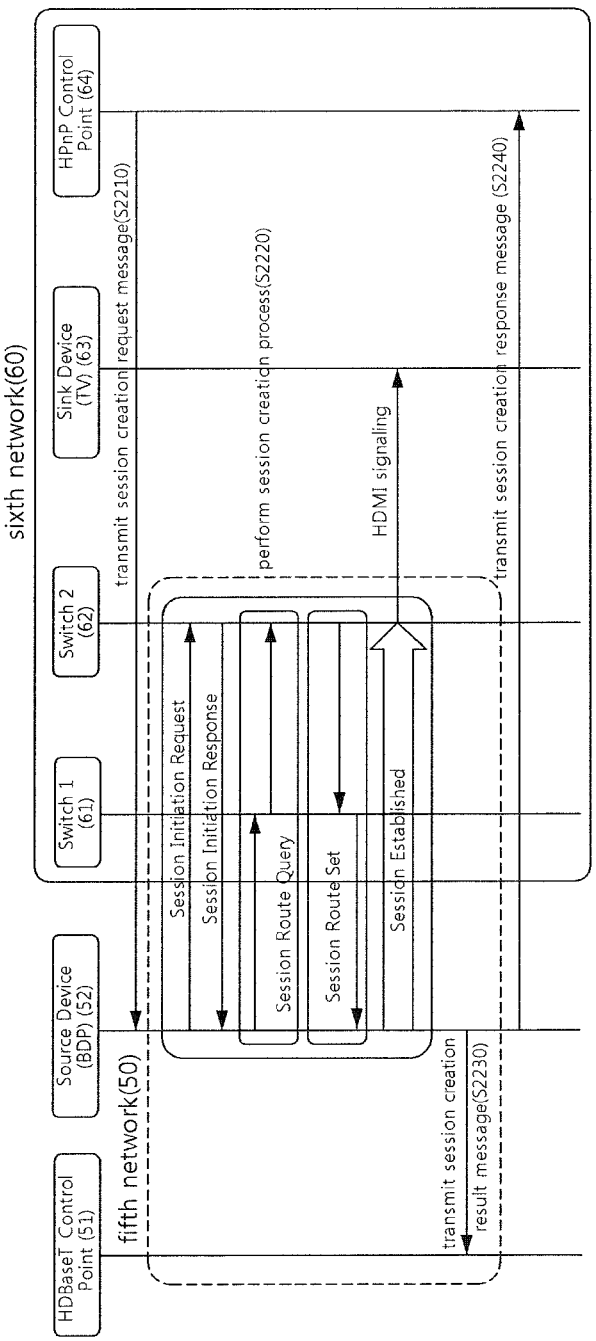

In FIG. 22, a case where the HDBaseT control point 51, the source device 52, the switch 1 61, and the switch 2 62 are connected in the fifth network 50, and the HPnP control point 64, the switch 1 61, the switch 2 62, and the sink device 63 are connected in the sixth network 60 is assumed. That is, in the embodiment of FIG. 22, the source device 62 is a subject for creating a session and the source device 52, as an HDBaseT device supporting HPnP, may be exposed to the sixth network 60 and discovered by the HPnP control point 64.

Also, the sink device 63 represents a legacy sink device having HDMI, and is connected to the switch 2 62 through the HDMI. Thus, the switch 2 62 may transmit data (for example, multistream) transmitted from the source device 52 to the sink device 63 through the HDMI.

The HPnP control point 64 may transmit a session creation request message to the source device 52 (S2210). Here, the session creation request message may represent a message for triggering a session creation between the source device 52 and the switch 2 62, and include identification information and control URL information of the source device 52 as a target of a session creation and the switch 2 62. The session creation request message may be transmitted in an HTTP POST manner using the control URL information. For example, the source device 52 may correspond to the control URL information.

On the basis of the session creation request message, a session creation process may be performed between the source device 52 and the switch 2 62 (S2220). Here, the session creation process described in the present disclosure may be applied to the session creation process (S2130).

When the session creation is completed, the source device 52 may transmit data to the switch 2 62, and the switch 2 62 may transmit the data transmitted from the source device 52 to the sink device 63 through the HDMI.

Meanwhile, when the legacy HDBaseT control point 51 not supporting HDBaseT exists, the source device 52 may transmit a session creation result message to the legacy HDBaseT control point 51 (S2230).

The source device 52 may transmit a session creation response message to the HPnP control point 64 (S2240).

In this embodiment, repeated contents are not described, and details of other embodiment described in this disclosure may all be applied.

FIG. 23 is a view illustrating embodiments to which the present invention is applied, wherein FIG. 23(*a*) illustrates a format of a session creation request message, FIG. 23(*b*) illustrates a text/plain type session creation request message, and FIG. 23(*c*) illustrates a text/xml type session creation request message.

Referring to FIG. 23(*a*), the session creation request message format 2310 may include a POST 2311, a HOST 2312, a CONTENT-LENGTH 2313, a CONTENT-TYPE 2314, and a BODY 2315. The session creation request message may be transmitted in an HTTP POST manner.

The POST 2311 represents a session control trigger URL, the HOST 2312 represents an IP address allocated to a device, the CONTENT-LENGTH 2313 represents a length of the BODY 2315, and the CONTENT-TYPE 2314 represents a text type of the BODY 2315.

For example, FIGS. 23(*b*) and 23(*c*) illustrate cases where the CONTENT-TYPE 2314 of the session creation request message format 2310 is a text/plain type 2331 to 2335 and a text/xml type 2351 to 2355, respectively.

When the CONTENT-TYPE 2314 is the text/plain type or the text/xml type, the BODY 2335 or 2355 may include a FirstPartnerTadaptorRef value and a SecondPartnerTadaptorRef value. Here, the FirstPartnerTadaptorRef and the SecondPartnerTadaptorRef indicate entity reference values of a first partner device and a second partner device as targets of a session creation.

FIG. 24 is a view illustrating embodiments to which the present invention is applied, wherein FIG. 24 (*a*) illustrates a format of a session creation response message, FIG. 24(*b*) illustrates a text/plain type session creation response message, and FIG. 24(*c*) illustrates a text/xml type session creation response message.

Referring to FIG. 24(*a*), a session creation response message format 2410 may include an HTTP version and result code 2411, a CONTENT-TYPE 2412, and a BODY 2413. The session creation response message may be transmitted in an HTTP manner.

The HTTP version is 1.1 and the result code represents 200 OK indicating that a session creation has been successful (2411). The CONTENT-TYPE 2412 represents a text type of the BODY 2413.

For example, FIGS. 24(*b*) and 24(*c*) illustrate cases where the CONTENT-TYPE 2412 of the session creation response message format 2410 is a text/plain type 2431 to 2433 and a text/xml type 2451 to 2453, respectively.

When the CONTENT-TYPE 2412 is the text/plain type or the text/xml type, the BODY 2433 or 2453 may include session identification information and status information. Here, the status information ("created") indicates that a session has been created FIG. 25 is a view illustrating other embodiments to which the present invention is applied, wherein FIG. 25(a) illustrates a format of a session creation request message, FIG. 25(b) illustrates a text/plain type session creation request message, and FIG. 25(c) illustrates a text/xml type session creation request message.

Referring to FIG. 25(a), the session creation request message format 2510 may include a POST 2511, a HOST 2512, a CONTENT-LENGTH 2513, a CONTENT-TYPE 2514, and a BODY 2515. The session creation request message may be transmitted in an HTTP POST manner.

The POST 2511 represents a session control trigger URL, the HOST 2512 represents an IP address allocated to a device, the CONTENT-LENGTH 2513 represents a length of the BODY 2515, and the CONTENT-TYPE 2514 represents a text type of the BODY 2515.

For example, FIGS. 25(b) and 25(c) illustrate cases where the CONTENT-TYPE 2514 of the session creation request message format 2510 is the text/plain type 2531 to 2535 and the text/xml type 2551 to 2555, respectively.

When the CONTENT-TYPE 2514 is the text/plain type or the text/xml type, the BODY 2535 or 2555 may include at least one of values among FirstPartnerDeviceID, FirstPartnerPortID, FirstPartnerTGroupID, FirstPartnerTAdpatorMask, SecondPartnerDeviceID, SecondPartnerPortID, and SecondPartnerTGroupID, SecondPartnerTAdpatorMask. Here, FirstPartnerDeviceID and SecondPartnerDeviceID represent device identification information of a first partner device and a second partner device as targets of a session generation, FirstPartnerPortID and SecondPartnerPortID represent group identification information of the first partner device and the second partner device, and FirstPartnerTAdpatorMask and SecondPartnerTAdpatorMask represent mask values of the first partner device and the second partner device.

FIG. 26 is a view illustrating other embodiments to which the present invention is applied, wherein FIG. 26(a) illustrates a format of a session creation response message when a session creation is successful, and FIG. 26(b) illustrates a session creation response message when a session creation fails.

Referring to FIG. 26(a), a session creation response message format 2610 when a session creation is successful may include an HTTP version and result code 2611, a CONTENT-TYPE 2612, and a BODY 2613. The session creation response message may be transmitted in an HTTP manner.

The HTTP version is 1.1, and the result code represents 200 OK indicating that the session creation has been successful (2611 or 2621). The CONTENT-TYPE 2612 or 2622 represents a text type of the BODY 2613 or 2623.

For example, referring to FIG. 26(a), the CONTENT-TYPE 2612 or 2622 represents the text/plain type 2621 to 2623.

When the CONTENT-TYPE 2612 or 2632 is the text/plain type, the BODY 2613 or 2623 may include session identification information and status information. Here, the status information ("created") represents that a session has been created.

Referring to FIG. 26(b), a session creation response message format 2630 when a session creation has failed may include an HTTP version and result code 2631, a CONTENT-TYPE 2632, and a BODY 2633. The session creation response message may be transmitted in an HTTP manner.

The HTTP version is 1.1 and the result code represents 503 indicating that a session creation has failed (2631 or 2641). The CONTENT-TYPE 2632 or 2642 represents a text type of the BODY 2633 or 2643.

For example, referring to FIG. 26(b), the CONTENT-TYPE 2632 or 2642 represents the text/plain type 2641 to 2643.

When the CONTENT-TYPE 2632 or 2642 is the text/plain type, the BODY 2633 or 2643 may include failure reason information.

FIGS. 27 through 35 are flow charts illustrating various methods of terminating a session between devices on a plurality of networks according to embodiments to which the present invention is applied.

In FIGS. 27 to 35, it is assumed that the fifth network 50 represents an HDBseT network and uses an HD-CMP (HDBaseT Control and Management Protocol), and the sixth network 60 represents an HPnP (HDBaseT Plug & Play) network and uses an HTTP (hypertext transfer protocol).

However, as described above, the network system to which the present invention is applied may form a plurality of networks supporting different protocols, and each network may support at least one of various protocols. For example, the fifth network 50 and the sixth network 60 may be any one of a UPNP (Universal Plug & Play) network, a HPnP (HDBaseT Plug & Play) network, and a HDBaseT network. Also, the fifth network 50 and the sixth network 60 may support at least one of a TCP/IP (Transmission Control Protocol/Internet Protocol), an SSDP (Simple Service Discovery Protocol), an SOAP (Simple Object Access Protocol), a GENA (General Event Notification Architecture), an HTTP (hypertext transfer protocol), and an HD-CMP (HDBaseT Control and Management Protocol), and a message transmitted and received between devices may be expressed as a plain type or an XML (extensible Markup Language) type.

Figure 27:
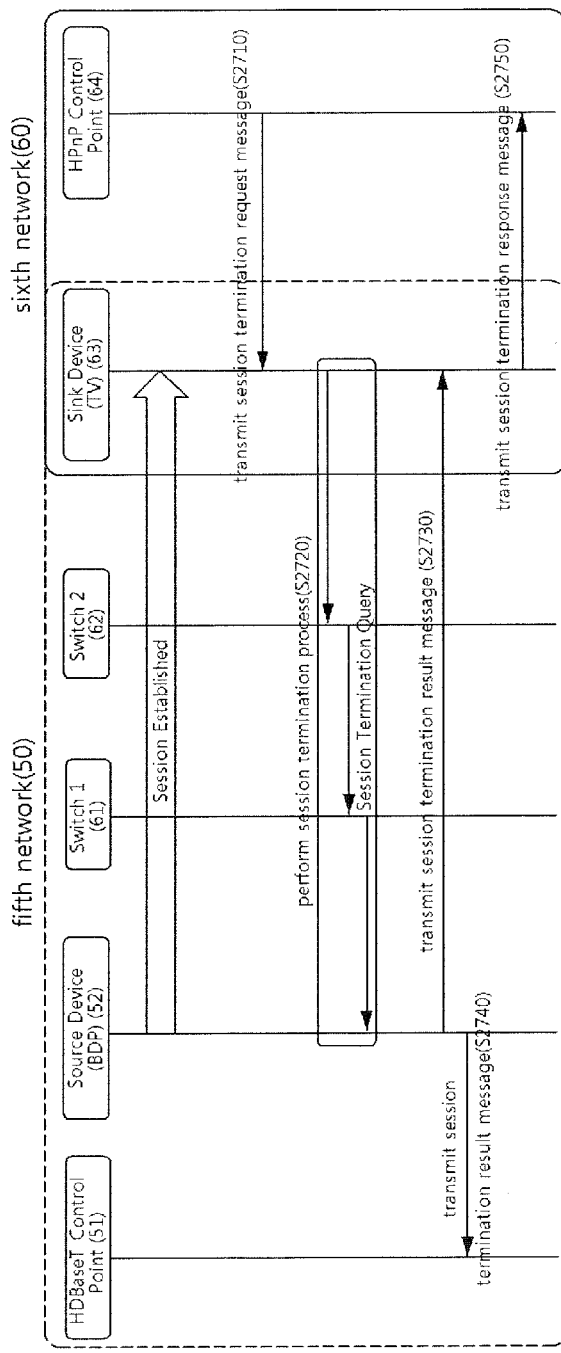
FIGS. 27 through 35 are flow charts illustrating various methods of terminating a session between devices on a plurality of networks according to embodiments to which the present invention is applied.

In FIG. 27, a case where the HDBaseT control point 51, the source device 52, the switch 1 61, the switch 2 62, and the sink device 63 are connected in the fifth network 50, and the HPnP control point 64 and the sink device 63 are connected in the sixth network 60 is assumed. That is, in the embodiment of FIG. 27, the HPnP control point 64 requests a session termination from the sink device 63 and only the sink device 63 is a device to which HPnP is applied in the fifth network 50.

Also, in this embodiment, it is assumed that a session is created between the source device 52 and the sink device 63. Here, various embodiments applied to the present disclosure may be applied to the session creation process.

When the user wants to terminate the session between the source device 52 and the sink device 63, the HPnP control point 64 may transmit a session termination request message to the sink device 63 (S2710). Here, the session termination request message represents a message for triggering a session termination between the source device 52 and the sink device 63. The session termination request message may include at least one of IP address information of a device to be terminated, session identification information identifying a session to be terminated, an initiate device reference value initiating a session termination process, and a first partner device reference value and a second partner device reference value as targets of the session termination.

On the basis of the session termination request message, a session termination process may be performed between the source device 52 and the sink device 63 (S2720). In detail, the sink device 63 may transmit a session termination query message to the discovered source device 62. Here, the sink device 63 may transmit the session termination query message to the switch device included in the same network, and the session termination query message may be transmitted to the source device 52 through a routing path. The embodiments of the session termination process described in this disclosure may be applied to the session termination process of this embodiment.

When the session termination process is completed, the source device 52 may transmit a session termination result message to the sink device 63 (S2730). Here, the session termination result message may be transmitted in an HD-CMP manner, and the transmitted session termination result message may differ according to the session termination results. For example, when the session termination is successful, the session termination result message may include a result code indicating a success of the session termination and information corresponding to the session termination result, and when the session termination fails, the session termination result message may include a result code indicating failure of the session termination and information corresponding to a failure reason.

Meanwhile, when a legacy HDBaseT control point 51 not supporting HDBaseT exists, the source device 52 may transmit the session termination result message to the legacy HDBaseT control point 51 (S2740).

The sink device 63 may transmit a session termination response message to the HPnP control point 64 (S2750). Here, the session termination response message may represent a response message with respect to the session termination request message. The session termination response message may be transmitted in an HTTP manner and may include at least one of device information which has participated in a session creation, session identification information identifying a terminated session, and a response code.

During the foregoing process, the sink device 63 may transmit and receive a message to and from the source device 52 using the HDBaseT protocol, and transmit and receive a message to and from the HPnP control point 64 using the HTTP protocol.

Figure 28:
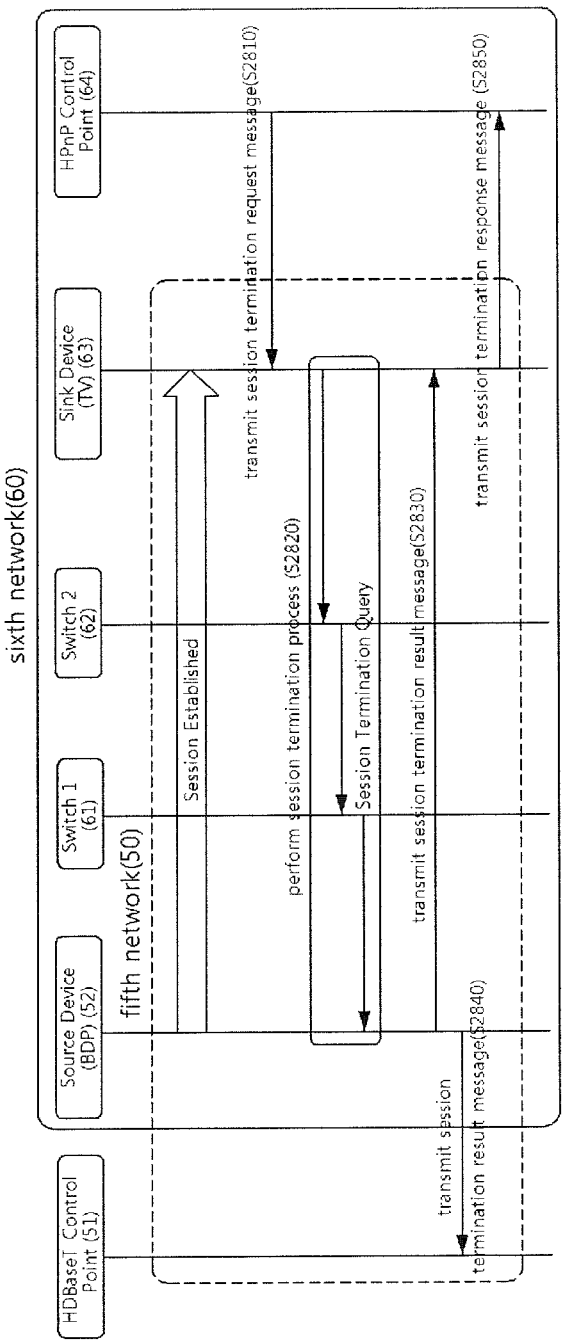

In FIG. 28, a case where the HDBaseT control point 51, the source device 52, the switch 1 61, the switch 2 62, and the sink device 63 are connected in the fifth network 50, and the HPnP control point 64, the source device 52, the switch 1 61, the switch 2 62, and the sink device 63 are connected in the sixth network 60 is assumed. That is, in the embodiment of FIG. 28, the HPnP control point 64 requests a session termination from the sink device 63 and HPnP is applied to every device.

Also, in this embodiment, it is assumed that a session is created between the source device 52 and the sink device 63. Here, various embodiments applied to the present disclosure may be applied to the session creation process.

When the user wants to terminate the session between the source device 52 and the sink device 63, the HPnP control point 64 may transmit a session termination request message to the sink device 63 (S2810).

On the basis of the session termination request message, a session termination process may be performed between the source device 52 and the sink device 63 (S2820).

When the session termination process is completed, the source device 52 may transmit a session termination result message to the sink device 63 (S2830). Here, the session termination result message may be transmitted in an HD-CMP manner.

Meanwhile, when a legacy HDBaseT control point 51 not supporting HDBaseT exists, the source device 52 may transmit the session termination result message to the legacy HDBaseT control point 51 (S2840).

The sink device 63 may transmit a session termination response message to the HPnP control point 64 (S2850). Here, the session termination response message may be transmitted in an HTTP manner.

Also, in this embodiment, repeated contents of the embodiments related to the session termination described above are not described, and details of other embodiment described in this disclosure may all be applied.

Figure 29:
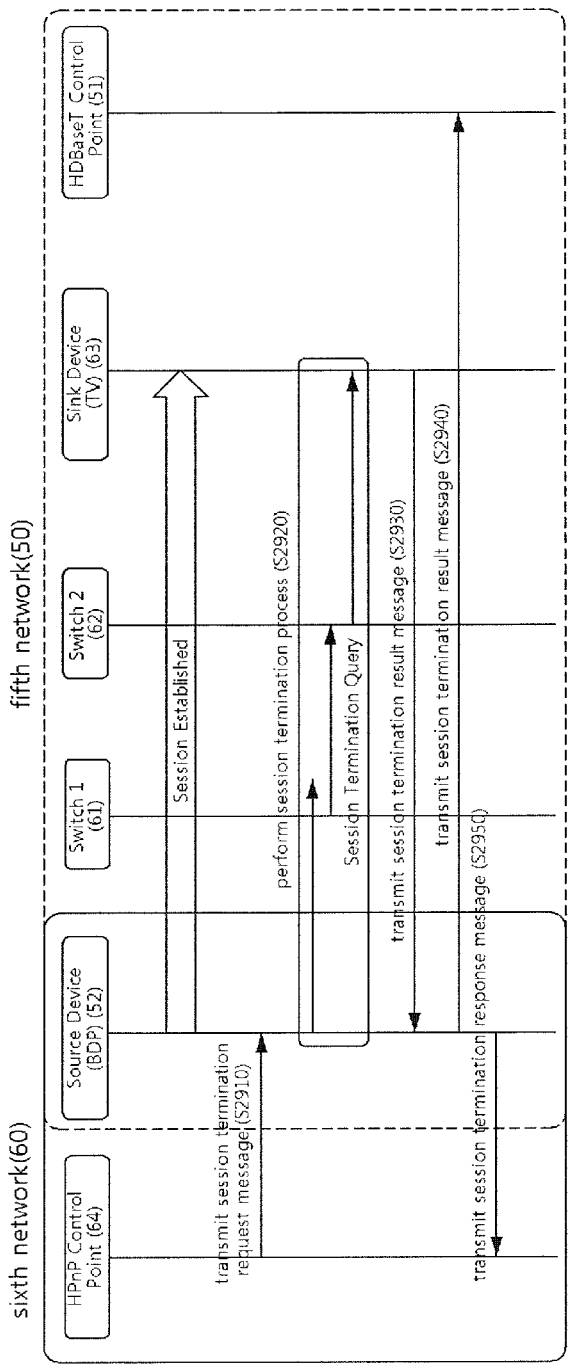

In FIG. 29, a case where the HDBaseT control point 51, the source device 52, the switch 1 61, the switch 2 62, and the sink device 63 are connected in the fifth network 50, and the HPnP control point 64 and the source device 52 are connected in the sixth network 60 is assumed. That is, in the embodiment of FIG. 29, the HPnP control point 64 requests a session termination from the source device 52 and HPnP is applied only to the source device 52.

Also, in this embodiment, it is assumed that a session is created between the source device 52 and the sink device 63. Here, various embodiments applied to the present disclosure may be applied to the session creation process.

When the user wants to terminate the session between the source device 52 and the sink device 63, the HPnP control point 64 may transmit a session termination request message to the source device 52 (S2910).

On the basis of the session termination request message, a session termination process may be performed between the source device 52 and the sink device 63 (S2920).

When the session termination process is completed, the sink device 63 may transmit a session termination result message to the source device 52 (S2930). Here, the session termination result message may be transmitted in an HD-CMP manner.

Meanwhile, when a legacy HDBaseT control point 51 not supporting HDBaseT exists, the source device 52 may transmit the session termination result message to the legacy HDBaseT control point 51 (S2940).

The source device 52 may transmit a session termination response message to the HPnP control point 64 (S2950). Here, the session termination response message may be transmitted in an HTTP manner.

Also, in this embodiment, repeated contents are not described, and details of other embodiment described in this disclosure may all be applied.

Figure 30:
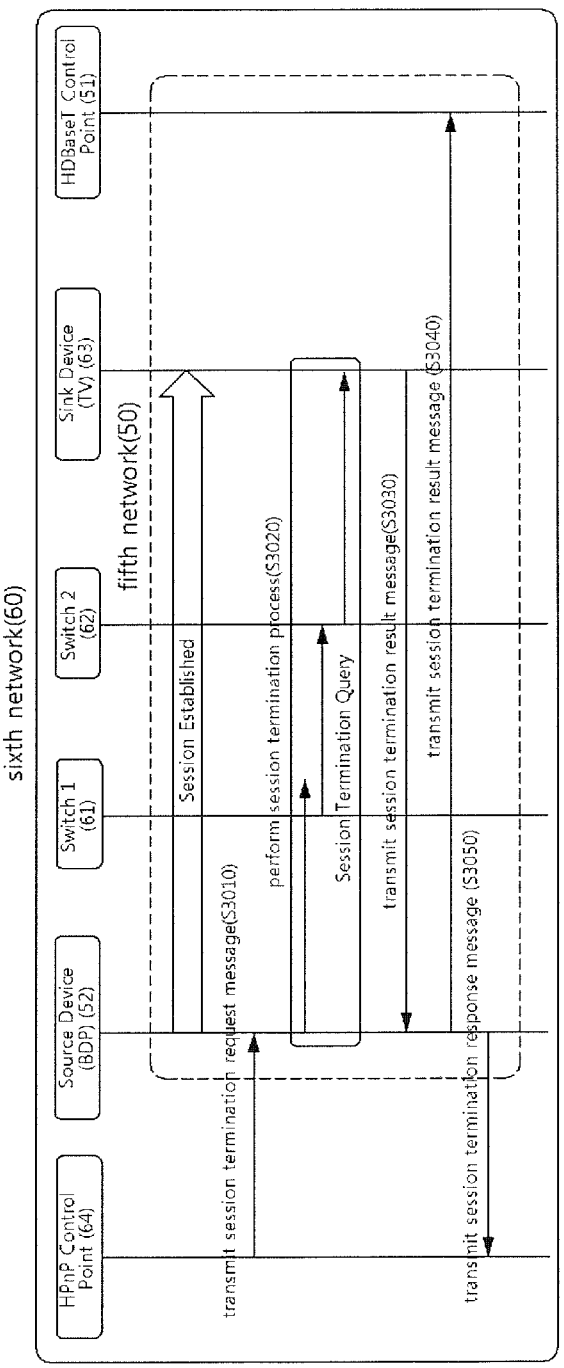

In FIG. 30, a case where the HDBaseT control point 51, the source device 52, the switch 1 61, the switch 2 62, and the sink device 63 are connected in the fifth network 50, and the HPnP control point 64, the source device 52, the switch 1 61, the switch 2 62, and the sink device 63 are connected in the sixth network 60 is assumed. That is, in the embodiment of FIG. 30, the HPnP control point 64 requests a session termination from the source device 52 and HPnP is applied to every device.

Also, in this embodiment, it is assumed that a session is created between the source device 52 and the sink device 63. Here, various embodiments applied to the present disclosure may be applied to the session creation process.

When the user wants to terminate the session between the source device 52 and the sink device 63, the HPnP control point 64 may transmit a session termination request message to the source device 52 (S3010).

On the basis of the session termination request message, a session termination process may be performed between the source device 52 and the sink device 63 (S3020).

When the session termination process is completed, the sink device 63 may transmit a session termination result message to the source device 52 (S3030). Here, the session termination result message may be transmitted in an HD-CMP manner.

Meanwhile, when a legacy HDBaseT control point 51 not supporting HDBaseT exists, the source device 52 may transmit the session termination result message to the legacy HDBaseT control point 51 (S3040).

The source device 52 may transmit a session termination response message to the HPnP control point 64 (S3050). Here, the session termination response message may be transmitted in an HTTP manner.

Also, in this embodiment, repeated contents of the embodiments related to the session termination described above are not described, and details of other embodiment described in this disclosure may all be applied.

Figure 31:
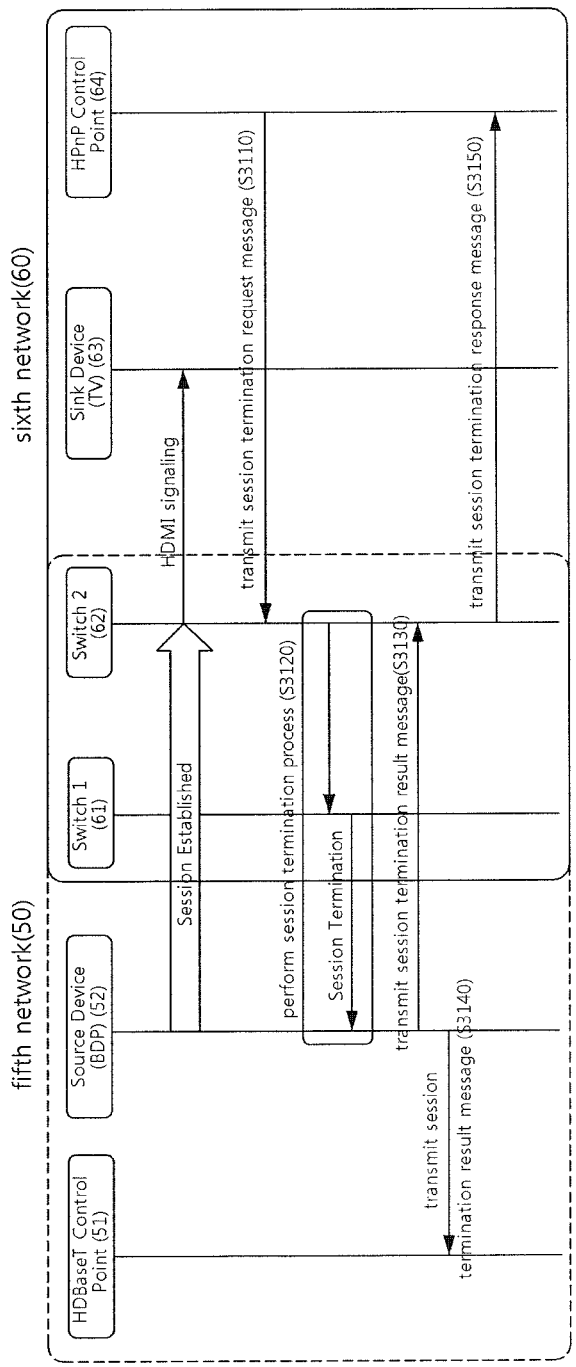

In FIG. 31, a case where the HDBaseT control point 51, the source device 52, the switch 1 61, and the switch 2 62 are connected in the fifth network 50, and the HPnP control point 64, the switch 1 61, the switch 2 62, and the sink device 63 are connected in the sixth network 60 is assumed. That is, in the embodiment of FIG. 31, a switch device is a subject for a session termination and HPnP is applied to only to the switch device. The sink device 63 is a legacy sink device having an HDMI and is connected to the switch 2 62 through the HDMI.

Also, in this embodiment, it is assumed that a session is created between the source device 52 and the switch 2 62. Here, various embodiments applied to the present disclosure may be applied to the session creation process.

When the user wants to terminate the session between the source device 52 and the switch 2 62, the HPnP control point 64 may transmit a session termination request message to the switch 2 62 (S3110).

On the basis of the session termination request message, a session termination process may be performed between the source device 52 and the switch 2 62 (S3120).

When the session termination process is completed, the source device 52 may transmit a session termination result message to the switch 2 62 (S3130). Here, the session termination result message may be transmitted in an HD-CMP manner.

Meanwhile, when a legacy HDBaseT control point 51 not supporting HDBaseT exists, the source device 52 may transmit the session termination result message to the legacy HDBaseT control point 51 (S3140).

The switch 2 62 may transmit a session termination response message to the HPnP control point 64 (S3150). Here, the session termination response message may be transmitted in an HTTP manner.

Also, in this embodiment, repeated contents of the embodiments related to the session termination described above are not described, and details of other embodiment described in this disclosure may all be applied.

Figure 32:
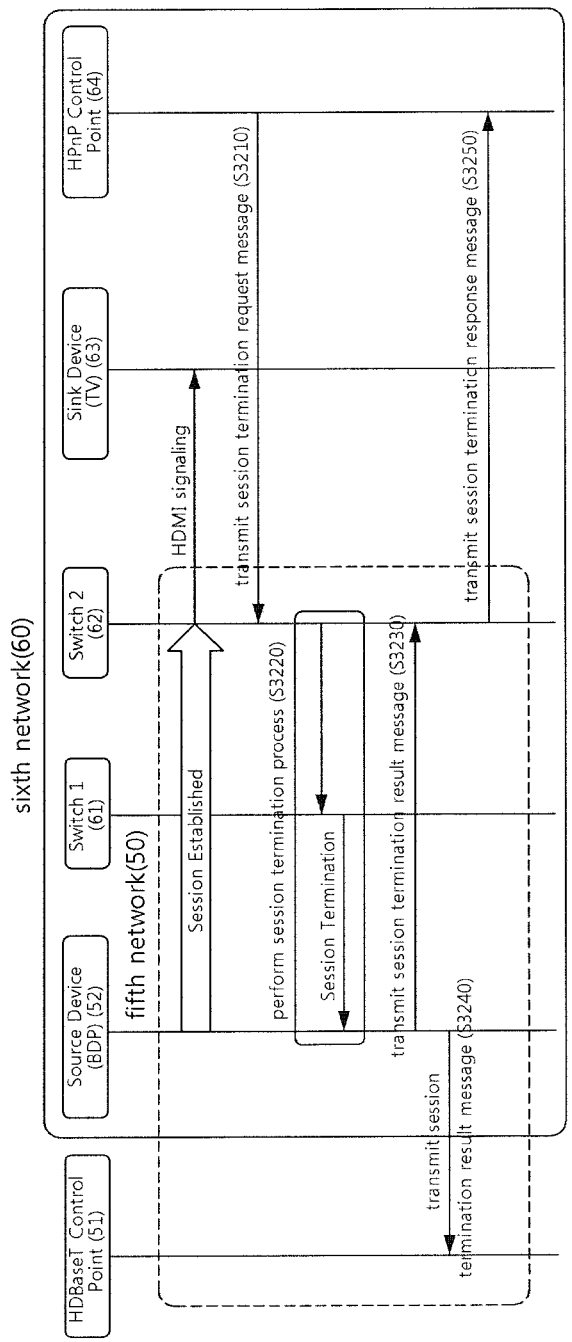

In FIG. 32, a case where the HDBaseT control point 51, the source device 52, the switch 1 61, and the switch 2 62 are connected in the fifth network 50, and the HPnP control point 64, the source device 52, the switch 1 61, the switch 2 62, and the sink device 63 are connected in the sixth network 60 is assumed. That is, in the embodiment of FIG. 32, a switch device is a subject for a session termination and HPnP is applied to every device. The sink device 63 is a legacy sink device having an HDMI and is connected to the switch 2 62 through the HDMI.

Also, in this embodiment, it is assumed that a session is created between the source device 52 and the switch 2 62. Here, various embodiments applied to the present disclosure may be applied to the session creation process.

When the user wants to terminate the session between the source device 52 and the switch 2 62, the HPnP control point 64 may transmit a session termination request message to the switch 2 62 (S3210).

On the basis of the session termination request message, a session termination process may be performed between the source device 52 and the switch 2 62 (S3220).

When the session termination process is completed, the source device 52 may transmit a session termination result message to the switch 2 62 (S3230). Here, the session termination result message may be transmitted in an HD-CMP manner.

Meanwhile, when a legacy HDBaseT control point 51 not supporting HDBaseT exists, the source device 52 may transmit the session termination result message to the legacy HDBaseT control point 51 (S3240).

The switch 2 62 may transmit a session termination response message to the HPnP control point 64 (S3250). Here, the session termination response message may be transmitted in an HTTP manner.

Also, in this embodiment, repeated contents of the embodiments related to the session termination described above are not described, and details of other embodiment described in this disclosure may all be applied.

Figure 33:
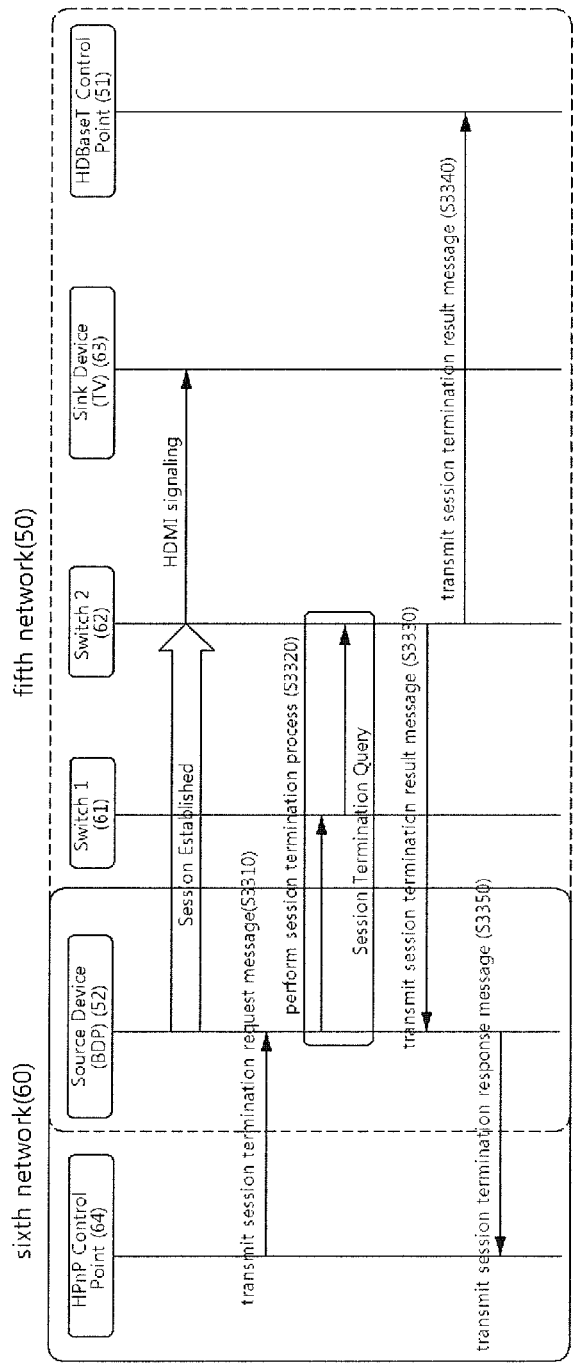

In FIG. 33, a case where the HDBaseT control point 51, the source device 52, the switch 1 61, and the switch 2 62, and the sink device 63 are connected in the fifth network 50, and the HPnP control point 64 and the source device 52 are connected in the sixth network 60 is assumed. That is, in the embodiment of FIG. 33, the source device 52 is a subject for a session termination and HPnP is applied to only to the source device 52. The sink device 63 is a legacy sink device having an HDMI and is connected to the switch 2 62 through the HDMI.

Also, in this embodiment, it is assumed that a session is created between the source device 52 and the switch 2 62. Here, various embodiments applied to the present disclosure may be applied to the session creation process.

When the user wants to terminate the session between the source device 52 and the switch 2 62, the HPnP control point 64 may transmit a session termination request message to the source device 52 (S3310).

On the basis of the session termination request message, a session termination process may be performed between the source device 52 and the switch 2 62 (S3320).

When the session termination process is completed, the switch 2 62 may transmit a session termination result message to the source device 52 (S3330). Here, the session termination result message may be transmitted in an HD-CMP manner.

Meanwhile, when a legacy HDBaseT control point 51 not supporting HDBaseT exists, the switch 2 62 may transmit the session termination result message to the legacy HDBaseT control point 51 (S3340).

The source device 52 may transmit a session termination response message to the HPnP control point 64 (S3350). Here, the session termination response message may be transmitted in an HTTP manner.

Also, in this embodiment, repeated contents of the embodiments related to the session termination described above are not described, and details of other embodiment described in this disclosure may all be applied.

Figure 34:
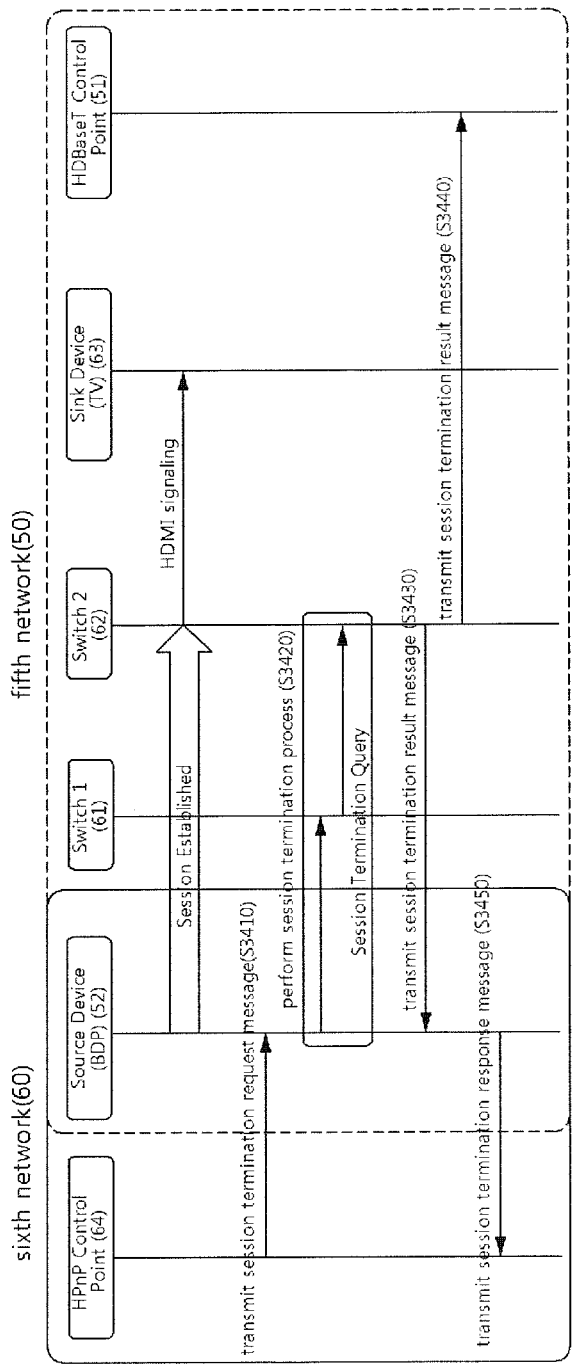

In FIG. 34, a case where the HDBaseT control point 51, the source device 52, the switch 1 61, and the switch 2 62, and the sink device 63 are connected in the fifth network 50, and the HPnP control point 64 and the source device 52 are connected in the sixth network 60 is assumed. That is, in the embodiment of FIG. 34, the source device 52 is a subject for a session termination and HPnP is applied to every device. The sink device 63 is a legacy sink device having an HDMI and is connected to the switch 2 62 through the HDMI.

Also, in this embodiment, it is assumed that a session is created between the source device 52 and the switch 2 62. Here, various embodiments applied to the present disclosure may be applied to the session creation process.

When the user wants to terminate the session between the source device 52 and the switch 2 62, the HPnP control point 64 may transmit a session termination request message to the source device 52 (S3410).

On the basis of the session termination request message, a session termination process may be performed between the source device 52 and the switch 2 62 (S3420).

When the session termination process is completed, the switch 2 62 may transmit a session termination result message to the source device 52 (S3430). Here, the session termination result message may be transmitted in an HD-CMP manner.

Meanwhile, when a legacy HDBaseT control point 51 not supporting HDBaseT exists, the switch 2 62 may transmit the session termination result message to the legacy HDBaseT control point 51 (S3440).

The source device 52 may transmit a session termination response message to the HPnP control point 64 (S3450). Here, the session termination response message may be transmitted in an HTTP manner.

Also, in this embodiment, repeated contents of the embodiments related to the session termination described above are not described, and details of other embodiment described in this disclosure may all be applied.

Figure 35:
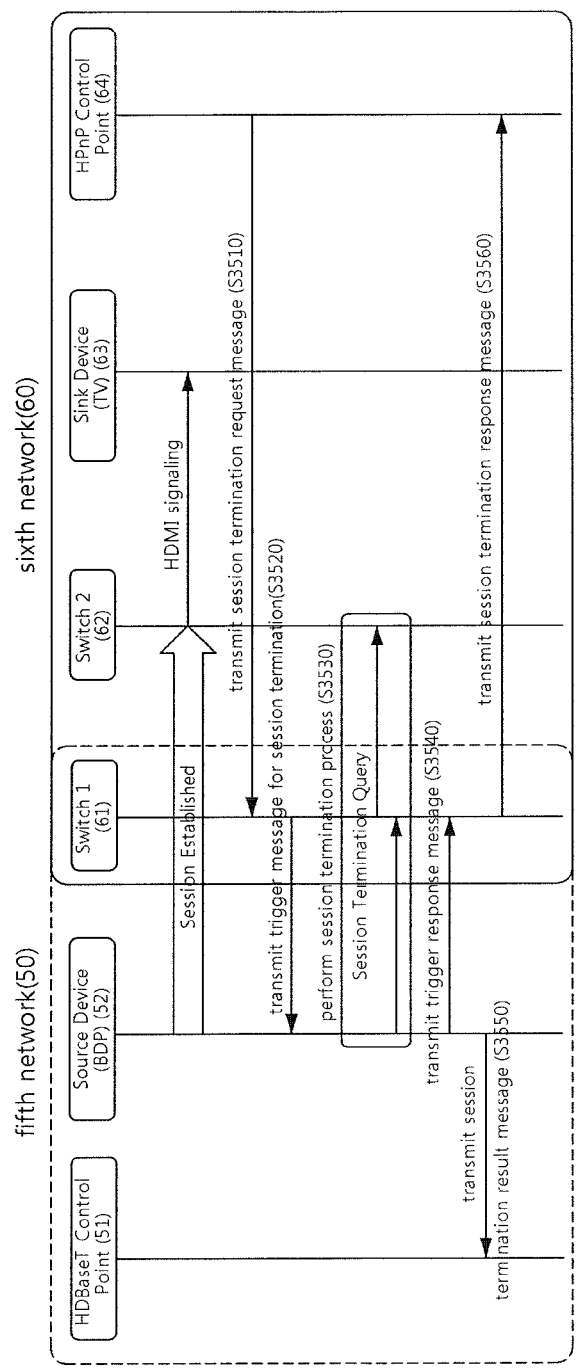

In FIG. 35, a case where the HDBaseT control point 51, the source device 52, and the switch 1 61 are connected in the fifth network 50, and the HPnP control point 64, the switch 1 61, the switch 2 62, and the sink device 63 are connected in the sixth network 60 is assumed. That is, in the embodiment of FIG. 35, the source device 52 is a subject for a session termination and HPnP is applied only to a switch device.

The source device 52 is an HDBaseT device not supporting HPnP and is connected to the switch 1 61 supporting HPnP. The switch 1 61 exposes the source device 52 to the sixth network 60 such that the source device 52 is discovered by the HPnP control point 64. To this end, the switch 1 61 may collect information regarding the source device 52 and manage the collected information.

The sink device 63 is a legacy sink device having an HDMI and is connected to the switch 2 62 through the HDMI.

Also, in this embodiment, it is assumed that a session is created between the source device 52 and the switch 2 62. Here, various embodiments applied to the present disclosure may be applied to the session creation process.

When the user wants to terminate the session between the source device 52 and the switch 2 62, the HPnP control point 64 may transmit a session termination request message to the switch 1 61 (S3510).

On the basis of the session termination request message, the switch 1 61 may transmit a trigger message for a session termination to the source device 52 (S3520). Here, the trigger message represents a signal for initiating a specific operation, and the trigger message for a session termination represents a signal for a session terminal between devices.

On the basis of the trigger message for a session termination, a session termination process may be performed between the source device 52 and the switch 2 62 (S3530).

When the session termination process is completed, the source device 52 may transmit a trigger response message to the switch 1 61 (S3540). Here, the trigger response message may be transmitted in an HD-CMP manner.

Meanwhile, when a legacy HDBaseT control point 51 not supporting HDBaseT exists, the source device 52 may transmit the session termination result message to the legacy HDBaseT control point 51 (S3550).

The switch 1 61 may transmit a session termination response message to the HPnP control point 64 (S3560). Here, the session termination response message may be transmitted in an HTTP manner.

Also, in this embodiment, repeated contents of the embodiments related to the session termination described above are not described, and details of other embodiment described in this disclosure may all be applied.

FIG. 36 is a view illustrating embodiments to which the present invention is applied, wherein FIG. 36(a) illustrates a format of a session termination request message, FIG. 36(b) illustrates a text/plain type session termination request message, and FIG. 36(c) illustrates a text/xml type session termination request message.

Referring to FIG. 36(a), the session termination request message format 3610 may include a POST 3611, a HOST 3612, a CONTENT-LENGTH 3613, a CONTENT-TYPE 3614, and a BODY 3615. The session termination request message may be transmitted in an HTTP POST manner.

The POST 3611 represents a session control trigger URL, the HOST 3612 represents an IP address allocated to a device, the CONTENT-LENGTH 3613 represents a length of the BODY 3615, and the CONTENT-TYPE 3614 represents a text type of the BODY 3615.

For example, FIGS. 36(b) and 36(c) illustrate cases where the CONTENT-TYPE 3614 of the session termination request message format 3610 is a text/plain type 3631 to 3635 and a text/xml type 3651 to 3655, respectively.

When the CONTENT-TYPE 3614 is the text/plain type or the text/xml type, the BODY 3635 or 3655 may include at least one session identification information. Here, the SessionID1 represents session identification information of a first session, and SessionID2 represents session identification information of a second session.

FIG. 37 is a view illustrating embodiments to which the present invention is applied, wherein FIG. 37(a) illustrates a format of a session termination response message, FIG. 37(b) illustrates a text/plain type session termination response message, and FIG. 37(c) illustrates a text/xml type session termination response message.

Referring to FIG. 37(a), a session creation response message format 3710 may include an HTTP version and result code 3711, a CONTENT-TYPE 3712, and a BODY 3713. The session termination response message may be transmitted in an HTTP manner.

The HTTP version is 1.1 and the result code represents 200 OK indicating that a session termination has been successful (3711). The CONTENT-TYPE 3712 represents a text type of the BODY 3713.

For example, FIGS. 37(b) and 37(c) illustrate cases where the CONTENT-TYPE 3712 of the session termination response message format 3710 is a text/plain type 3731 to 3733 and a text/xml type 3751 to 3753, respectively.

When the CONTENT-TYPE 3712 is the text/plain type or the text/xml type, the BODY 3733 or 3753 may include session identification information and status information. Here, the status information ("terminated") indicates that a session has been terminated.

FIG. 38 is a view illustrating other embodiments to which the present invention is applied, wherein FIG. 38(a) illustrates a format of a session termination request message, FIG. 38(b) illustrates a text/plain type session termination request message, and FIG. 38(c) illustrates a text/xml type session termination request message.

Referring to FIG. 38(a), the session termination request message format 3810 may include a POST 3811, a HOST 3812, a CONTENT-LENGTH 3813, a CONTENT-TYPE 3814, and a BODY 3815. The session termination request message may be transmitted in an HTTP POST manner.

The POST 3811 represents a session control trigger URL, the HOST 3812 represents an IP address allocated to a device, the CONTENT-LENGTH 3813 represents a length of the BODY 3815, and the CONTENT-TYPE 3814 represents a text type of the BODY 3815.

For example, FIGS. 38(b) and 38(c) illustrate cases where the CONTENT-TYPE 3814 of the session termination request message format 3810 is the text/plain type 3831 to 3835 and the text/xml type 3851 to 3855, respectively.

When the CONTENT-TYPE 3814 is the text/plain type or the text/xml type, the BODY 3815 may be expressed as illustrated in FIGS. 38(b) and 38(c), respectively. The BODY 3815 message may include session identification information identifying a session to be terminated, an initiate device reference value initiating a session termination process, and a first partner device reference value and a second partner device reference value as targets of the session termination.

For example, referring to FIGS. 38(b) and 38(c), the BODY 3835 or 3855 message may include an SID value, an InitiatingEntityReference value, a FirstPartnerReference value, and a SecondPartnerReference value.

FIG. 39 is a view illustrating other embodiments to which the present invention is applied, wherein FIG. 39(a) illustrates a format of a session termination response message when a session termination is successful, and FIG. 39(b) illustrates a session termination response message when a session termination fails.

Referring to FIG. 39(a), a session termination response message format 3910 when a session termination is successful may include an HTTP version and result code 3911, a CONTENT-TYPE 3912, and a BODY 3913. The session termination response message may be transmitted in an HTTP manner.

The HTTP version is 1.1, and the result code represents 200 OK indicating that the session termination has been successful (3911 or 3921). The CONTENT-TYPE 3912 or 3922 represents a text type of the BODY 3913 or 3923. For example, the CONTENT-TYPE 3912 or 3922 represents a text/plain type 3921 to 3923.

Meanwhile, the BODY 3913 or 3923 message may include at least one of session identification information identifying a terminated session, an initiate device reference value initiating a session termination process, and a first partner device reference value and a second partner device reference value as targets of the session termination.

Referring to FIG. 39(b), a session termination response message format 3930 when a session termination fails may include an HTTP version and result code 3931, a CONTENT-TYPE 3932, and a BODY 3933. The session termination response message may be transmitted in an HTTP manner.

The HTTP version is 1.1, and the result code represents 503 indicating that the session termination has failed (3931 or 3941). The CONTENT-TYPE 3932 or 3942 represents a text type of the BODY 3933 or 3943. For example, the CONTENT-TYPE 3932 or 3942 represents a text/plain type 3941 to 3943.

Meanwhile, the BODY 3933 or 3943 message may include failure reason information. The failure reason information may include one of a response code list. For example, when a response code is 1, it may indicate that session identification information is not known, when the response code is 2, it may indicate that there is no partner device, for example, a response device is not a partner device in a session. When the response code is 3, it may indicate "reserved", and when the response code is 4, it may indicate that a requested device is not allowed to terminate a session. When the response code is 6, it may indicate a general error.

FIGS. 40 through 46 are flow charts illustrating various methods of obtaining session status information after a session is created between devices on a plurality of networks according to embodiments to which the present invention is applied.

In FIGS. 40 through 46, it is assumed that a seventh network 70 represents an HDBaseT network and uses an HD-CMP (HDBaseT Control and Management Protocol), and an eighth network 80 represents an HPnP (HDBaseT Plug & Play) network and uses an HTTP (hypertext transfer protocol).

However, as described above, the network system to which the present invention is applied may form a plurality of networks, an each network may support at least one of various protocols. For example, the seventh network 70 and the eighth network 80 may be any one of a universal plug & play (UPnP) network an HDBaseT plug & plan (HPnP) network, and an HDBaseT network. Also, the seventh network 70 and the eighth network 80 may support at least one of a TCP/IP (Transmission Control Protocol/Internet Protocol), an SSDP (Simple Service Discovery Protocol), an SOAP (Simple Object Access Protocol), a GENA (General Event Notification Architecture), an HTTP (hypertext transfer protocol), and an HD-CMP (HDBaseT Control and Management Protocol), and a message transmitted and received between devices may be expressed as a plain type or an XML (extensible Markup Language) type.

Figure 40:
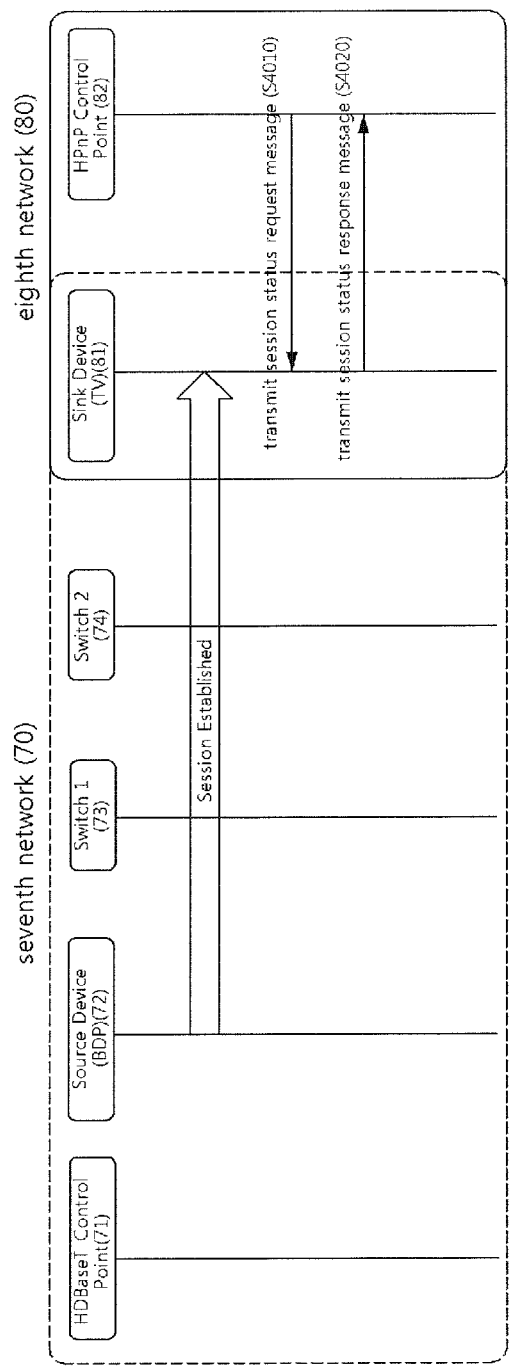
FIGS. 40 through 46 are flow charts illustrating various methods of obtaining session status information after a session is created between devices on a plurality of networks according to embodiments to which the present invention is applied.

In FIG. 40, a case where an HDBaseT control point 71, a source device 72, a switch 1 73, a switch 2 74, and a sink device 81 are connected in the seventh network 70, and an HPnP control point 82 and the sink device 81 are connected in the eighth network 80 is assumed. That is, in the embodiment of FIG. 40, the HPnP control point 82 requests a session termination from the sink device 81 and HPnP is applied only to the sink device 81.

Also, in this embodiment, it is assumed that a session is created between the source device 72 and the sink device 81. Here, various embodiments applied to the present disclosure may be applied to the session creation process.

In order to obtain status information of the session created between the sink device 81 and the source device 72, the HPnP control point 82 may transmit a session status request message to the sink device 81 (S4010). Here, the session status request message may be a trigger message for obtaining session status information. The trigger message represents a message for obtaining status information of a session created between devices.

The session status request message may include at least one of address information for obtaining session status information and session identification information of a target session. Also, the session status request message may be transmitted in an HTTP POST manner using control URL information. In this case, the sink device 81 may correspond to the control URL information.

Upon receiving the session status request message, the sink device 81 may transmit a session status response message to the HPnP control point 82 in response (S4020). Here, the session status response message may include a result code indicating a success or a failure and session descriptor information. The session descriptor information, representing specific information of a target session, may include at least one of session identification information of a target session, first device reference information, and second device reference information, for example.

Also, in this embodiment, repeated contents of the embodiments related to the session control (creation, termination, and status obtainment) described above are not described, and details of other embodiment described in this disclosure may all be applied.

Figure 41:
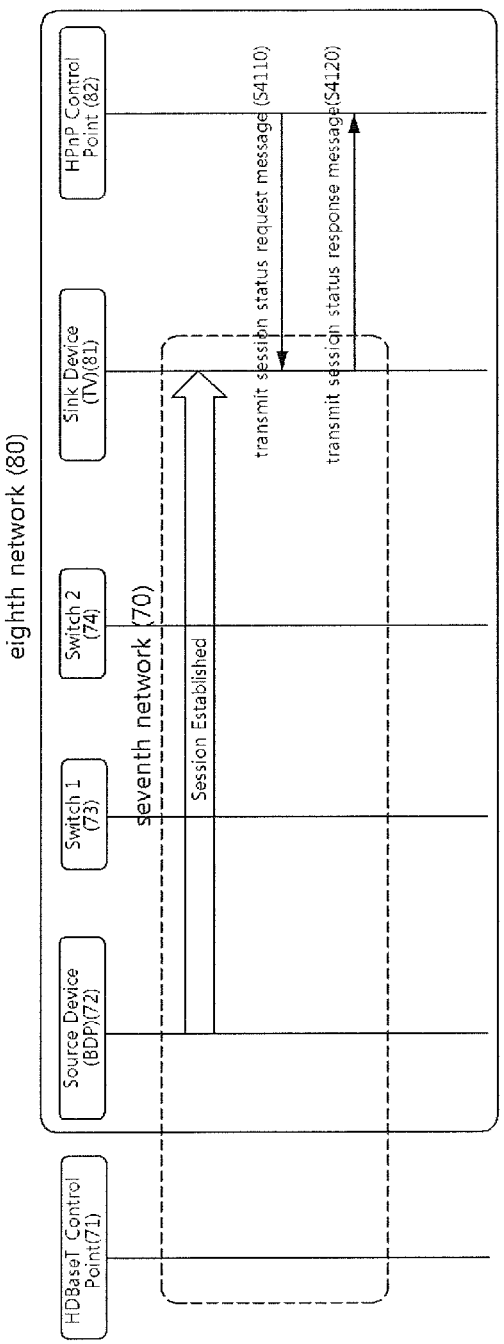

In FIG. 41, a case where the HDBaseT control point 71, the source device 72, the switch 1 73, the switch 2 74, and the sink device 81 are connected in the seventh network 70, and the HPnP control point 82, the source device 72, the switch 1 73, the switch 2 74, and the sink device 81 are connected in the eighth network 80 is assumed. That is, in the embodiment of FIG. 41, the HPnP control point 82 requests session status information from the sink device 81 and HPnP is applied to every device.

Also, in this embodiment, it is assumed that a session is created between the source device 72 and the sink device 81. Here, various embodiments applied to the present disclosure may be applied to the session creation process.

In order to obtain status information of the session created between the sink device 81 and the source device 72, the HPnP control point 82 may transmit a session status request message to the sink device 81 (S4110).

Upon receiving the session status request message, the sink device 81 may transmit a session status response message to the HPnP control point 82 in response (S4120).

Also, in this embodiment, repeated contents of the embodiments related to the session control (creation, termination, and status obtainment) described above are not described, and details of other embodiment described in this disclosure may all be applied.

Figure 42:
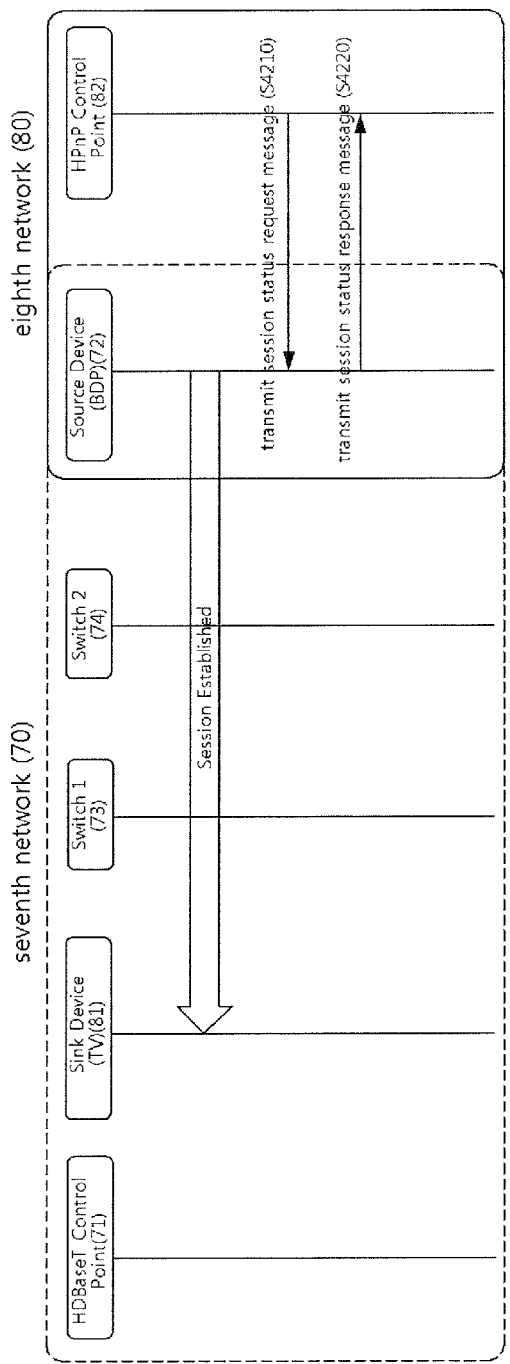

In FIG. 42, a case where the HDBaseT control point 71, the source device 72, the switch 1 73, the switch 2 74, and the sink device 81 are connected in the seventh network 70, and the HPnP control point 82 and the source device 72 are connected in the eighth network 80 is assumed. That is, in the embodiment of FIG. 42, the HPnP control point 82 requests session status information from the source device 72 and HPnP is applied only to the source device 72.

Also, in this embodiment, it is assumed that a session is created between the source device 72 and the sink device 81. Here, various embodiments applied to the present disclosure may be applied to the session creation process.

In order to obtain status information of the session created between the sink device 81 and the source device 72, the HPnP control point 82 may transmit a session status request message to the source device 72 (S4210).

Upon receiving the session status request message, the source device 72 may transmit a session status response message to the HPnP control point 82 in response (S4220).

Also, in this embodiment, repeated contents of the embodiments related to the session control (creation, termination, and status obtainment) described above are not described, and details of other embodiment described in this disclosure may all be applied.

Figure 43:
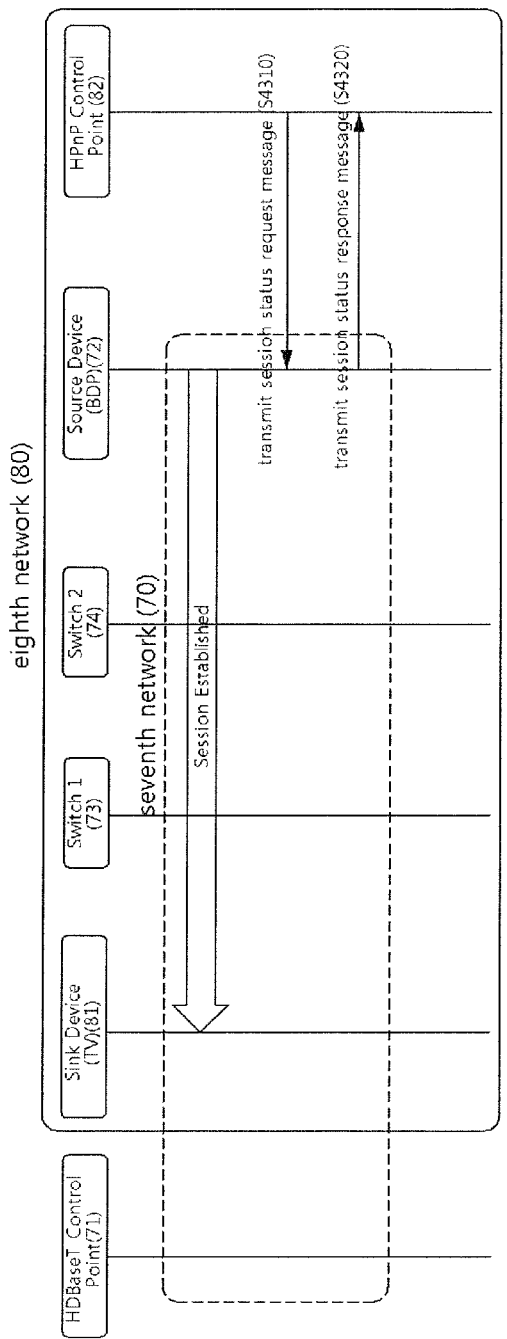

In FIG. 43, a case where the HDBaseT control point 71, the source device 72, the switch 1 73, the switch 2 74, and the sink device 81 are connected in the seventh network 70, and the HPnP control point 82, the source device 72, the switch 1 73, the switch 2 74, and the sink device 81 are connected in the eighth network 80 is assumed. That is, in the embodiment of FIG. 43, the HPnP control point 82 requests session status information from the source device 72 and HPnP is applied to every device.

Also, in this embodiment, it is assumed that a session is created between the source device 72 and the sink device 81. Here, various embodiments applied to the present disclosure may be applied to the session creation process.

In order to obtain status information of the session created between the sink device 81 and the source device 72, the HPnP control point 82 may transmit a session status request message to the source device 72 (S4310).

Upon receiving the session status request message, the source device 72 may transmit a session status response message to the HPnP control point 82 in response (S4320).

Also, in this embodiment, repeated contents of the embodiments related to the session control (creation, termination, and status obtainment) described above are not described, and details of other embodiment described in this disclosure may all be applied.

Figure 44:
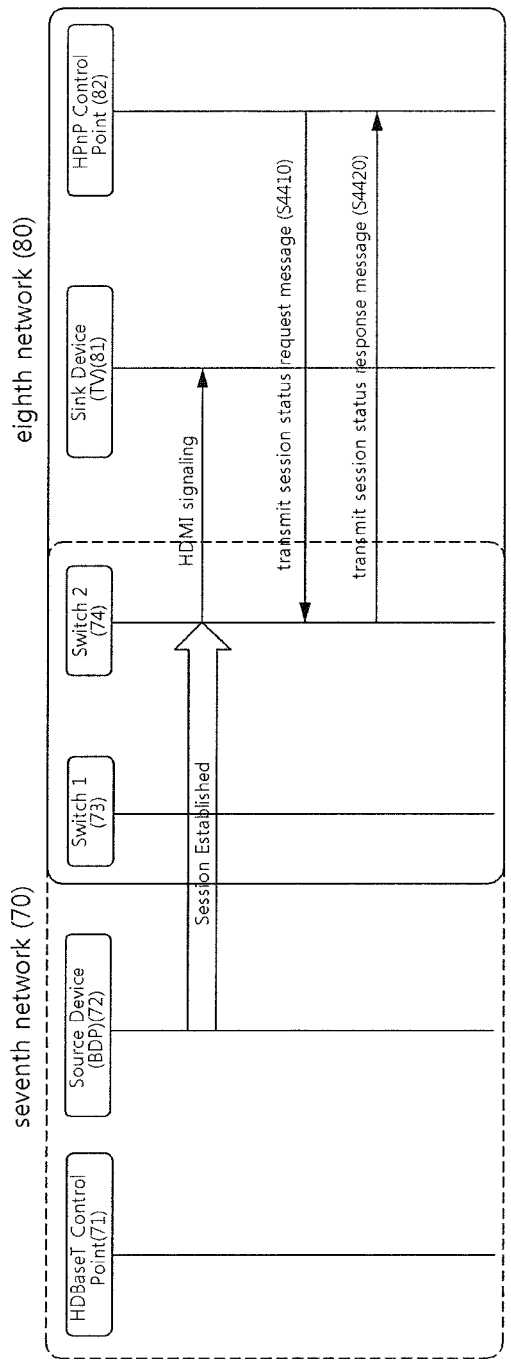

In FIG. 44, a case where the HDBaseT control point 71, the source device 72, the switch 1 73, and the switch 2 74 are connected in the seventh network 70, and the HPnP control point 82, the switch 1 73, the switch 2 74, and the sink device 81 are connected in the eighth network 80 is assumed. That is, in the embodiment of FIG. 44, the HPnP control point 82 requests session status information from the switch 2 74 and HPnP is applied only to a switch device. The sink device 81 represents a legacy sink device having an HDMI and is connected to the switch 2 74 through the HDMI.

Also, in this embodiment, it is assumed that a session is created between the source device 72 and the switch 2 74. Here, various embodiments applied to the present disclosure may be applied to the session creation process. The source device may transmit data to the switch 2 74, and the switch 74 may transmit the data transmitted from the source device 72 to the sink device 81 through the HDMI.

In order to obtain status information of the session created between the sink device 81 and the switch 2 74, the HPnP control point 82 may transmit a session status request message to the switch 2 74 (S4410).

Upon receiving the session status request message, the switch 2 74 may transmit a session status response message to the HPnP control point 82 in response (S4420).

Also, in this embodiment, repeated contents of the embodiments related to the session control (creation, termination, and status obtainment) described above are not described, and details of other embodiment described in this disclosure may all be applied.

Figure 45:
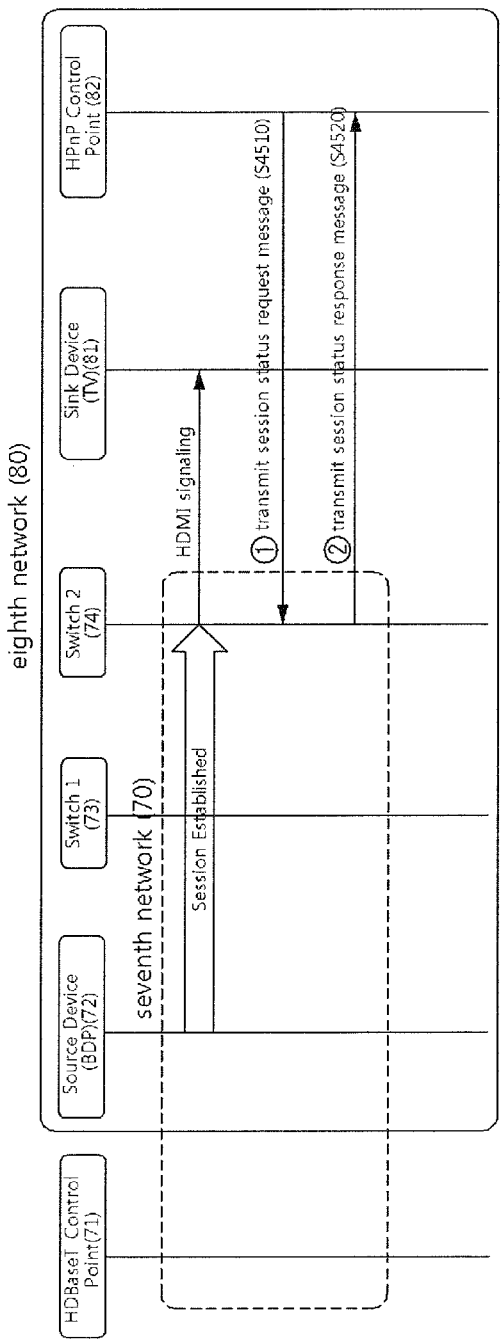

In FIG. 45, a case where the HDBaseT control point 71, the source device 72, the switch 1 73, and the switch 2 74 are connected in the seventh network 70, and the HPnP control point 82, the source device 72, the switch 1 73, the switch 2 74, and the sink device 81 are connected in the eighth network 80 is assumed. That is, in the embodiment of FIG. 45, the HPnP control point 82 requests session status information from the switch 2 74 and HPnP is applied to every device. The sink device 81 represents a legacy sink device having an HDMI and is connected to the switch 2 74 through the HDMI.

Also, in this embodiment, it is assumed that a session is created between the source device 72 and the switch 2 74. Here, various embodiments applied to the present disclosure may be applied to the session creation process. The source device may transmit data to the switch 2 74, and the switch 74 may transmit the data transmitted from the source device 72 to the sink device 81 through the HDMI.

In order to obtain status information of the session created between the sink device 81 and the switch 2 74, the HPnP control point 82 may transmit a session status request message to the switch 2 74 (S4510).

Upon receiving the session status request message, the switch 2 74 may transmit a session status response message to the HPnP control point 82 in response (S4520).

Also, in this embodiment, repeated contents of the embodiments related to the session control (creation, termination, and status obtainment) described above are not described, and details of other embodiment described in this disclosure may all be applied.

Figure 46:
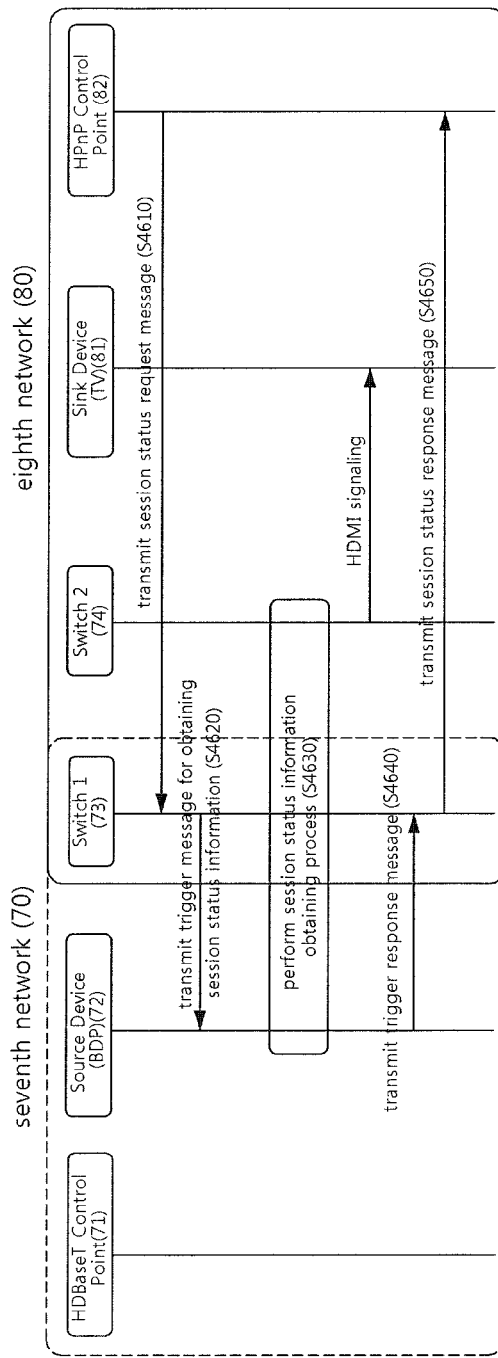

In FIG. 46, a case where the HDBaseT control point 71, the source device 72, and the switch 1 73 are connected in the seventh network 70, and the HPnP control point 82, the switch 1 73 and the switch 2 74 are connected in the eighth network 80 is assumed. That is, in the embodiment of FIG. 46, the HPnP control point 82 requests session status information from the switch 1 73 and HPnP is applied to only to a switch device.

The source device 72 is an HDBaseT device not supporting HPnP and is connected to the switch 1 73 supporting HPnP. The switch 1 73 exposes the source device 72 to the eighth network 80 such that the source device 82 is discovered by the HPnP control point 82.

The sink device 81 represents a legacy sink device having an HDMI and is connected to the switch 2 74 through the HDMI. Thus, the switch 2 74 may transmit the data (for example, a multimedia stream) transmitted from the source device 72 to the sink device 81 through the HDMI.

Also, in this embodiment, it is assumed that a session is created between the source device 72 and the switch 2 74. Here, various embodiments applied to the present disclosure may be applied to the session creation process.

In order to obtain status information of the session created between the source device 72 and the switch 2 74, the HPnP control point 82 may transmit a session status request message to the switch 1 73 (S4610). Here, the session status request message represents a triggering message for obtaining status information of the session created between the source device 72 and the switch 2 74.

The session status request message may include at least one of address information for obtaining session status information and session identification information of a target session. The session status request information may be transmitted in an HTTP POST manner using control URL information. In this case, the switch 1 73 may correspond to the control URL information.

Upon receiving the session status request message, the switch 1 73 may transmit a trigger message for obtaining session status information to the source device 72 (S4620). Here, the trigger message represents a signal for initiating a specific operation, and the trigger message for obtaining session status information represents a signal for obtaining status information of the session created between the source device 72 and the switch 2 74. Also, the trigger message for obtaining session status information may be transmitted using an HD-CMP.

On the basis of the trigger message for obtaining session status information, a session status information obtaining process may be performed (S4630).

Meanwhile, the source device 72 may transmit a trigger response message to the switch 1 73 using the HD-CMP (S4640).

Upon receiving the trigger response message, the switch 1 73 may transmit a session status response message to the HPnP control point 82 in response (S4650). Here, the session status response message may include a result code indicating a success or a failure and session descriptor information. The session descriptor information, representing specific information of a target session, may include at least one of session identification information of a target session, first device reference information, and second device reference information, for example.

Also, in this embodiment, repeated contents of the embodiments related to the session control (creation, termination, and status obtainment) described above are not described, and details of other embodiment described in this disclosure may all be applied.

FIG. 47 is a view illustrating embodiments to which the present invention is applied, wherein FIG. 47(*a*) illustrates a format of a session status request message, FIG. 47(*b*) illustrates a text/plain type session status request message, and FIG. 47(*c*) illustrates a text/xml type session status request message.

Referring to FIG. 47(*a*), a session status information request message format 4710 may include a POST 4711, a HOST 4712, a CONTENT-LENGTH 4713, a CONTENT-TYPE 4714, and a BODY 4715. The session status information request message may be transmitted in an HTTP POST manner.

The POST 4711 represents a session control trigger URL, the HOST 4712 represents an IP address allocated to a device, the CONTENT-LENGTH 4713 represents a length of the BODY 4715, and the CONTENT-TYPE 4714 represents a text type of the BODY 4715.

For example, FIGS. 47(*b*) and 47(*c*) illustrate cases where the CONTENT-TYPE 4714 of the session termination request message format 4710 is a text/plain type 4731 to 4735 and a text/xml type 4751 to 4755, respectively.

When the CONTENT-TYPE 4714 is the text/plain type or the text/xml type, the BODY 4735 or 3655 may include at least one session identification information. Here, the SessionID1 represents session identification information of a first session, and SessionID2 represents session identification information of a second session.

When the CONTENT-TYPE 4714 is the text/plain type or the text/xml type, the BODY 4715 may be expressed as illustrated in FIGS. 47(*b*) and 47(*c*), respectively. The BODY 4715 message may include at least one session identification information for obtaining session status information. For example, referring to FIGS. 47(*b*) and 47(*c*), the BODY 4735 or 4755 message may include an SessionID1 value and an SessionID2 value.

Also, in this embodiment, repeated contents of the embodiments related to the session control (creation, termination, and status obtainment) described above are not described, and details of other embodiment described in this disclosure may all be applied.

FIG. 48 is a view illustrating embodiments to which the present invention is applied, wherein FIG. 48(*a*) illustrates a format of a session status response message, and FIG. 48(*b*) illustrates a text/xml type session status response message.

Referring to FIG. 48(*a*), a session status response message format 4810 may include an HTTP version and result code 4811, a CONTENT-TYPE 4812, and a BODY 4813. The session status response message may be transmitted in an HTTP manner.

The HTTP version is 1.1 and the result code represents 200 OK indicating that a session termination has been successful (4811). The CONTENT-TYPE 4812 represents a text type of the BODY 4813.

For example, FIG. 48(b) illustrates a case where the CONTENT-TYPE 4812 of the session status response response message format 4810 is a text/xml type 4831 to 4833, respectively.

When the CONTENT-TYPE 4812 is the text/xml type, the BODY 4833 may include session status information and session descriptor information. Here, the session descriptor information, representing specific information of a target session, may include at least one of session identification information of a target session, first device reference information, and second device reference information, for example.

Also, in this embodiment, repeated contents of the embodiments related to the session control (creation, termination, and status obtainment) described above are not described, and details of other embodiment described in this disclosure may all be applied.

FIG. 49 is a view illustrating other embodiments to which the present invention is applied, wherein FIG. 49(a) illustrates a format of a session status request message, FIG. 49(b) illustrates a text/plain type session status request message, and FIG. 49(c) illustrates a text/xml type session status request message.

Referring to FIG. 49(a), the session status request message format 4910 may include a POST 4911, a HOST 4912, a CONTENT-LENGTH 4913, a CONTENT-TYPE 4914, and a BODY 4915. The session status request message may be transmitted in an HTTP POST manner.

The POST 4911 represents a session control trigger URL, the HOST 4912 represents an IP address allocated to a device, the CONTENT-LENGTH 4913 represents a length of the BODY 4915, and the CONTENT-TYPE 4914 represents a text type of the BODY 4915.

For example, FIGS. 49(b) and 49(c) illustrate cases where the CONTENT-TYPE 4914 of the session status request message format 4910 is the text/plain type 4931 to 4935 and the text/xml type 4951 to 4955, respectively.

When the CONTENT-TYPE 4914 is the text/plain type or the text/xml type, the BODY 4915 message may be expressed as illustrated in FIGS. 49(b) and 49(c), respectively. The BODY 4915 message may include at least one session identification information for obtaining session status information. For example, referring to FIGS. 49(b) and 49(c), the BODY 4935 or 4955 message may include an SID value.

Also, in this embodiment, repeated contents of the embodiments related to the session control (creation, termination, and status obtainment) described above are not described, and details of other embodiment described in this disclosure may all be applied.

FIG. 50 is a view illustrating other embodiments to which the present invention is applied, wherein FIG. 50(a) illustrates a format of a session status response message when obtaining of session status information is successful, and FIG. 50(b) illustrates a session status response message when obtaining of session stage information fails.

Referring to FIG. 50(a), a session status response message format 5010 when obtaining of session status information is successful may include an HTTP version and result code 5011, a CONTENT-TYPE 5012, and a BODY 5013 message. The session status response message may be transmitted in an HTTP manner.

The HTTP version is 1.1, and the result code represents 200 OK indicating that obtaining of session status information has been successful (5011 or 5021). The CONTENT-TYPE 5012 or 5022 represents a text type of the BODY 5013 or 5023 message. For example, the CONTENT-TYPE 5012 or 5022 represents a text/plain type 5021 to 5023.

Meanwhile, when obtaining of session status information is successful, the BODY 5013 or 5023 may include session descriptor information. The session descriptor information may include at least one of related partner device information, session route information, and path information. For example, the session descriptor information may include an initiate device reference value, a first partner device reference value, a second partner device reference value, an input port ID, an output port ID, and an overall path, and the like.

Referring to FIG. 50(b), a session status response message format 5030 when obtaining of session status information fails may include an HTTP version and result code 5031, a CONTENT-TYPE 5032, and a BODY 5033. The session status response message may be transmitted in an HTTP manner.

The HTTP version is 1.1, and the result code represents 503 indicating that obtaining of session status information has failed (5031 or 5041). The CONTENT-TYPE 5032 or 5042 represents a text type of the BODY 5033 or 5043. For example, the CONTENT-TYPE 5032 or 5042 represents a text/plain type 5041 to 5043.

Meanwhile, the BODY 5033 or 5043 message may include failure reason information. The failure reason information may include one of a response code list. For example, a first reason may indicate a case in which session identification information is not known or is not related to a target device. A second reason may indicate a case that a requested session has already been terminated.

Also, in this embodiment, repeated contents of the embodiments related to the session control (creation, termination, and status obtainment) described above are not described, and details of other embodiment described in this disclosure may all be applied.

Also, the present invention provides a method for controlling a playback component discovered from a remote device in a multimedia network environment.

In an embodiment to which the present invention is applied, in order to allow a playback component to be controlled by a remote device (controller) in a multimedia network environment, the playback component may provide a Web-based control user interface. The remote device (controller) may select a control device to be controlled from among a plurality of playback components discovered using a UPnP protocol on a multimedia network, and the corresponding control device may transmit a Web-based control interface screen to the remote device (controller). The user may issues a command for a function to be performed by the playback component through the Web-based control interface displayed on a display of the remote device, and the corresponding command is transmitted to the playback component.

Accordingly, in the multimedia network environment of a multi-room, the playback component may be controlled without installing a separate application in the remote device (controller), thereby reducing the use of resource of the remote device (controller). Also, by using a native user interface of the playback component, ease in usage in terms of user may be provided.

In an embodiment to which the present invention is applied, a source device may have Web-based user interface to allow a controller to remotely control the source device. The controller may discover a source device, a switch device, and a sink device present in room #1 and room #2, and create a session such that content present in the source device to be streamed to the sink device.

When a session creation is completed, the controller may select a discovered source device and request a command bringing a Web-based user interface of the source device from the source device.

In response to the request from the controller, the source device may transmit information regarding the Web-based user interface. The user may select a function of the source device to be controlled through the Web-based user interface of the source device displayed on a screen of the controller. When the user request is transmitted to the source device, a corresponding response may be transmitted to the controller.

In another embodiment to which the present invention is applied, the source device may have a Web-based user interface to allow the controller to remotely control the source device. A URL for accessing the Web-based user interface may be positioned in description information of the source device. For example, address information may be stored in a <presentation URL> element of the description information.

The controller may discover a device within an HPnP network, and a device in which the Web-based user interface is installed may transfer URL information for accessing the corresponding user interface to the controller through the description information.

When the controller selects a source device desired to be controlled, the controller transmits an HTTP GET Request message to the source device through the presentation URL in order to retrieve the Web-based UI of the source device. Here, the source device may include the Web-based UI in an HTTP response message and transmit the same to the controller.

Through the Web-based UI of the source device displayed on the screen of the controller, the user may select a function desired to be controlled. For example, the user may select play, stop, skip, fast forward, rewind, and the like. The controller may transmit a function selected by the user to the source device through an HTTP POST message.

When the result of performing the corresponding function is successful, the source device may transfer a result code (for example, 200 OK) to the controller through an HTTP response message, and when the result of performing the corresponding function fails, the source device may transfer a result code (for example, a general HTTP Error code) to the controller through an HTTP response message.

INDUSTRIAL AVAILABILITY

The embodiments of the present invention have been described for the purpose of illustration, but the scope of the present invention is not limited thereto and various variants and modifications by a person skilled in the art using a basic concept of the present invention defined in claims also belong to the scope of the present invention.

The invention claimed is:

1. A session controlling method of a first switch device between devices on a plurality of networks, the session controlling method comprising:
receiving, using a first protocol, a session control request message from a control device;
transmitting, using a second protocol, a triggering message for a specific control operation to a source device based on the received session control request message;
performing session control between the source device and a sink device by transmitting and receiving at least one message based on the triggering message;
receiving, using the second protocol, a triggering response message for indicating a result of the performing the session control from the source device;
transmitting, using the first protocol, a session control response message corresponding to the session control request message to the control device; and
determining whether the session control request message represents a session creation request message, a session termination request message or a session status request message,
wherein, in response to determining that the session control request message represents the session creation request message, the performing the session control between the source device and the sink device comprises:
transmitting a first message for a session route query to a second switch device; and
receiving a second message for a session route set from the second switch device in response to the first message,
wherein the second switch device is connected to the sink device using a High Definition Multimedia Interface (HDMI), wherein the first switch device, the sink device and the control device are included in an HDBaseT Plug & Play (HPnP) network and the source device is not included in the HPnP network, and
wherein the first switch device represents the source device in the HPnP network and takes a role of proxy to communicate between the source device and the control device.

2. The session controlling method of claim 1, wherein the first protocol is a Hypertext Transfer Protocol (HTTP) and the second protocol is an HDBaseT-Control and Management Protocol (HD-CMP).

3. The session controlling method of claim 1, wherein, in response to determining that the session control request message represents the session creation request message, the performing the session control between the source device and the sink device further comprises creating a session between the source device and the second switch device, and the session creation request message includes identification information of the source device and identification information of the sink device.

4. The session controlling method of claim 3, wherein, when a session creation is successfully performed, the session control response message includes at least one of a result code indicating a success, a created session identification information or status information indicating a session creation, and
wherein, when a session creation fails, the session control response message includes at least one of a result code indicating a failure or failure reason information.

5. The session controlling method of claim 1, wherein, in response to determining that the session control request message represents the session termination request message, the performing the session control between the source device and the sink device further comprises terminating a session between the source device and the second switch device, and the session termination request message includes at least one of created session identification information, source device reference information or sink device reference information.

6. The session controlling method of claim 5, wherein the session control response message includes at least one of a result code indicating a success or a failure, source device reference information or sink device reference information.

7. The session controlling method of claim 1, wherein, in response to determining that the session control request message represents the session status request message, the performing the session control between the source device and the sink device further comprises exchanging a session status with the source device and the second switch device, and the session status request message includes at least one of address information for obtaining a session status or created session identification information.

8. The session controlling method of claim 7, wherein the session control response message includes session status information, and
wherein the session status information includes at least one of associated device information, session routing information or session path information.

9. A first switch device for controlling a session between a plurality of devices on a plurality of networks, the first switch device comprising:
a network interface configured to transmit a message to at least one of the plurality of devices or receive a message from the at least one of the plurality of devices; and
a controller configured to:
receive, by using the network interface, a session control request message from a control device using a first protocol,
transmit, by using the network interface, a triggering message for a specific control operation to a source device based on the received session control request message through a second protocol,
perform session control between the source device and a sink device by transmitting and receiving at least one message using the second protocol based on the triggering message,
receive, using the second protocol, a triggering response message for indicating a result of the performing the session control from the source device,
transmit, using the first protocol, a session control response message corresponding to the session control request message to the control device, and
determine whether the session control request message represents a session creation request message, a session termination request message or a session status request message,
wherein, in response to determining that the session control request message represents the session creation request message, the controller is configured to perform the session control by:
transmitting a first message for a session route query to a second switch device, and
receiving a second message for a session route set from the second switch device in response to the first message, wherein the second switch device is connected to the sink device using a High Definition Multimedia Interface (HDMI),
wherein the first switch device, the sink device and the control device are included in an HDBaseT Plug & Play (HPnP) network and the source device is not included in the HPnP network, and
wherein the first switch device represents the source device in the HPnP network and takes a role of proxy to communicate between the source device and the control device.

10. The first switch device of claim 9, wherein the first protocol is a Hypertext Transfer Protocol (HTTP) and the second protocol is an HDBaseT-Control and Management Protocol (HD-CMP).

11. The first switch device of claim 9, wherein, in response to determining that the session control request message represents the session creation request message, the controller is configured to perform the session control by creating a session between the source device and the second switch device, and the session creation request message includes identification information of the source device and identification information of the sink device.

12. The first switch device of claim 11, wherein, when a session creation is successfully performed, the session control response message includes at least one of a result code indicating a success, a created session identification information or status information indicating a session creation, and
wherein, when a session creation fails, the session control response message includes at least one of a result code indicating a failure or failure reason information.

13. The first switch device of claim 9, wherein, in response to determining that the session control request message represents the session termination request message, the controller is configured to perform the session control by terminating session between the source device and the second switch device, and the session termination request message includes at least one of created session identification information, source device reference information or sink device reference information.

14. The first switch device of claim 13, wherein the session control response message includes at least one of a result code indicating a success or a failure, source device reference information or sink device reference information.

15. The first switch device of claim 9, wherein, in response to determining that the session control request message represents the session status request message, the controller is configured to perform the session control by exchanging a session status with the source device and the second switch device, and the session status request message includes at least one of address information for obtaining a session status or created session identification information.

16. The first switch device of claim 15, wherein the session control response message includes session status information, and
wherein the session status information includes at least one of associated device information, session routing information or session path information.

* * * * *